US012581183B2

(12) United States Patent
Han et al.

(10) Patent No.: US 12,581,183 B2
(45) Date of Patent: Mar. 17, 2026

(54) SHOOTING METHOD AND ELECTRONIC DEVICE

(71) Applicant: Honor Device Co., Ltd., Shenzhen (CN)

(72) Inventors: Yuzhuo Han, Shenzhen (CN); Shiyu Zhu, Shenzhen (CN); Zhichao Zhang, Shenzhen (CN); Qiuping Dai, Shenzhen (CN); Nong Zhang, Shenzhen (CN); Yuanchao Du, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 1 day.

(21) Appl. No.: 18/698,123

(22) PCT Filed: Apr. 13, 2023

(86) PCT No.: PCT/CN2023/088018
§ 371 (c)(1),
(2) Date: Apr. 3, 2024

(87) PCT Pub. No.: WO2023/231595
PCT Pub. Date: Dec. 7, 2023

(65) Prior Publication Data
US 2024/0406536 A1 Dec. 5, 2024

(30) Foreign Application Priority Data
May 30, 2022 (CN) .......................... 202210601990.9

(51) Int. Cl.
*H04N 23/611* (2023.01)
*H04N 5/91* (2006.01)
(Continued)

(52) U.S. Cl.
CPC ............. *H04N 23/611* (2023.01); *H04N 5/91* (2013.01); *H04N 23/632* (2023.01); *H04N 23/633* (2023.01); *H04N 23/667* (2023.01)

(58) Field of Classification Search
CPC .. H04N 23/64; H04N 23/635; H04N 5/23267; H04N 5/772; H04N 5/232945;
(Continued)

(56) References Cited

U.S. PATENT DOCUMENTS 8,891,821 B2 11/2014 Sato
10,133,947 B2 11/2018 Yang et al.
(Continued)

FOREIGN PATENT DOCUMENTS

CN 102405483 A 4/2012
CN 105407283 A 3/2016
(Continued)

OTHER PUBLICATIONS

Anonymous: "Video tracking—Wikipedia", Nov. 18, 2019 (Nov. 18, 2019), 4 pages.
(Continued)

*Primary Examiner* — Xi Wang
(74) *Attorney, Agent, or Firm* — Rimon PC

(57) ABSTRACT

This application provides a shooting method. By implementing the method, a terminal device such as a mobile phone or a tablet computer can determine a shot protagonist based on a user operation when starting shooting or in a shooting process. In the shooting process, the terminal device may display, in a preview window, an image stream collected by a camera, and the terminal device may further generate a small window that specially displays the protagonist. After recording ends, a user may obtain two videos: an original video generated based on the image stream in the preview window, and a close-up video generated based on a pro-
(Continued)

tagonist image stream in the small window. In this way, the user can choose to use the original video and/or the close-up video to meet personalized requirements in different scenarios at different moments of the user.

19 Claims, 39 Drawing Sheets

(51) Int. Cl.
    *H04N 23/63*          (2023.01)
    *H04N 23/667*       (2023.01)

(58) Field of Classification Search
    CPC ......... H04N 5/232935; H04N 5/23258; H04N 5/23216; H04N 5/23238; H04M 2250/52
    See application file for complete search history.

(56) References Cited

U.S. PATENT DOCUMENTS

| | | | |
|---|---|---|---|
| 11,765,463 B2 | 9/2023 | Li et al. | |
| 2011/0096149 A1 | 4/2011 | Au et al. | |
| 2014/0176686 A1* | 6/2014 | Wakabayashi | H04N 13/302 348/51 |
| 2018/0196472 A1 | 7/2018 | Lee | |
| 2019/0080457 A1* | 3/2019 | Shukla | G06F 18/253 |
| 2019/0188452 A1 | 6/2019 | Chen | |
| 2020/0193621 A1 | 6/2020 | Yu et al. | |
| 2021/0134009 A1 | 5/2021 | Zhang et al. | |
| 2021/0382941 A1 | 12/2021 | Wu et al. | |
| 2022/0159183 A1* | 5/2022 | Li | H04N 23/635 |

| | | | |
|---|---|---|---|
| 2022/0279116 A1 | 9/2022 | Zhou | |
| 2023/0188830 A1 | 6/2023 | Chen et al. | |
| 2023/0230276 A1 | 7/2023 | Shen | |

FOREIGN PATENT DOCUMENTS

| | | |
|---|---|---|
| CN | 106250863 A | 12/2016 |
| CN | 110660078 A | 1/2020 |
| CN | 110688930 A | 1/2020 |
| CN | 110913132 A | 3/2020 |
| CN | 111061912 A | 4/2020 |
| CN | 111093026 A | 5/2020 |
| CN | 111753611 A | 10/2020 |
| CN | 112135046 A | 12/2020 |
| CN | 112954219 A | 6/2021 |
| CN | 113079342 A | 7/2021 |
| CN | 113395441 A | 9/2021 |
| CN | 113674313 A | 11/2021 |
| CN | 114155488 A | 3/2022 |
| CN | 114332169 A | 4/2022 |
| CN | 112668487 B | 5/2022 |
| JP | 2007150496 A | 6/2007 |
| KR | 20220032681 A | 3/2022 |
| WO | 2016114885 A1 | 7/2016 |
| WO | 2021244104 A1 | 12/2021 |

OTHER PUBLICATIONS

He Xia et al: "Fast hash vehicle retrieval method based on multi-tasking", Journal of Image and Graphics, 2018, 23(12): 1801-1812.
Sheng Ping et al: "Design and realization of dynamic target tracking and automatic close-up snapshot", Journal of Southeast University(Natural Science Edition), vol. 41 No.5, Sep. 2011, 6 pages.

* cited by examiner $ReID_{31}=1\text{-}<F0,F1>$ $ReID_{32}=1\text{-}<F0,F2>$ $ReID_{33}=1\text{-}<F0,F3>$ $ReID_{34}=1\text{-}<F0,F4>$

SHOOTING METHOD AND ELECTRONIC DEVICE

CROSS-REFERENCE TO RELATED APPLICATIONS

This application is a national stage of International Application No. PCT/CN2023/088018, filed on Apr. 13, 2023, which claims priority to Chinese Patent Application No. 202210601990.9, filed on May 30, 2022. The disclosures of both of the aforementioned applications are hereby incorporated by reference in their entireties.

TECHNICAL FIELD

This application relates to the terminal field, and in particular, to a shooting method and an electronic device.

BACKGROUND

Currently, terminal devices supporting video shooting, such as a mobile phone, can implement a shooting mode of automatic tracking. When recording a video, the terminal device may receive a protagonist selected by a user. Then, in a subsequent video recording process, the terminal device may always follow the protagonist, to obtain a close-up video in which the selected protagonist is always at the center of the video.

SUMMARY

According to a first aspect, this application provides a shooting method, applied to an electronic device having a camera. The method includes: displaying a first interface, where the first interface includes a preview window and a first control, and the preview window is used to display an image collected by the camera; detecting a first operation performed on the first control; displaying a second interface in response to the first operation, where the second interface includes the preview window, a first image is displayed in the preview window, one or more marks are displayed on the first image, the one or more marks correspond to one or more shot objects in the first image, the one or more marks include a first mark, and the first mark corresponds to a first shot object in the first image; detecting a second operation performed on the first mark; displaying a third interface in response to the second operation, where the third interface includes the preview window and a first window, and displaying a second image with the first shot object as a protagonist in the first window; and saving an original video and a close-up video in response to an end video recording operation, where the original video is a video obtained based on an image displayed in the preview window in a recording process, the close-up video is a video obtained based on an image displayed in the first window in the recording process, the original video includes the first image, the close-up video includes the second image, and in the recording process, for a part or all of the close-up video, a protagonist in the close-up video is determined based on a similarity distance.

By implementing the foregoing method, the electronic device (a terminal 100) can select the protagonist, focus on the protagonist while recording a video, and then save two videos: the original video generated based on an image stream in the preview window, and the close-up video generated based on a protagonist image stream in a small window. In this way, a user can choose to use the original video and/or the close-up video to meet personalized requirements in different scenarios at different moments of the user.

With reference to the method according to the first aspect, in some embodiments, after the displaying a third interface, the method further includes: in response to a fourth operation of starting recording, recording the original video based on the image displayed in the preview window, and starting recording the close-up video based on the image displayed in the first window.

By implementing the foregoing method, the user can select the protagonist before starting recording, that is, in a preview process, and then simultaneously record the original video and the close-up video when tapping a shooting control to start recording a video.

With reference to the method according to the first aspect, in some embodiments, before the detecting a second operation performed on the first mark, the method further includes: in response to a fourth operation of starting recording, recording the original video based on the image displayed in the preview window; and in response to the second operation, recording the close-up video based on the image displayed in the first window, where duration of the close-up video is less than that of the original video.

By implementing the foregoing method, the user can select the protagonist after starting recording, that is, in the recording process.

With reference to the method according to the first aspect, in some embodiments, the saving an original video and a close-up video in response to an end video recording operation specifically includes: stopping recording the image in the first window in response to the end recording operation, and saving the close-up video; and stopping recording the image in the preview window simultaneously in response to the end recording operation, and saving the original video.

By implementing the foregoing method, the user can simultaneously end recording the original video and the close-up video.

With reference to the method according to the first aspect, in some embodiments, the saving an original video and a close-up video in response to an end video recording operation specifically includes: stopping recording the image in the first window in response to an operation of ending recording the close-up video, and saving the close-up video; and stopping recording the image in the preview window in response to the end recording operation, and saving the original video.

By implementing the foregoing method, the user can first close the first window, end recording the close-up video, and then end recording the original video.

With reference to the method according to the first aspect, in some embodiments, the first window includes a second control, and the operation of ending recording the close-up video is specifically a user operation performed on the second control.

By implementing the foregoing method, the user can tap a close control of the first window, to close the small window, and end previewing a close-up image.

With reference to the method according to the first aspect, in some embodiments, types of the objects include a person, an animal, and a plant.

By implementing the foregoing method, diversity of protagonists can be ensured.

With reference to the method according to the first aspect, in some embodiments, the displaying a second image with the first shot object as a protagonist in the first window specifically includes: determining the second image in which the first object in the first image is located, and displaying the second image in the first window.

By implementing the foregoing method, the first object is displayed in the second image, and no other object may be displayed.

With reference to the method according to the first aspect, in some embodiments, the method further includes: determining that a third image includes the first object; and determining a fourth image in which the first object in the third image is located, and displaying the fourth image in the first window.

By implementing the foregoing method, the first object can be continuously displayed in the first window in the recording process.

With reference to the method according to the first aspect, in some embodiments, the determining that a third image includes the first object specifically includes: identifying, by using a human body detection algorithm, one or more persons included in the third image, where an image region in which one person is located is one human body image region; and when human body image regions in the third image do not overlap, calculating an intersection over union IoU distance between each human body image region in the third image and a first image region in the first image, and determining, as the first object, a person corresponding to a first human body image region that has a smallest IoU distance that meets an IoU distance threshold; or when human body image regions in the third image overlap, calculating an IoU distance and a re-identification ReID distance between each human body image region in the third image and the first image region in the first image, and determining, as the first object, a person corresponding to a first human body image region that has a smallest sum of the IoU distance and the ReID distance that meets an IoU+ReID distance threshold.

By implementing the foregoing method, this process is an intersection over union included in the specification, which can be used to accurately track the first object in a raw image.

With reference to the method according to the first aspect, in some embodiments, the determining a fourth image in which the first object in the third image is located specifically includes: determining, based on the first human body image region, the fourth image including the first human body image region, where an aspect ratio of the fourth image is the same as an aspect ratio of the first window.

Implementing the foregoing method can make a display size of the first window more proper.

With reference to the method according to the first aspect, in some embodiments, the determining, based on the first human body image region, the fourth image including the first human body image region specifically includes: determining a zoom ratio ZoomRatio based on a size of a maximum human body image region in the third image and a size of the first human body image region in the third image, and determining a width and a height of the fourth image based on ZoomRatio, a width of the first window, and a height of the first window; and determining, based on the width and the height of the fourth image, the fourth image including the first human body image region.

By implementing the foregoing method, the fourth image of the first human body image region is determined based on the size of the human body image region, the zoom ratio ZoomRatio, the width of the first window, and the height of the first window, so that a calculation result can be more accurate.

With reference to the method according to the first aspect, in some embodiments, the method further includes: pausing recording of the image in the first window when it is determined that the third image does not include the first object.

By implementing the foregoing method, the close-up video is no longer recorded when the protagonist (the first object) is lost, enhancing user experience.

With reference to the method according to the first aspect, in some embodiments, the method further includes: when it is determined that the fourth image includes the first object, determining a fifth image in which the first object in the fourth image is located, displaying the fifth image in the first window, and continuing to record the close-up image in the first window simultaneously starting from the fifth image, where the fourth image is an image after the third image.

By implementing the foregoing method, the first object can be continuously displayed in the first window in the recording process, and the user can view the first object in the first window.

With reference to the method according to the first aspect, in some embodiments, the method further includes: increasing a lost frame count by 1 when it is determined that the third image does not include the first object; determining whether a current lost frame quantity is less than a lost frame threshold Y; and when the current lost frame quantity is greater than Y, stopping recording the image in the first window.

With reference to the method according to the first aspect, in some embodiments, the displaying one or more marks on the first image specifically includes: performing object identification on the first image collected by the camera, and determining the one or more objects included in the first image; generating the one or more marks respectively corresponding to the one or more objects; and displaying the first image in the preview window, and displaying the one or more marks on the one or more objects in the first image simultaneously.

By implementing the foregoing method, the mark can be used to indicate that the first image is a close-up image, which is distinguished from the raw image.

With reference to the method according to the first aspect, in some embodiments, the performing object identification on the first image collected by the camera, and determining the one or more objects included in the first image specifically includes: determining a face image included in the first image by using a preconfigured face detection algorithm; determining a human body image included in the first image by using a preconfigured human body detection algorithm; calculating an IoU of each face image and each human body image; and determining a group of face image and human body image meeting an IoU threshold as an object.

With reference to the method according to the first aspect, in some embodiments, a midpoint P3 between a midpoint P1 of the face image and a midpoint P2 of the human body image is a midpoint of the mark.

With reference to the method according to the first aspect, in some embodiments, the first window is displayed in the preview window of the first interface in a picture-in-picture mode.

By implementing the foregoing method, the user can view the raw image and the close-up image simultaneously in one user interface.

With reference to the method according to the first aspect, in some embodiments, the first window does not overlap the first object in the preview window.

By implementing the foregoing method, both the first window and the first object in the preview window can be seen by the user. A case in which previewing the first object by the user is affected because the first object is blocked does not occur.

According to a second aspect, this application provides an electronic device. The electronic device includes one or more processors and one or more memories. The one or more memories are coupled to the one or more processors, the one or more memories are configured to store computer program code, the computer program code includes computer instructions, and when the one or more processors execute the computer instructions, the electronic device is enabled to perform the method according to any one of the first aspect and the possible implementations of the first aspect.

According to a third aspect, this application provides a computer-readable storage medium, including instructions. When the instructions are run on an electronic device, the electronic device is enabled to perform the method according to any one of the first aspect and the possible implementations of the first aspect.

It may be understood that the electronic device provided in the second aspect and a computer storage medium provided in the third aspect are both used to perform the method provided in this application. Therefore, for beneficial effects that can be achieved by the electronic device and the computer-readable storage medium, refer to the beneficial effects in the corresponding method. Details are not described herein.

6

Figure 6A:
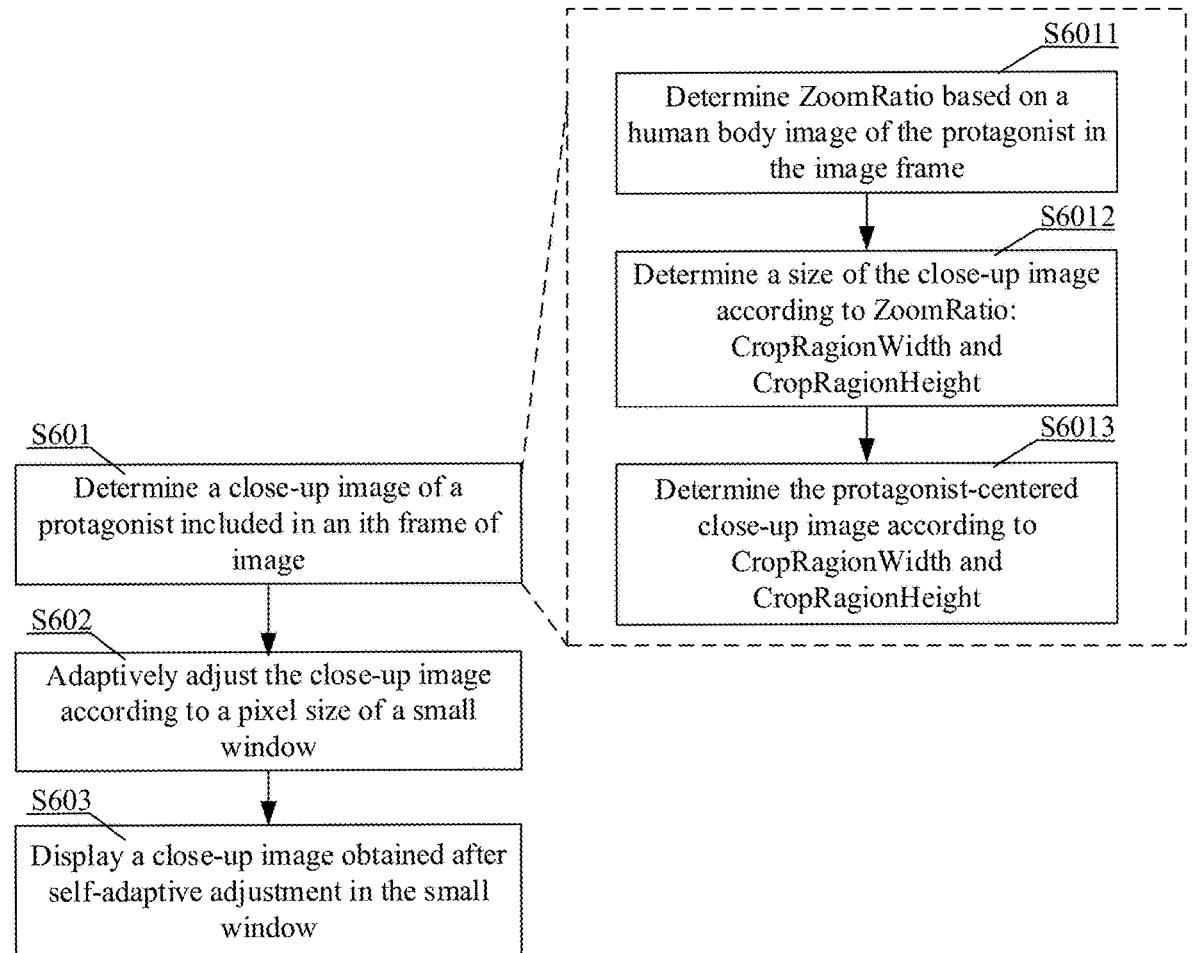
FIG. 6A is a flowchart of displaying a protagonist-centered close-up image in a small window by a terminal 100 according to an embodiment of this application.
Figure 6B:
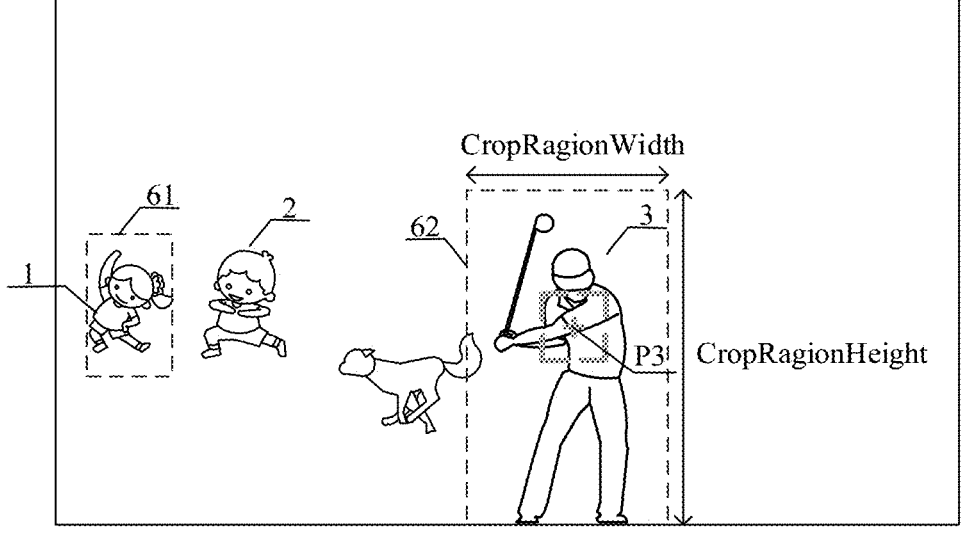
FIG. 6B is a flowchart of determining a size of a close-up image by a terminal 100 according to an embodiment of this application.
Figure 6C:
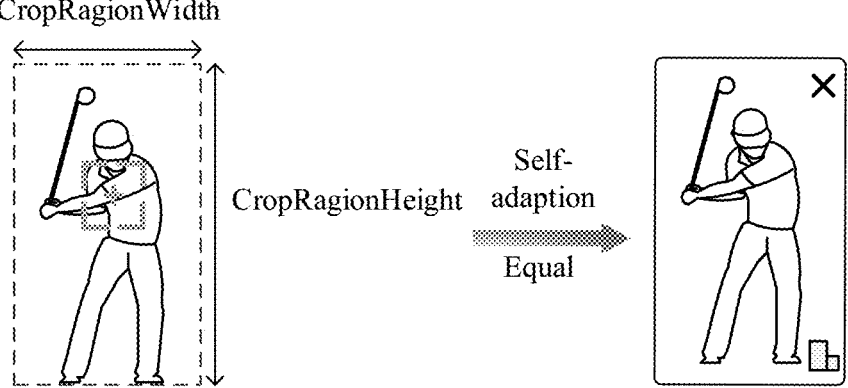
Figure 6D:
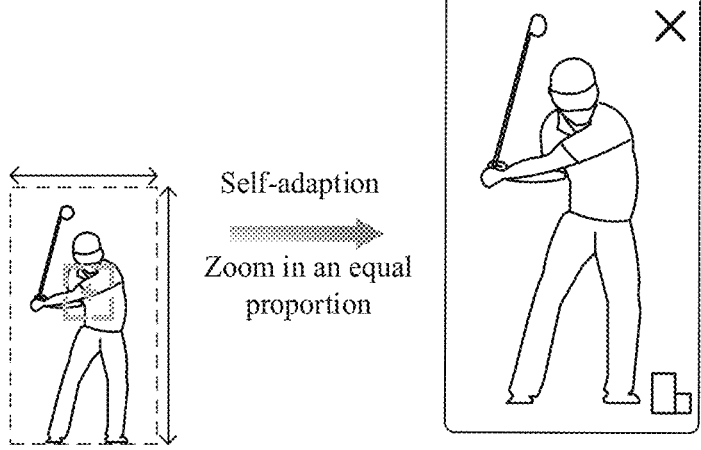
Figure 7A:
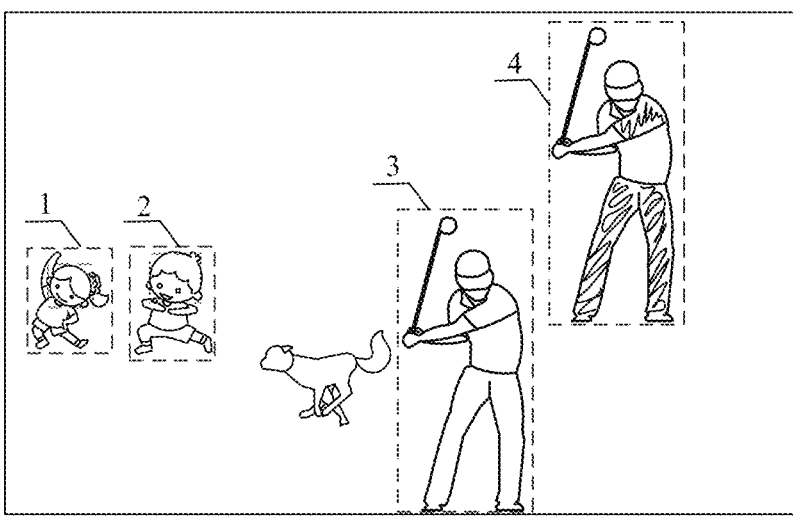
Figure 7B:
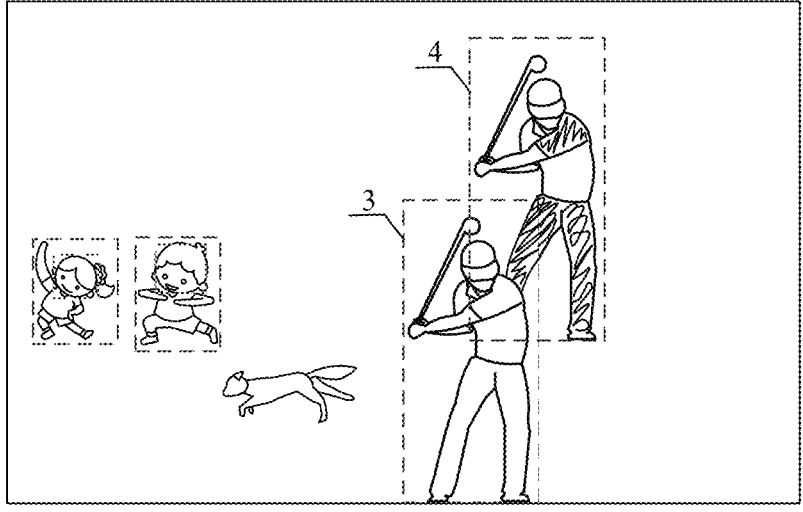
Figure 7C:
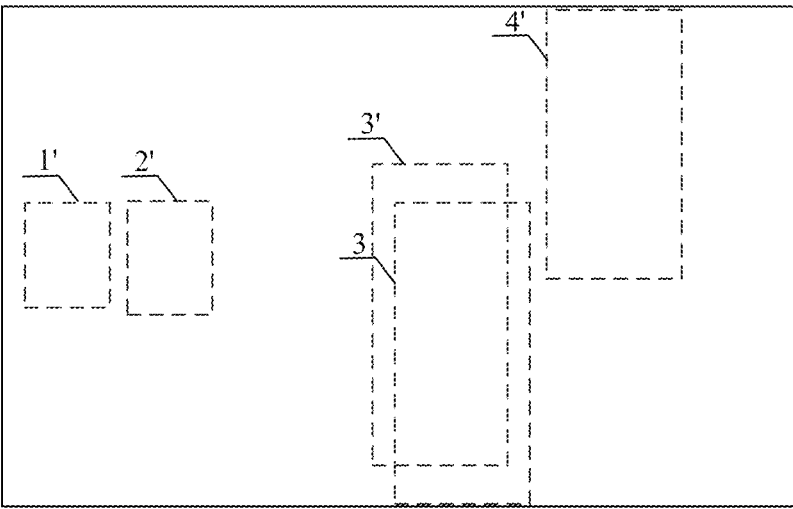
Figure 7D:
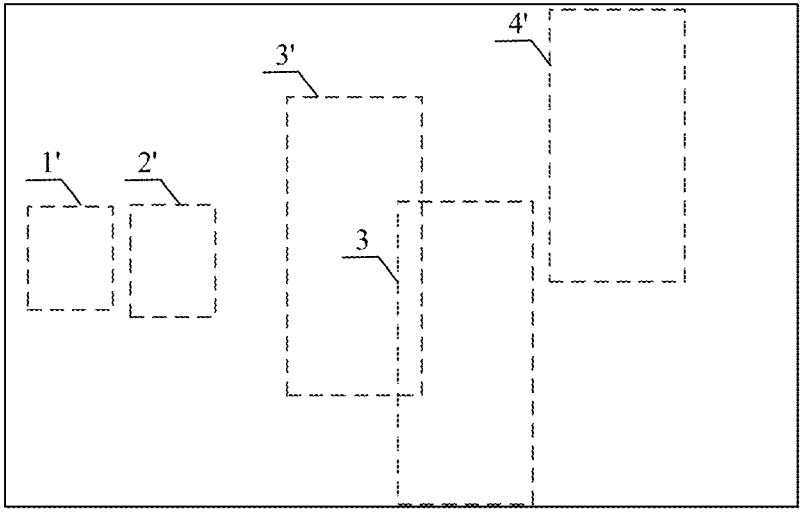
Figure 8:
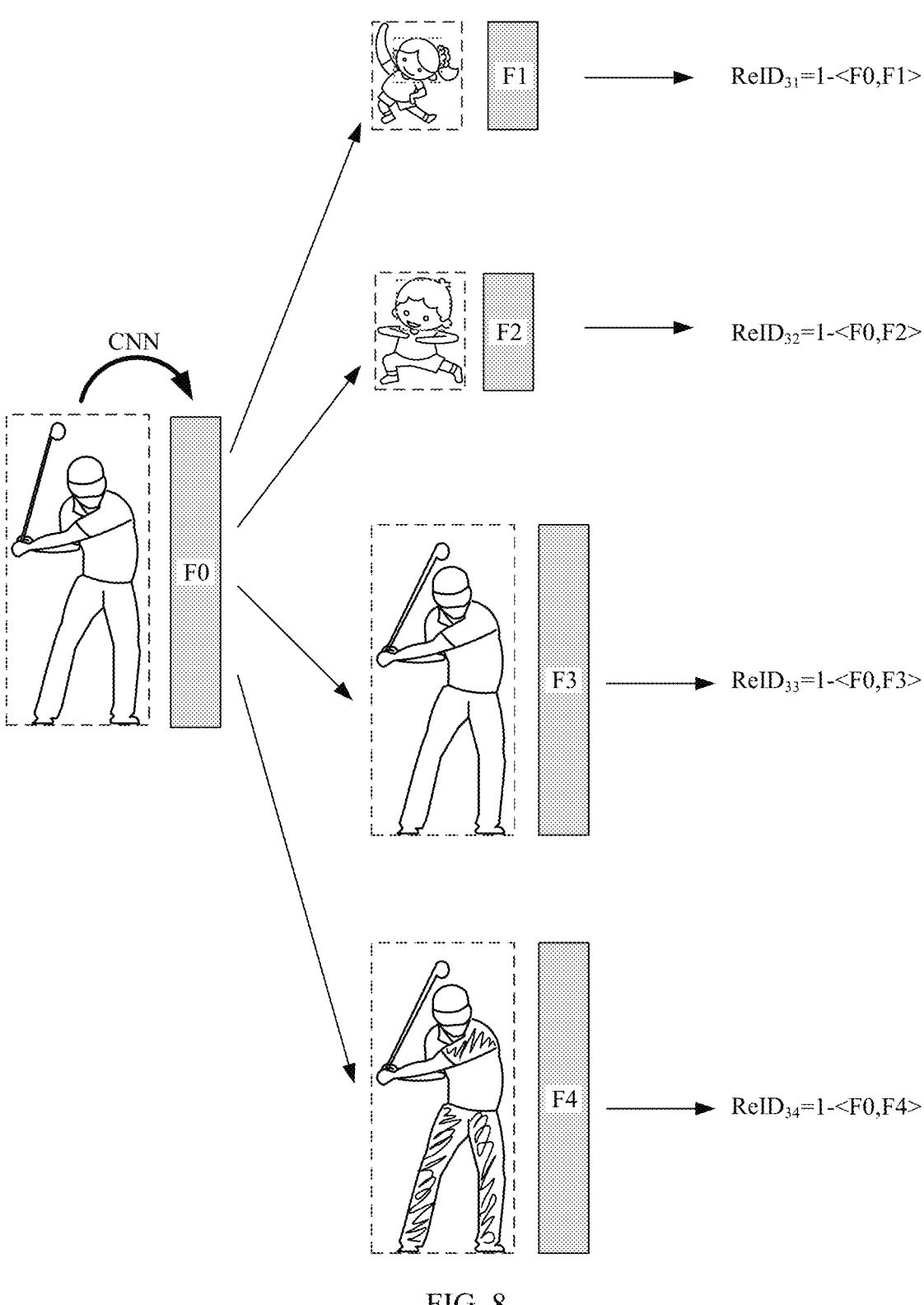
Figure 9A:
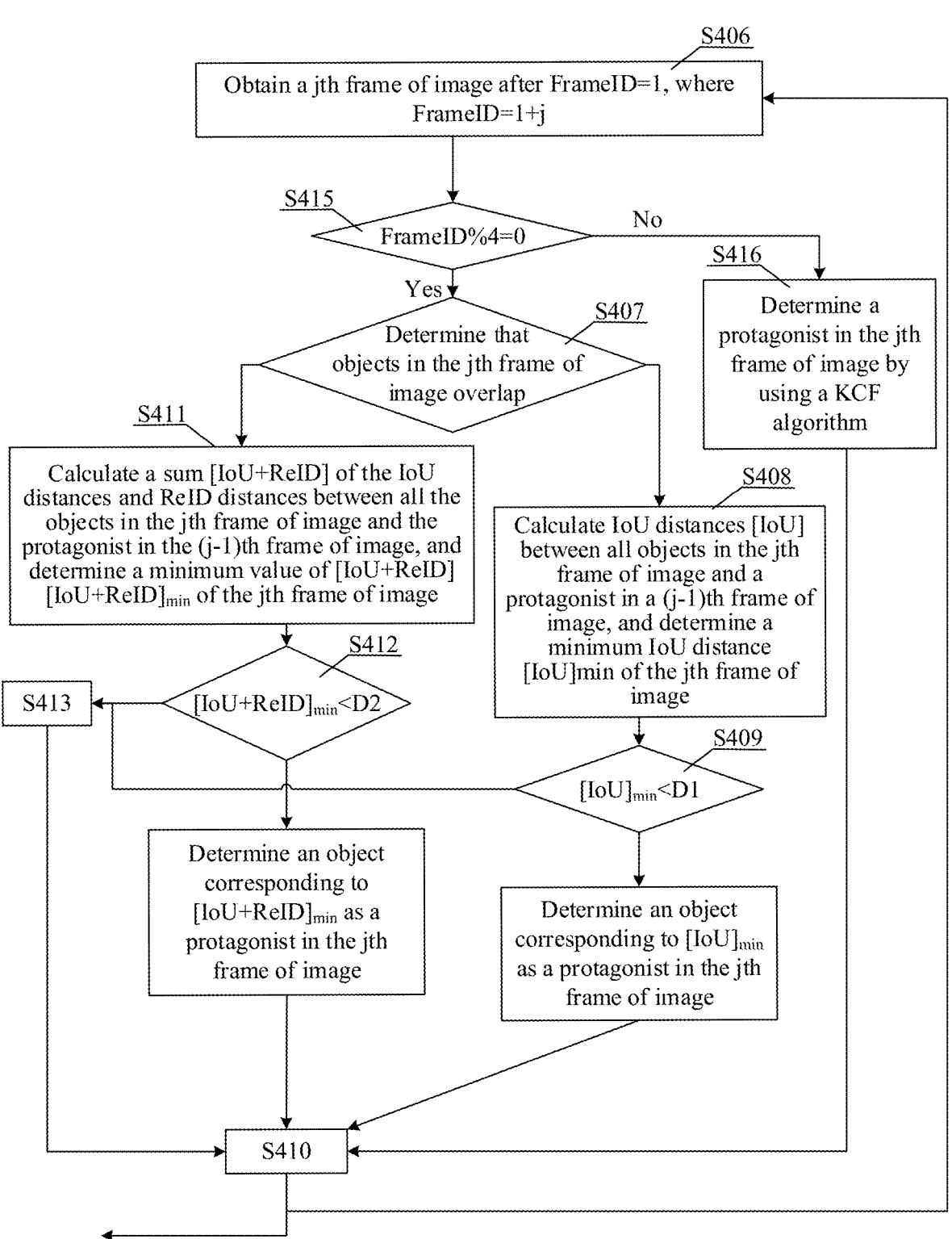
Figure 9B:
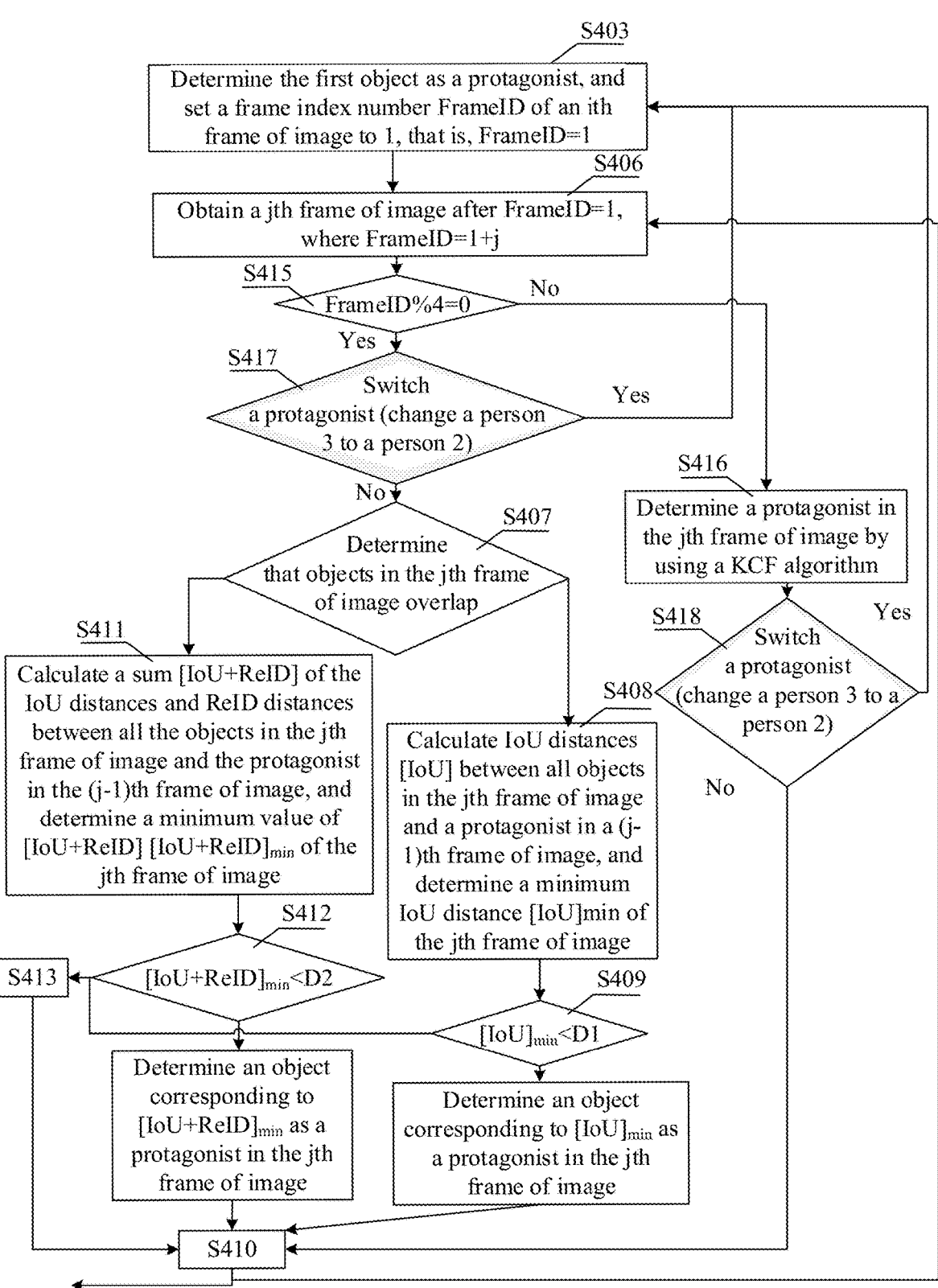
Figure 10:
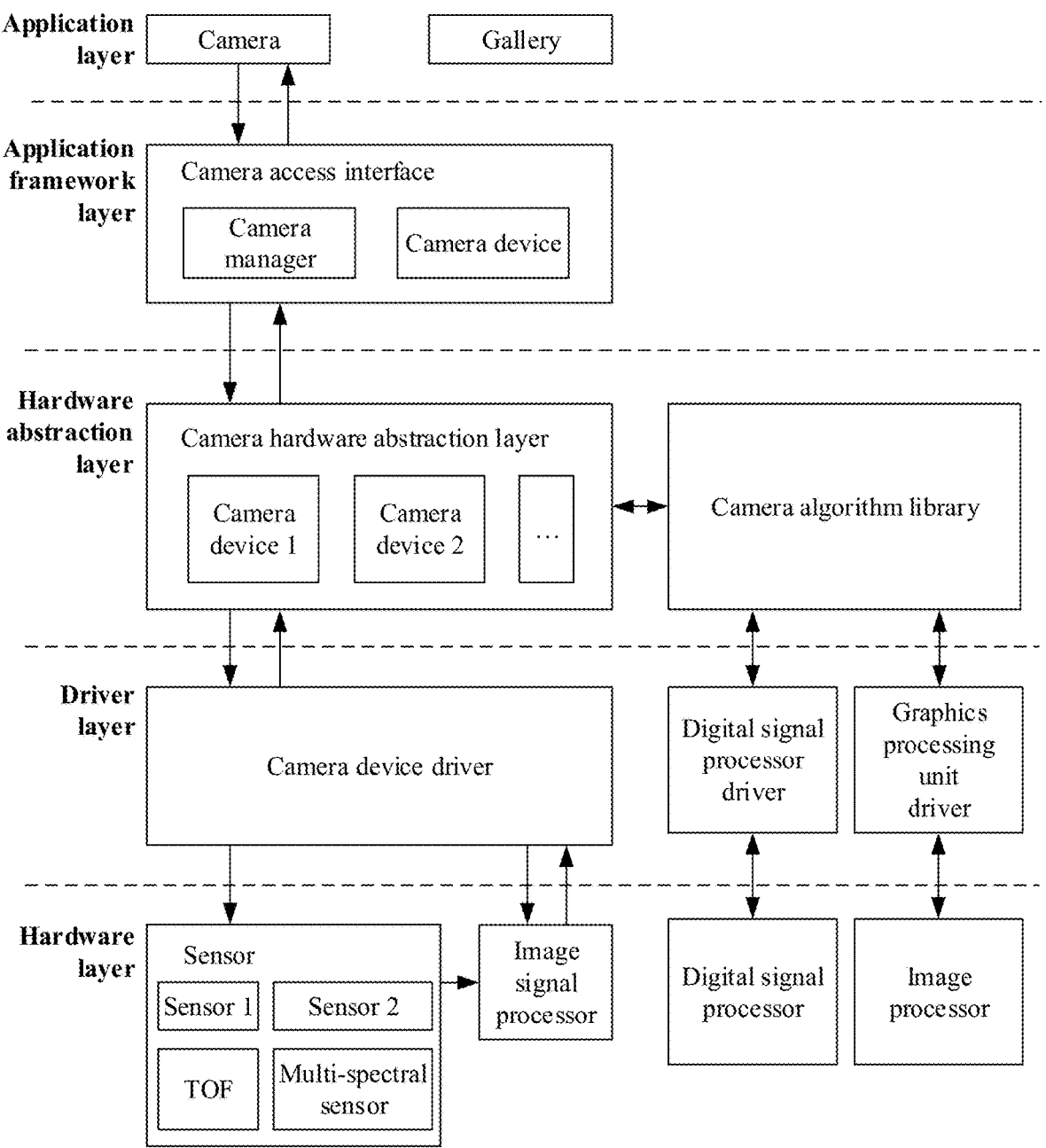
Figure 11:
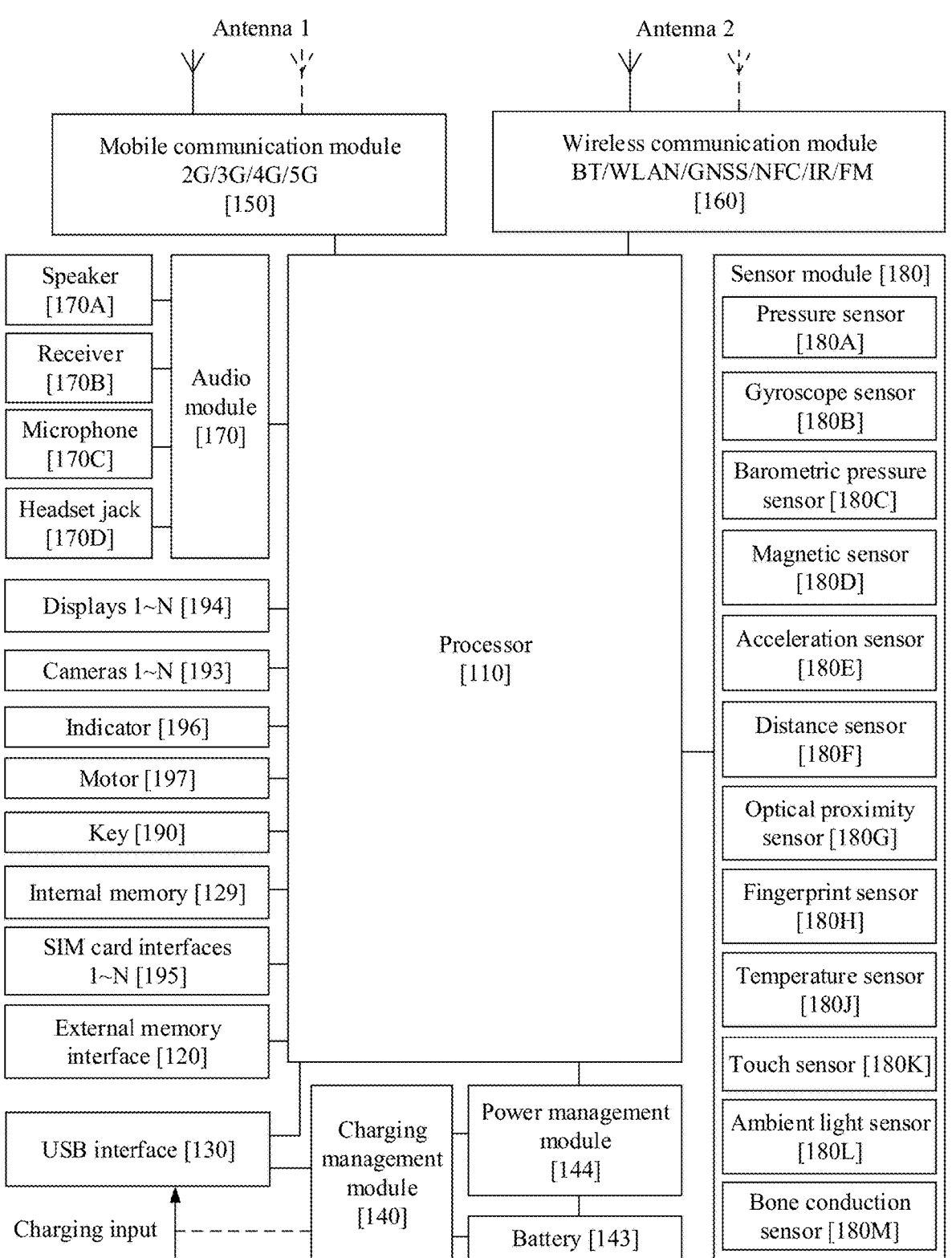

FIG. 6C-FIG. 6D are schematic diagrams of performing self-adaptive adjustment on a close-up image by a terminal 100 to adapt to window display according to an embodiment of this application;

FIG. 7A shows a frame of image in a multi-object scenario in which objects do not overlap according to an embodiment of this application;

FIG. 7B shows a frame of image in a multi-object scenario in which objects overlap according to an embodiment of this application;

FIG. 7C-FIG. 7D are schematic diagrams of positioning a protagonist by using an IoU location by a terminal 100 according to an embodiment of this application;

FIG. 8 is a schematic diagram of determining a ReID distance of a protagonist in an image by a terminal 100 according to an embodiment of this application;

FIG. 9A is another flowchart of shooting in a SOLO CUT mode by a terminal 100 according to an embodiment of this application;

FIG. 9B is another flowchart of shooting in a SOLO CUT mode by a terminal 100 according to an embodiment of this application;

FIG. 10 is a schematic diagram of a system structure of a terminal 100 according to an embodiment of this application; and FIG. 11 is a schematic diagram of a hardware structure of a terminal 100 according to an embodiment of this application.

DESCRIPTION OF EMBODIMENTS

Terms used in the following embodiments of this application are merely intended to describe specific embodiments, but not intended to limit this application.

In an existing shooting mode of automatic tracking, after a shot protagonist is selected, a video finally shot and saved by a terminal device is a close-up video of the selected protagonist. Image content near the protagonist is mostly incomplete in the close-up video. In this case, content other than the protagonist in a shooting process is ignored in the finally obtained video. It is difficult for a user to obtain, from the foregoing video, an environment (a state and an action of an object around the protagonist, and the like) in which the protagonist is located during shooting.

Therefore, an embodiments of this application provides a shooting method. The method may be applied to terminal devices such as a mobile phone and a tablet computer. In the following, a terminal 100 is used to refer to the foregoing terminal device.

In addition to a mobile phone or a tablet computer, the terminal 100 may alternatively be a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, an onboard device, a smart household device, and/or a smart city device. A specific type of the terminal is not specially limited in this embodiment of this application.

By implementing the shooting method provided in this embodiment of this application, after determining a shot protagonist, the terminal 100 may simultaneously generate two videos, recorded as an original video and a close-up video. The protagonist refers to a focus tracking object in a video recording process. In some examples, the protagonist is selected by the user. Optionally, the protagonist may alternatively be automatically identified by the terminal 100. For example, the terminal 100 may set an object corresponding to a current focal point as a protagonist, or the terminal 100 may set an object with a largest image proportion in a current viewfinder range as a protagonist, or the terminal 100 may alternatively set an object determined by using semantic analysis of image content as a protagonist.

After a camera is enabled, an image collected by the camera may be referred to as a RAW image. The terminal 100 may perform stream allocation based on the RAW image, to obtain an image stream used for display in a preview window. An image frame in the image stream may be referred to as a raw image. The original video is a video generated by recording the raw image. The preview window includes a window for displaying the raw image in a preview process, and a window for displaying the raw image in a recording process. A close-up image is a cropped image including a protagonist after the protagonist in the RAW image and/or the raw image is positioned. The close-up video is a video generated by recording the close-up image.

In the video recording process, the terminal 100 may simultaneously display the original video and the close-up video for previewing by the user.

In this way, after the protagonist is selected, the user can not only obtain the close-up video focusing on the protagonist but also obtain the original video recorded based on the raw image displayed in the preview window.

In particular, by implementing the shooting method provided in this embodiment of this application, the terminal 100 may determine a protagonist in a rear image frame by calculating a similarity distance between each object in the rear image frame and a protagonist in a front image frame, to implement protagonist tracking in a multi-object scenario. A smaller similarity distance between an object in the rear image frame and the protagonist in the front image frame indicates that the object is more similar to the protagonist. An object that has a minimum similarity distance to the protagonist in the front image frame that meets a minimum similarity distance threshold is the protagonist in the rear image frame. The similarity distance is obtained based on a similarity and/or an image intersection over union IoU, and is an index reflecting an image content similarity. In this embodiment of this application, the similarity distance includes an IoU distance, a ReID distance, or a sum of an IoU distance and a ReID distance.

The following specifically describes a schematic user diagram of implementing, by the terminal 100, the shooting method provided in the embodiment of this application.

Figure 1A:
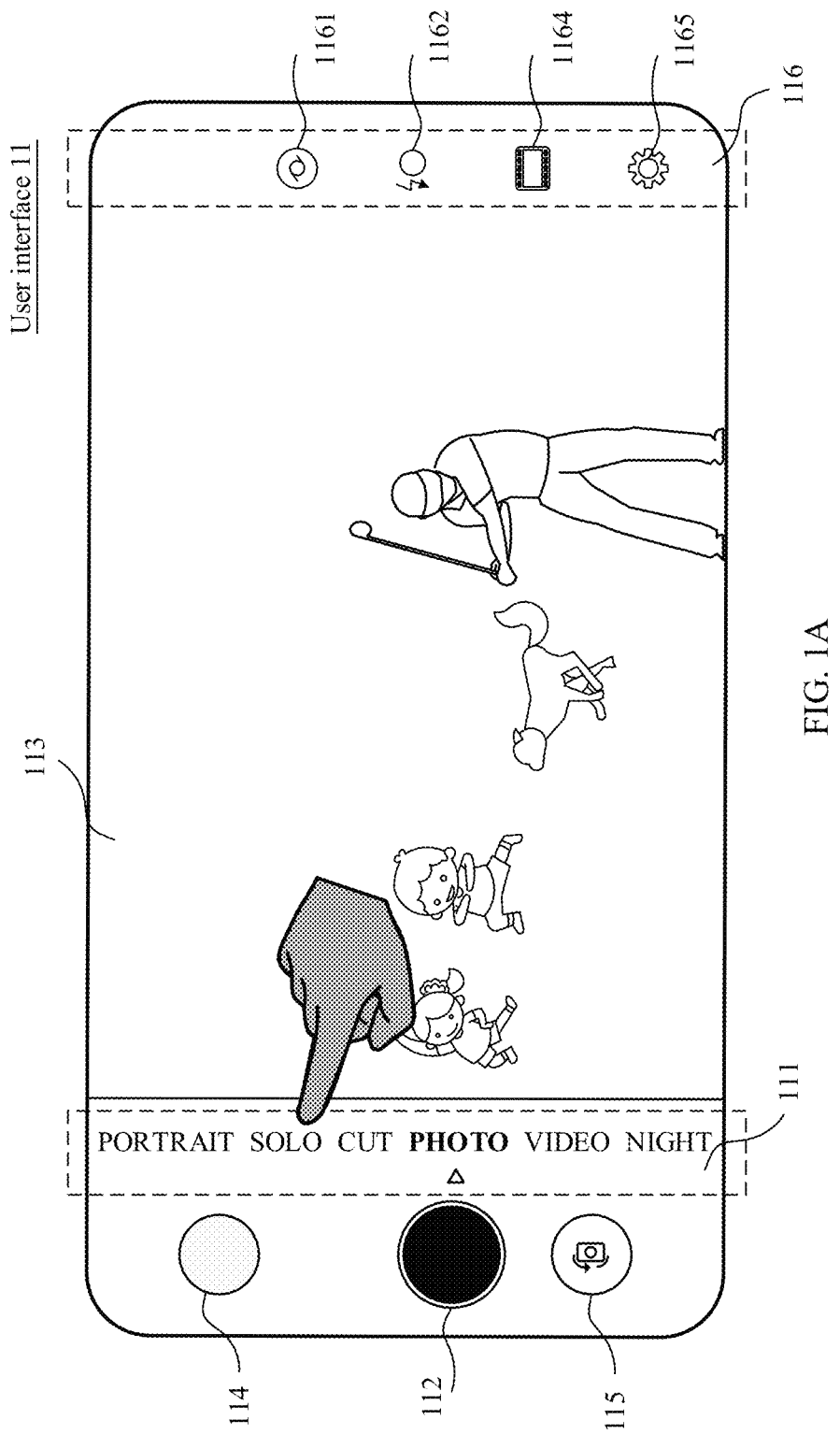
FIG. 1A-FIG. 1O are schematic diagrams of a group of user interfaces according to an embodiment of this application.

First, FIG. 1A shows an example of a user interface 11 in which a terminal 100 enables a camera to perform a shooting action.

As shown in FIG. 1A, the user interface 11 may include a menu bar 111, a shooting control 112, a preview window 113, a playback control 114, and a switching control 115.

A plurality of shooting mode options may be displayed in the menu bar 111, for example, "NIGHT", "VIDEO", "PHOTO", and "PORTRAIT" shooting modes. The NIGHT mode may be used to shoot a photo in a scenario with dim light, for example, shoot a photo at night. The VIDEO mode may be used to record a video. The PHOTO mode may be used to shoot a photo in a daylight scenario. The PORTRAIT mode may be used to shoot a close-up photo of a person.

In this embodiment of this application, the menu bar 111 further includes a SOLO CUT mode. The SOLO CUT mode corresponds to the shooting method provided in this embodiment of this application. In a video shooting process, a protagonist in a video is determined and automatically tracked, and an original video and a protagonist close-up video in which the protagonist is used as a shooting center are saved.

The SOLO CUT mode in this application may be applied to scenarios such as a preview scenario, a recording process, a livestreaming scenario, and a video call. The preview scenario is a scenario in which a user enables a camera application and enables a recording mode, but does not tap a shutter key to start recording. The recording process is a process in which the user enables the camera application, enables the recording mode, and taps the shutter key to start recording to end recording. A preview box is displayed in interfaces in the preview scenario and the recording process, for example, a preview window 113 shown in FIG. 1D.

Figure 1B:
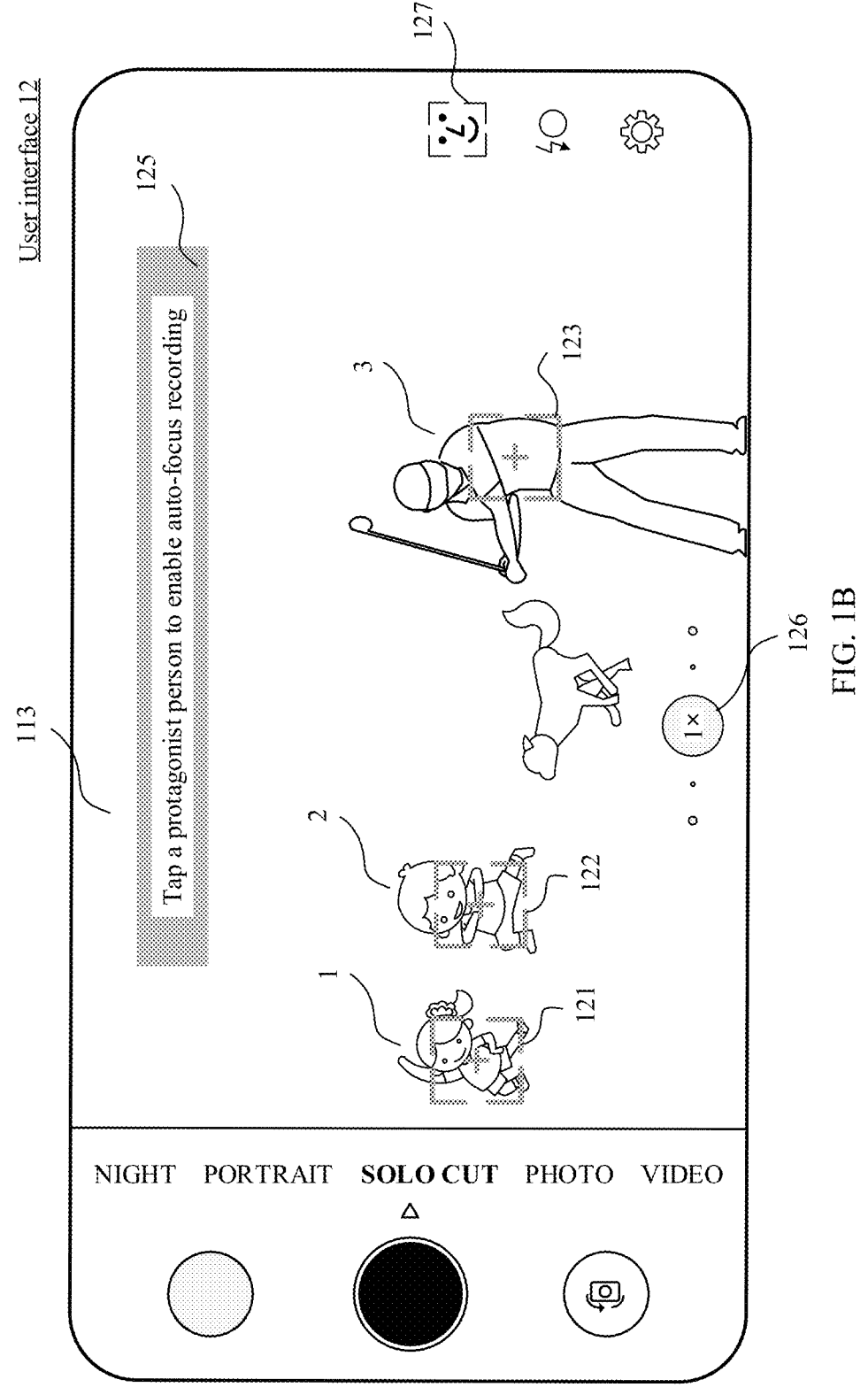
Figure 1C:
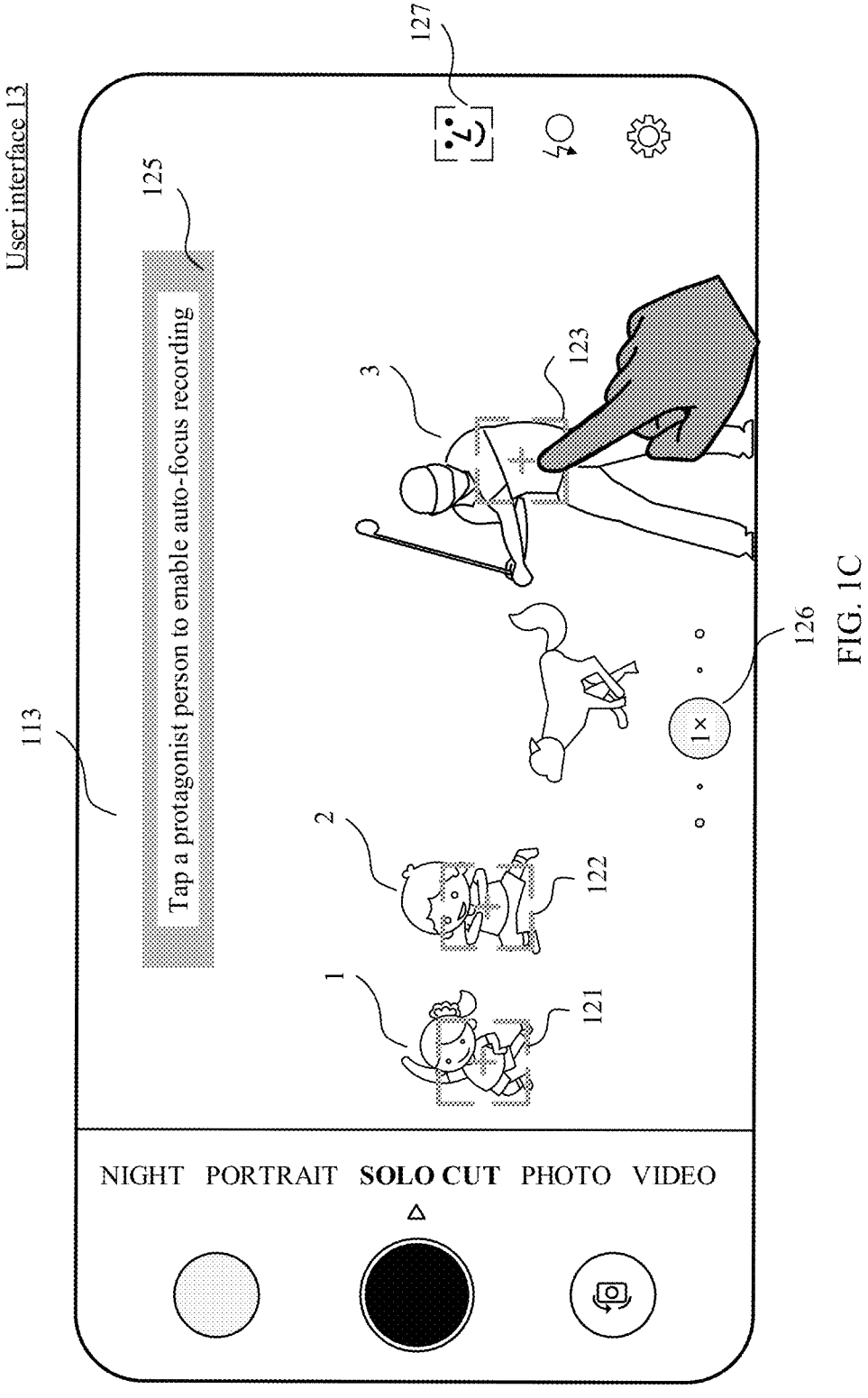
Figure 1D:
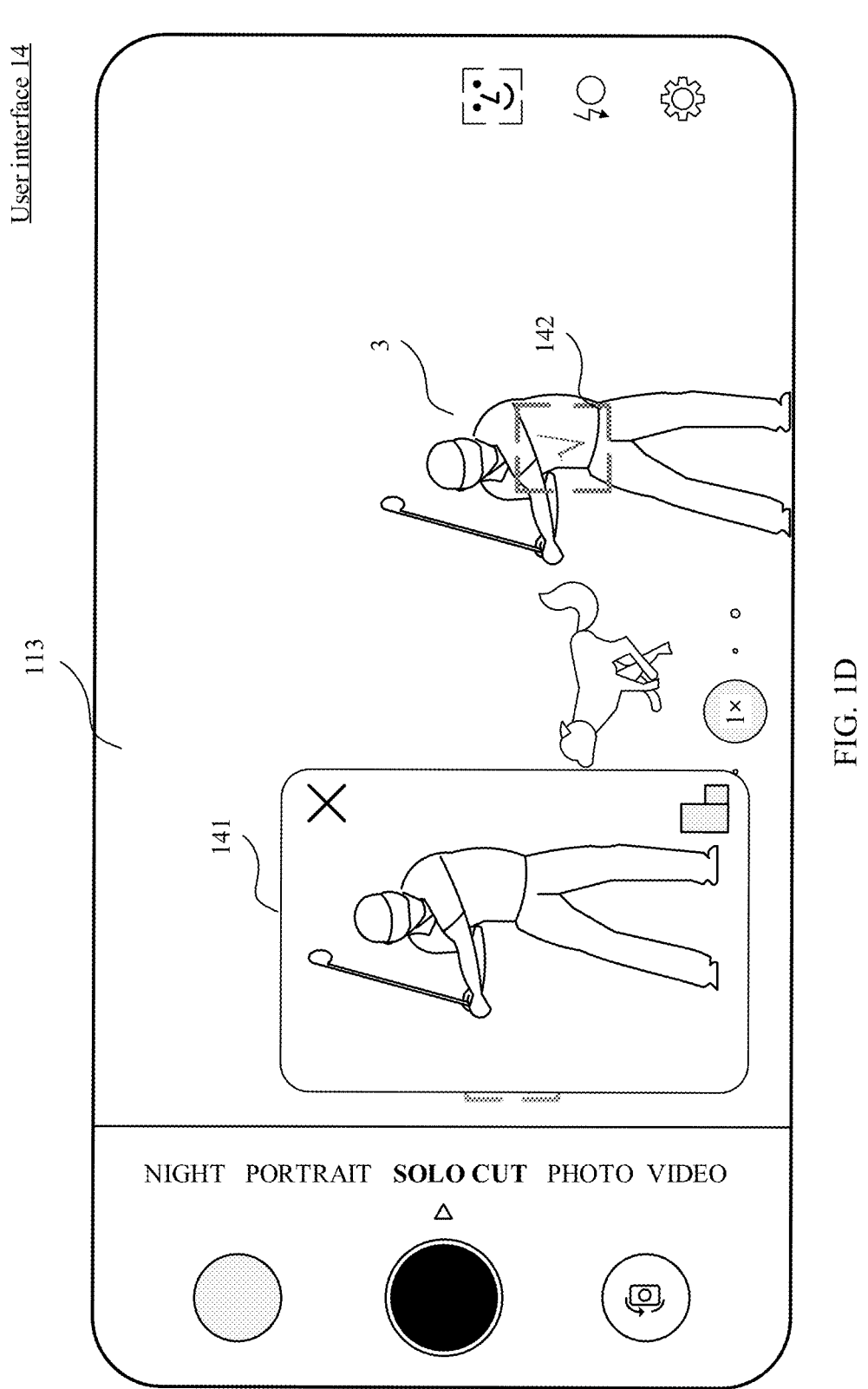

Optionally, when the SOLO CUT mode is enabled in the preview scenario, the interface may display the preview window 113 and a small window 141 shown in FIG. 1D. When the SOLO CUT mode is enabled in the recording process, the interface may also display the preview window 113 and the small window 141 in the recording process shown in FIG. 1D. Optionally, in the livestreaming scenario, when a streamer enables the SOLO CUT mode, a streamer interface may display the preview window 113 and the small window 141 shown in FIG. 1D. A viewer side may display content in the preview window 113, or may display content in the small window 141, or may display content in both the preview window 113 and the small window 141. This may be determined and changed by the streamer, or may be determined and changed by the viewer, or may be set by default and cannot be changed. Optionally, the video call scenario is similar to the livestreaming scenario. For example, a person A and a person B are on a video call, and the person A enables the SOLO CUT mode. In addition to the preview window 113 shown in FIG. 1D, an interface of the person A further includes a small window displaying the person B and the small window 141. The foregoing three may be switched for display. In addition to displaying a small window of the person A, an interface of the person B may further include content of the preview window 113 displaying the person A and content of the small window 141 displaying the person A. Alternatively, the interface of the person B includes two of the foregoing three. The windows may also be switched for display.

It may be understood that the preview scenario or the recording process is used as an example for description in this application. The method in a subsequently limited embodiment may also be applied to scenarios such as the livestreaming scenario and the video call. This is not limited in this application.

The shooting control 112 may be used to receive a shooting operation of the user. In a shooting scenario (which includes the PHOTO mode, the PORTRAIT mode, and the NIGHT mode), the shooting operation is an operation performed on the shooting control 112 for controlling shooting. In a video recording scenario (the VIDEO mode), the shooting operation includes a start recording operation and an end recording operation that are performed on the shooting control 112.

The preview window 113 may be used to display, in real time, an image frame sequence collected by the camera. A displayed image in the preview window 113 may be referred to as a raw image. In this embodiment of this application, after the shooting control 112 is tapped to start to record a video, a window used to display an image is also referred to as a preview window.

The playback control 114 may be used to view a photo or a video shot previously. Usually, the playback control 114 may be used to display a thumbnail of the previously shot photo or a thumbnail of a first frame of image of the previously shot video.

The switching control 115 may be used to switch a viewfinder camera in use. If a camera currently used for image collection is a front-facing camera, when detecting a user operation performed on the switching control 115, the terminal 100 may enable, in response to the operation, a rear-facing camera for image collection. Otherwise, if a camera currently used for image collection is the rear-facing camera, when detecting a user operation performed on the switching control 115, the terminal 100 may enable, in response to the operation, the front-facing camera for image collection.

The user interface 11 may further include a settings bar 116. A plurality of shooting parameter setting controls (shooting controls) may be displayed in the settings bar 116. One shooting control is used to set one type of parameters of the camera, thereby changing an image collected by the camera. For example, the shooting controls such as an "aperture" 1161, a "flash" 1162, and a "filter" 1164 may be displayed in the settings bar 116. The "aperture" 1161 may be used to adjust a size of an aperture of the camera, thereby changing picture brightness of an image collected by the camera. The "flash" 1162 may be used to enable or disable a flash, thereby changing the picture brightness of the image collected by the camera. The "filter" 1164 may be used to select a filter style, thereby adjusting an image color. The settings bar 116 may further include a settings control 1165. The settings control 1165 may be used to provide more controls for adjusting shooting parameters of the camera or image optimization parameters, for example, a white balance control, an ISO control, a facial beautification control, and a body beautification control, thereby providing richer shooting services for the user.

By default, when the camera is enabled for shooting, the terminal 100 may first select the PHOTO mode. Refer to the user interface 11. In this process, the terminal 100 may detect a user operation performed on the menu bar 111 to select the SOLO CUT mode, for example, an operation of tapping an option of a SOLO CUT shooting mode or an operation of sliding the menu bar 111 to select the option of the SOLO CUT shooting mode. In response to the operation, the terminal 100 may determine to enable the SOLO CUT mode for shooting.

FIG. 1B shows an example of a user interface 12 of a terminal 100 for shooting in a SOLO CUT mode.

After the SOLO CUT mode is selected, the terminal 100 may perform image content identification (object identification) on the image collected by the camera to identify an object included in the image. The object includes but is not limited to a person, an animal, and a plant. In this embodiment of this application, a person is mainly used as an example for description in the following. While the terminal 100 displays, in the preview window 113, the image collected by the camera, the terminal 100 may further display a selection box on each identified object.

Referring to the user interface 12, an image collected by the camera at a moment includes a person 1, a person 2, and a person 3. After receiving the image collected and generated by the camera, before displaying the image, the terminal 100 may identify, by using a preset object identification algorithm, the object included in the image. Herein, the object identification algorithm may be a face recognition algorithm and a human body recognition algorithm. In this case, the terminal 100 may identify that the image includes three objects: the person 1, the person 2, and the person 3.

On the one hand, the terminal 100 may display, in the preview window 113, the image including the person 1, the person 2, and the person 3. On the other hand, the terminal 100 may further display a selection box on each object, for example, a selection box 121 corresponding to the person 1, a selection box 122 corresponding to the person 2, and a selection box 123 corresponding to the person 3. In this case, the user may determine a video protagonist by using the selection boxes.

In addition, the user interface 12 may further display a prompt 125, for example, "tap a protagonist person to enable auto-focus recording". The prompt 125 is used to determine the video protagonist. According to the prompt 125, the user may tap any one of the selection boxes. An object corresponding to a selection box on which a tap operation of the user is performed is the video protagonist determined by the user.

In some examples, not limited to the persons 1, 2, and 3 introduced in the user interface 12, the terminal 100 further supports identifying types of objects such as an animal and a plant. Correspondingly, the object identification algorithm further includes an identification algorithm for one or more types of animals and an identification algorithm for one or more types of plants. This is not limited in this embodiment of this application.

The user interface 12 (a shooting interface in the SOLO CUT mode) may further include a focal length control 126 and a facial beautification control 127. The focal length control 126 may be used to set a focal length of the camera to adjust a viewfinder range of the camera. When the viewfinder range of the camera changes, an image displayed in the preview window correspondingly changes. The facial beautification control 127 may be used to adjust a face image of a person in an image. After detecting a user operation performed on the facial beautification control 127, the terminal 100 may perform facial beautification processing on the person in the image, and display, in the preview window, an image obtained after facial beautification processing. The user interface 12 may further display another shooting control. Details are not described herein.

When displaying the user interface 12 shown in FIG. 1B, the terminal 100 may detect a user operation performed on any selection box. In response to the operation, the terminal 100 may determine an object corresponding to the selection box as a protagonist. For example, referring to a user interface 13 shown in FIG. 1C, the terminal 100 may detect a user operation performed on a selection box 123. In response to the operation, the terminal 100 may determine the person 3 corresponding to the selection box 123 as a shot protagonist.

Then, the terminal 100 may display a small window in a picture-in-picture mode in the preview window 113, and display a close-up image of the person 3 in the small window. The close-up image is obtained by positioning a protagonist in a raw image based on the raw image (the image displayed in the preview window) and then performing cropping. In some other examples, the close-up image may alternatively be obtained by positioning a protagonist in a RAW image based on the RAW image and then performing cropping.

FIG. 1D shows an example of a user interface 14 of a terminal 100 for displaying a small window and displaying a close-up image of a person 3 in the small window.

As shown in FIG. 1D, the preview window 113 of the user interface 14 may include the small window 141. In this case, the close-up image of the person 3 may be displayed in the small window 141. As an image displayed in the preview window 113 changes, an image displayed in the small window 141 also correspondingly changes. In addition, an image displayed in the small window 141 is always a person 3-centered image. In this way, a video including the image displayed in the small window 141 is a close-up video of the person 3.

Optionally, the close-up image displayed in the small window 141 and the raw image displayed in the preview window 113 may alternatively come from different cameras. For example, the close-up image displayed in the small window 141 may be an image collected by a long-focus camera, and the raw image displayed in the preview window 113 may be an image collected by a wide-angle camera. A common camera and the wide-angle camera may collect images simultaneously. Images collected by the long-focus camera and the wide-angle camera may be corresponding to each other by using timestamps. In this case, the close-up image displayed in the small window 141 is obtained by cropping the image collected by the common camera. The image collected by the common camera corresponds to an image collected by the wide-angle camera displayed in the preview window 113 at a same moment. In this way, the user can browse a larger range of landscape in the preview window 113, and simultaneously, a protagonist image with more details is displayed in the small window 141. The foregoing wide-angle and long-focus are merely examples. A displayed image in the small window 141 may alternatively come from any camera such as a wide-angle camera, an ultra-wide-angle camera, a black and white camera, or a multi-spectral camera. Similarly, the image displayed in the preview window 113 may alternatively come from any camera such as the ultra-wide-angle camera, the long-focus camera, the black and white camera, or the multi-spectral camera.

After it is determined that the person 3 is the shot protagonist, the selection box 123 corresponding to the person 3 may become as shown in a check box 142 in FIG. 1D. The user may determine the selected shot protagonist by using the check box 142. Not limited to the check box 142 shown in the user interface 14, the terminal 100 may further display an icon of another style, to indicate that the person 3 is selected as the protagonist. For distinguishing, for example, the selection box 123 in FIG. 1C changes to red or blue.

After determining the protagonist, the terminal 100 may detect a user operation of starting shooting. After starting shooting, the terminal 100 may further detect a user operation of ending shooting. In response to the operations of starting shooting and ending shooting, the terminal 100 may save, as a video, an image frame sequence collected by the camera during the operations.

Figure 1E:
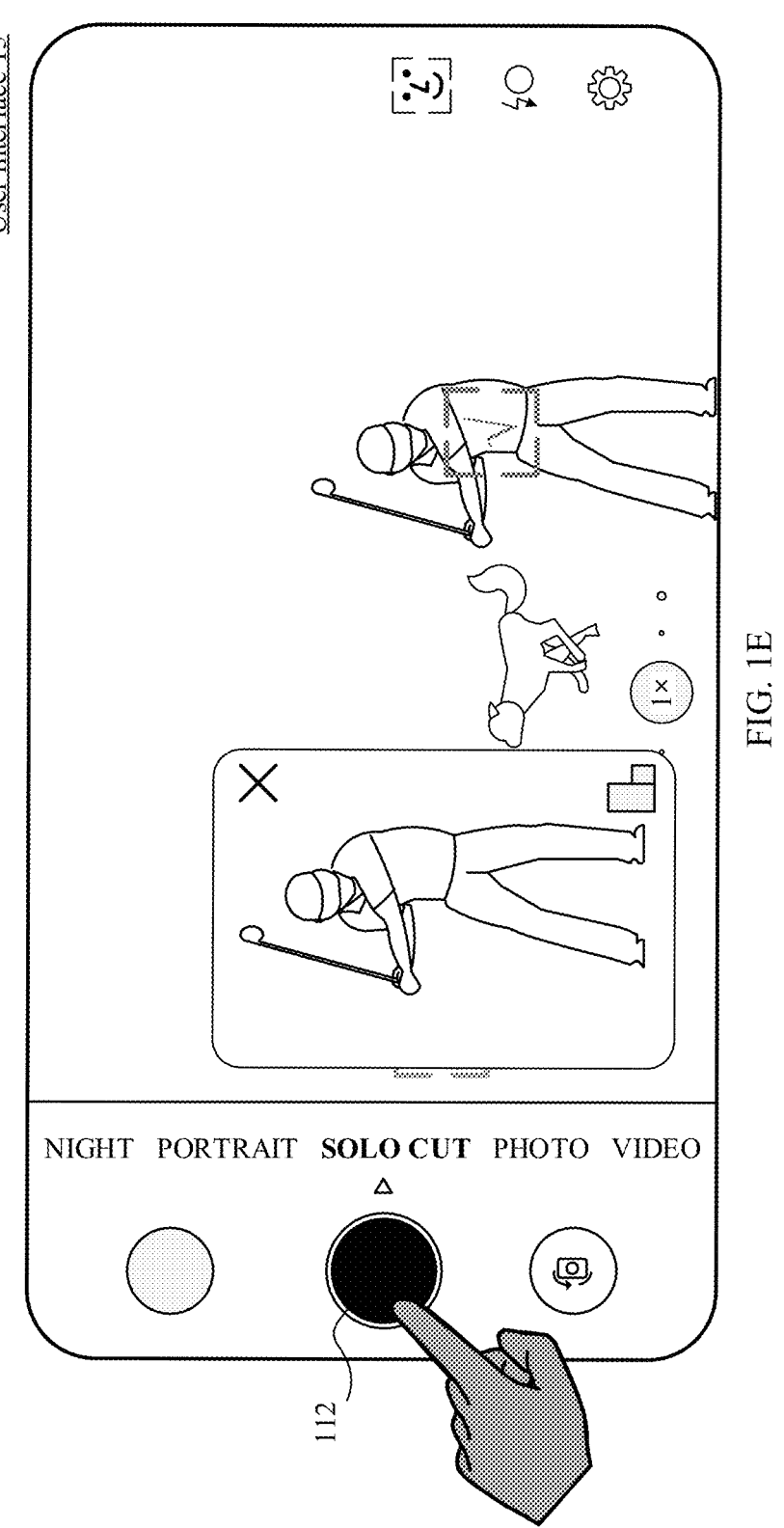

Referring to a user interface 15 shown in FIG. 1E, the terminal 100 may detect a user operation performed on the shooting control 112. The user operation performed on the shooting control 112 may be referred to as a user operation of starting shooting. In response to the user operation of starting shooting, the terminal 100 may write the image frame sequence collected by the camera to a specific storage space.

On the one hand, the terminal 100 may write the raw image (an uncropped image displayed in the preview window 113) collected by the camera to a specific storage space, to generate an original video. On the other hand, the terminal 100 may further write a protagonist-centered close-up image (the image displayed in the small window 141) to a specific storage space, to generate a close-up video.

Figure 1F:
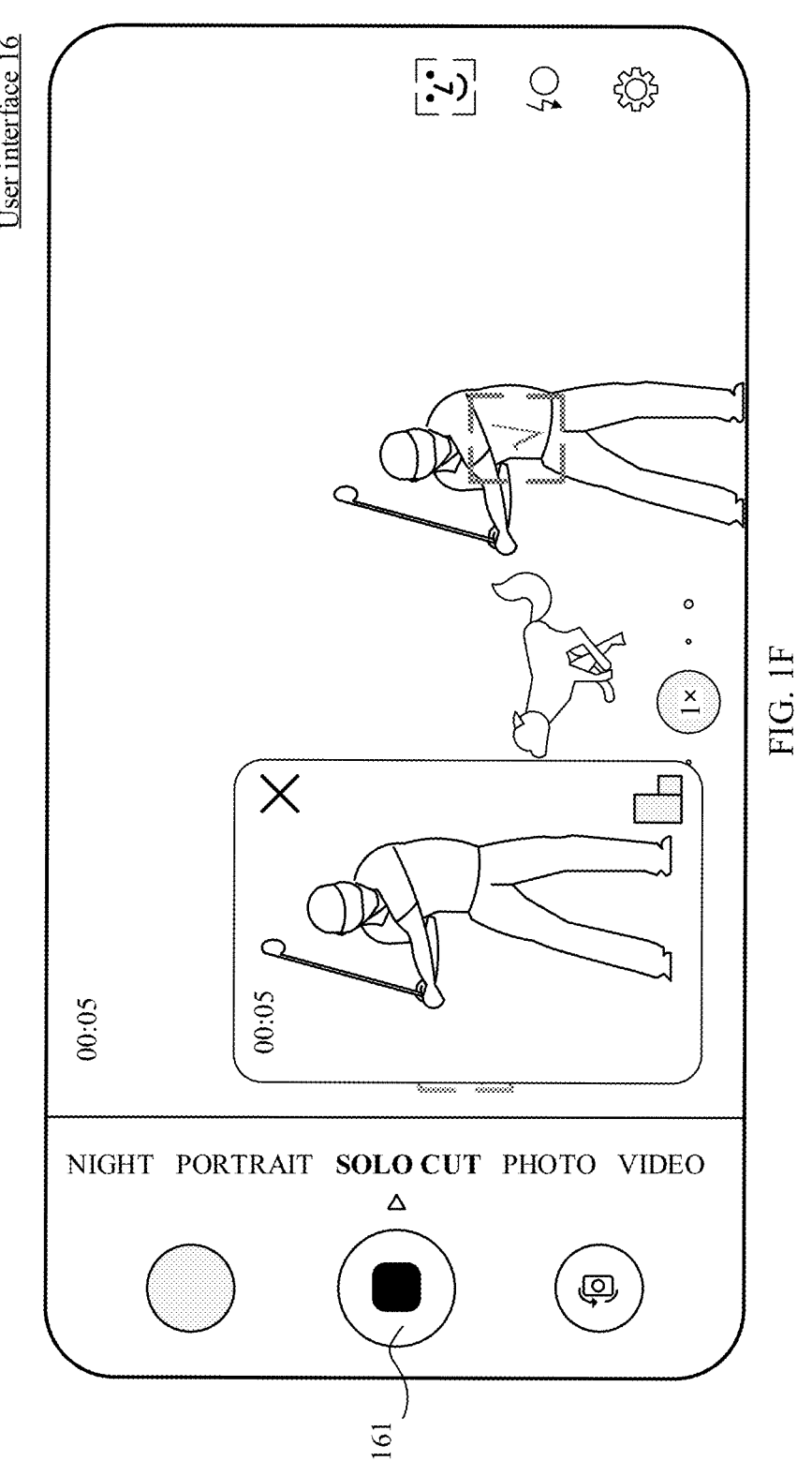

Referring to a user interface 16 shown in FIG. 1F, after detecting the user operation performed on the shooting control 112, the terminal 100 may change the shooting control 112 to a shooting control 161 on the user interface 16. The shooting control 161 may be used to indicate that recording is currently in progress.

Figure 1G:
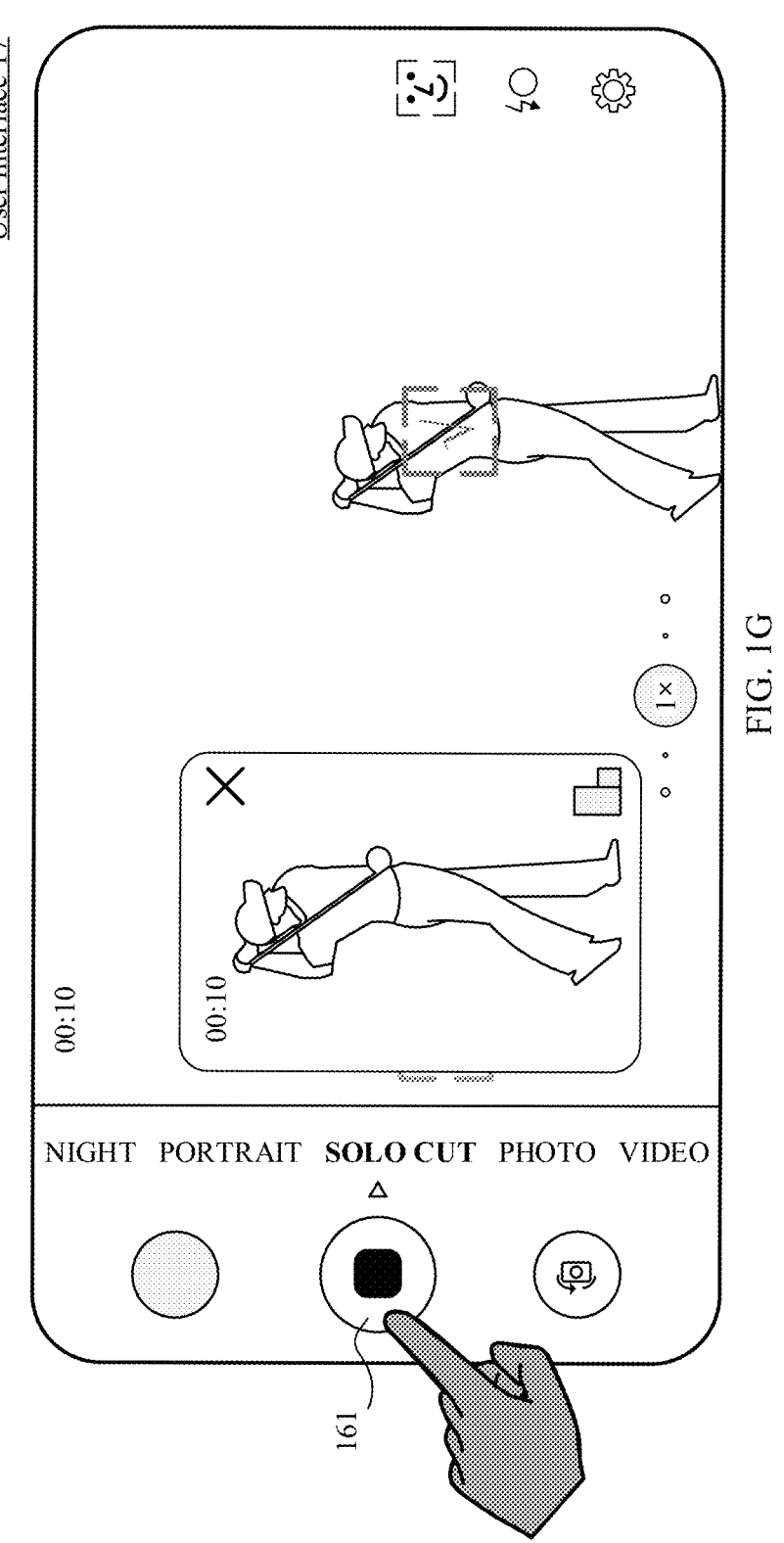

At a moment after shooting starts, the terminal 100 may detect a user operation performed on the shooting control 161, referring to a user interface 17 shown in FIG. 1G. The user operation performed on the shooting control 161 may be referred to as a user operation of ending shooting. In response to the user operation of ending shooting, the terminal 100 may save a raw image frame sequence as a video, namely, the original video. The original video may be saved in a memory or another storage space. The raw image frame sequence may be saved in the memory or the another storage space independently of the original video. In addition, the terminal 100 may further save a close-up image frame sequence as a video, namely, the close-up video. The close-up video may be saved in a memory or another storage space. A close-up video frame may be saved in the memory or the another storage space independently of the close-up video.

Figure 1H:
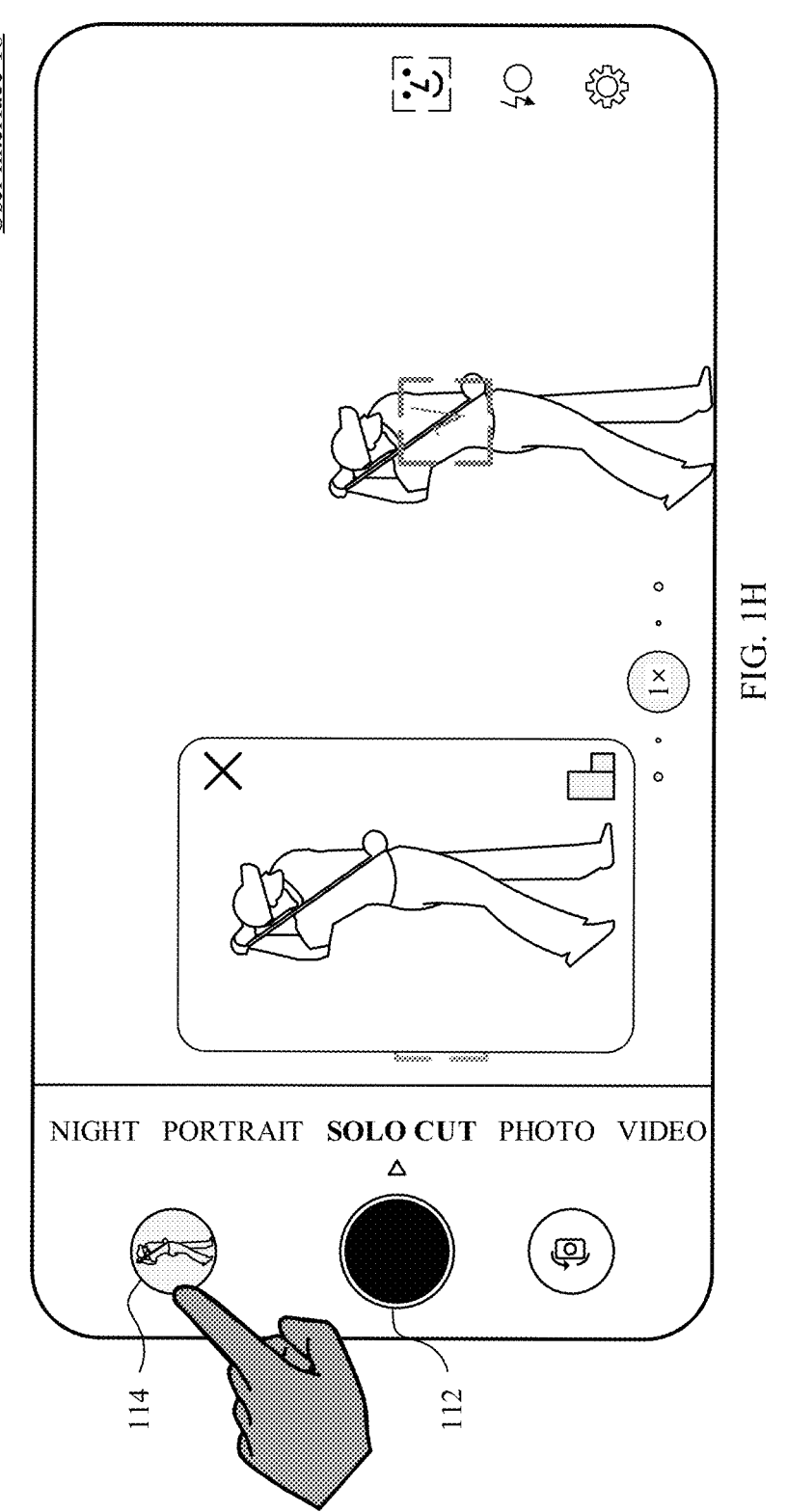

After detecting the user operation of ending shooting, the terminal 100 may display a user interface 18 shown in FIG. 1H.

As shown in the user interface 18, the terminal 100 may display, in the playback control 114, an identifier representing the original video and the close-up video. Usually, the identifier may be a thumbnail of the first frame of image, a thumbnail of the last frame of image, or a cover of the original video, or a thumbnail of the first frame of video, a thumbnail of the last frame of image, or a cover of the close-up video.

In addition, after detecting the user operation of ending shooting, the terminal 100 may change the shooting control 161 to the shooting control 112, to indicate that the user ends video recording.

During displaying the user interface 18, the terminal 100 may detect a user operation performed on the playback control 114. In response to the operation, the terminal 100 may display a recently shot video. In this case, the recently shot video is the shown video shot in the SOLO CUT mode.

Figure 1I:
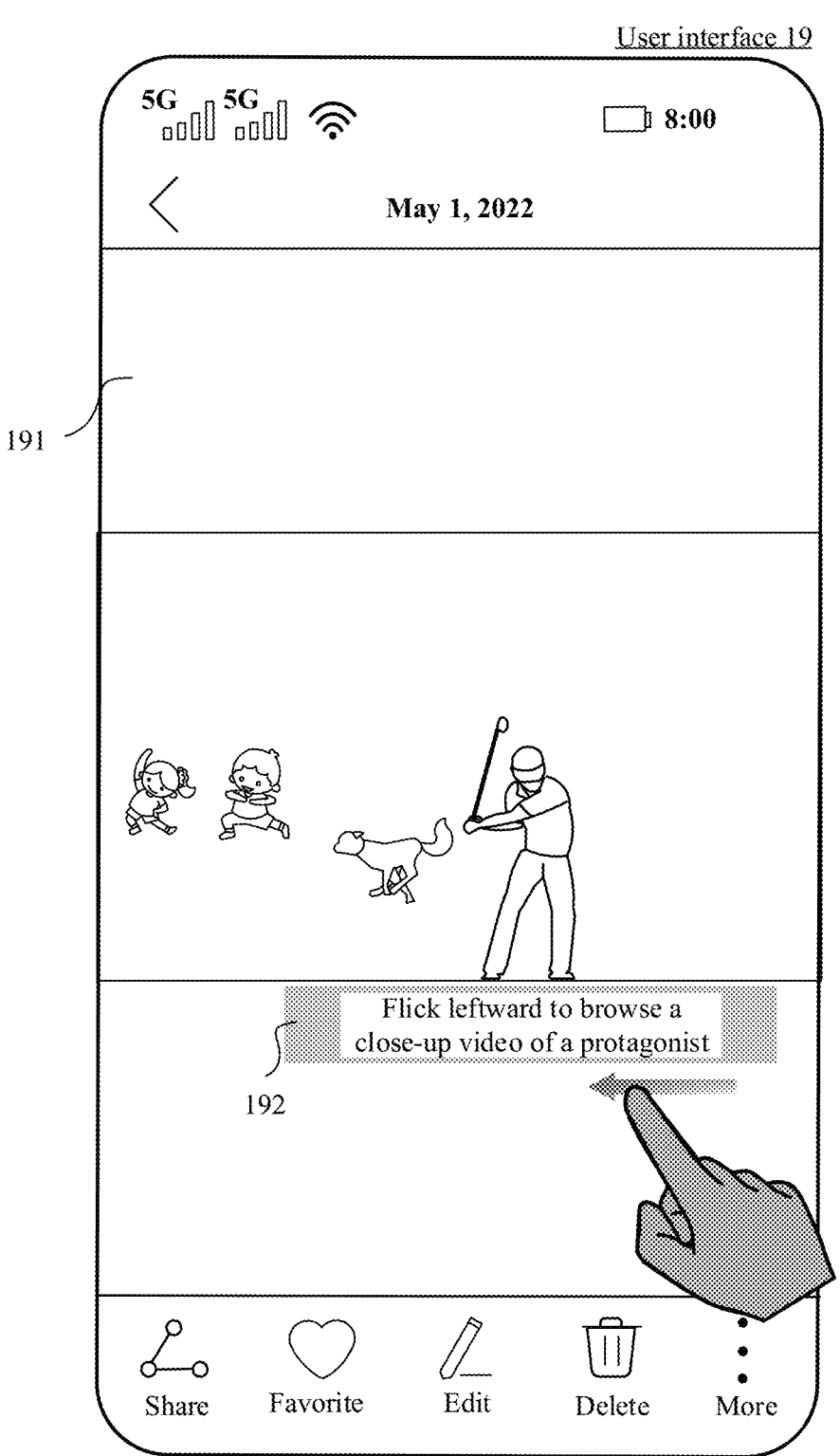

FIG. 1I shows an example of a user interface 19 of a terminal 100 for displaying a recently shot video.

The user interface 19 may include a window 191. The window 191 may be used to play the recently shot video. Optionally, the terminal 100 may first play, in the window 191, the original video shot in the SOLO CUT mode. In the foregoing process of browsing the original video, the terminal 100 may detect a leftward flicking operation. In response to the leftward flicking operation, the terminal 100 may display a user interface 20 shown in FIG. 1J. In this case, as shown in the user interface 20, the terminal 100 may play, in the window 191, the close-up video shot in the SOLO CUT mode.

In a process of playing the original video in the window 191, the terminal 100 may display a prompt 192. The prompt 192 is, for example, "Flick leftward to browse the close-up video of the protagonist". By using the prompt, the user may perform a leftward flicking operation, to obtain the close-up video.

Figure 1J:
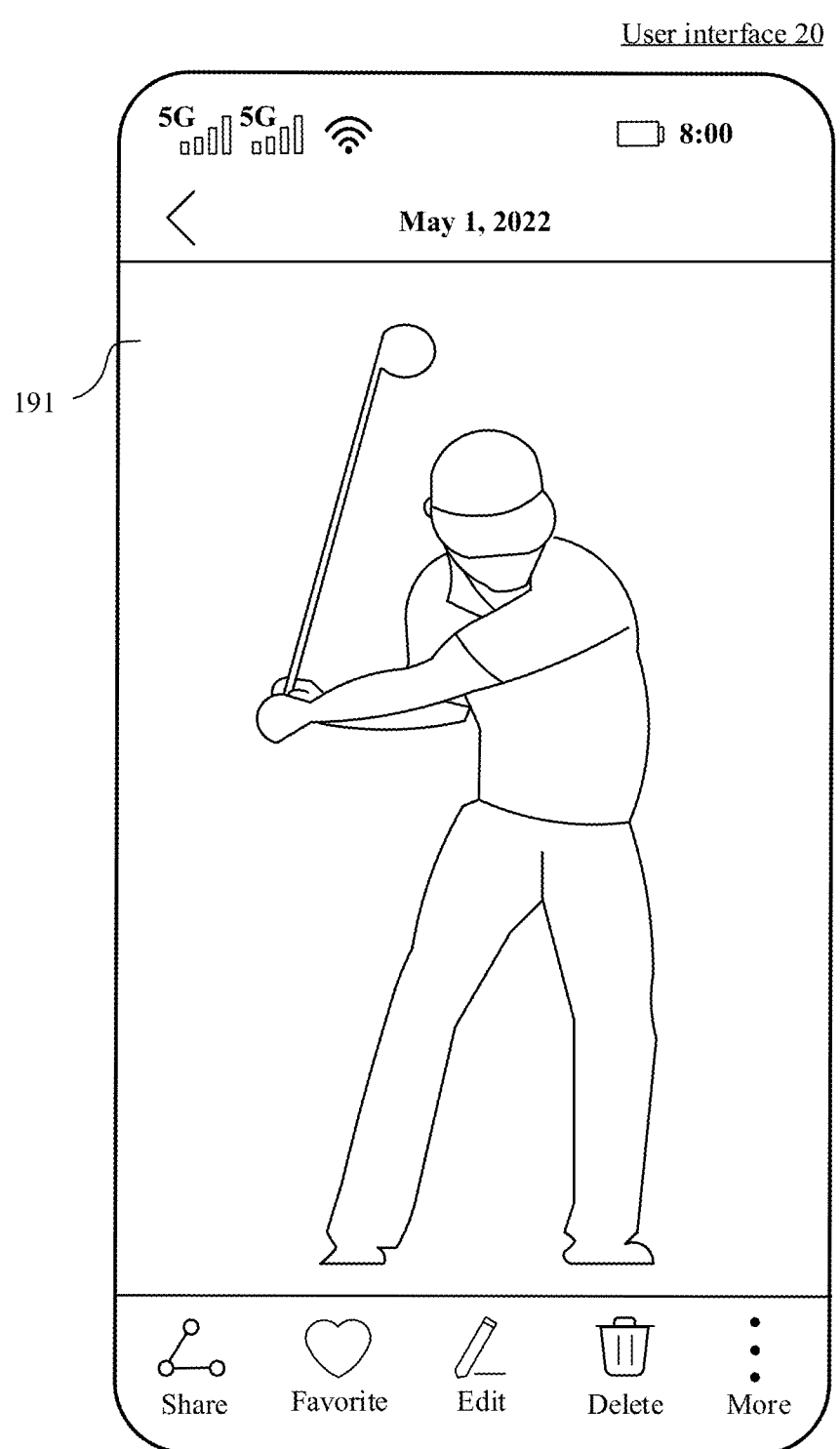
Figure 1K:
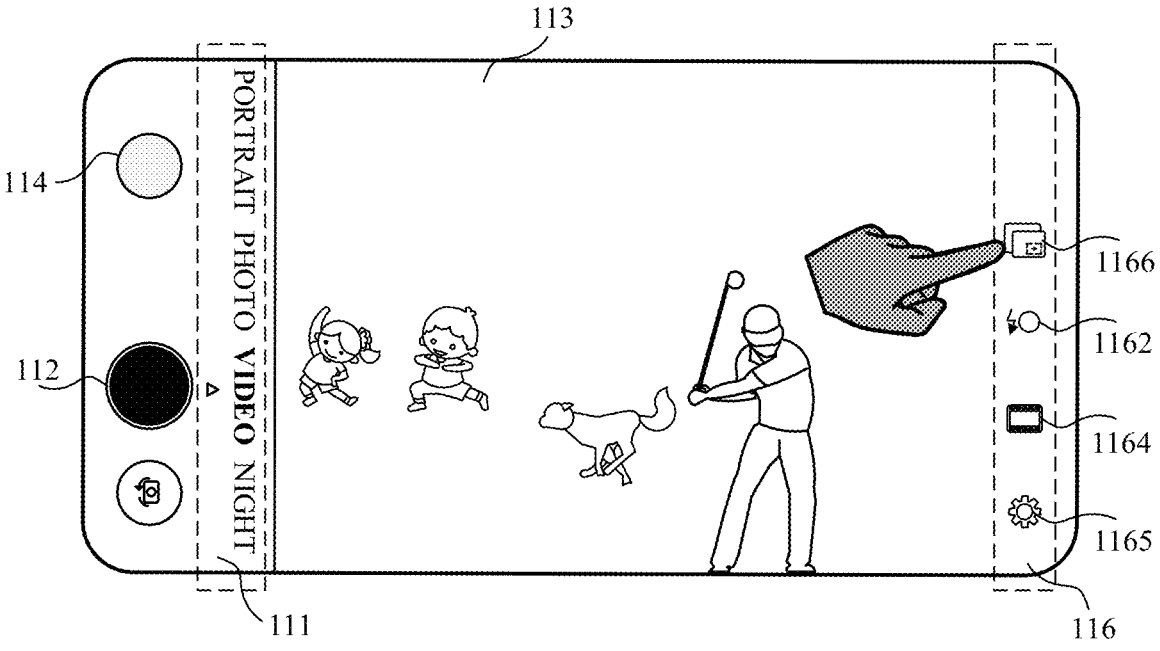
Figure 1L:
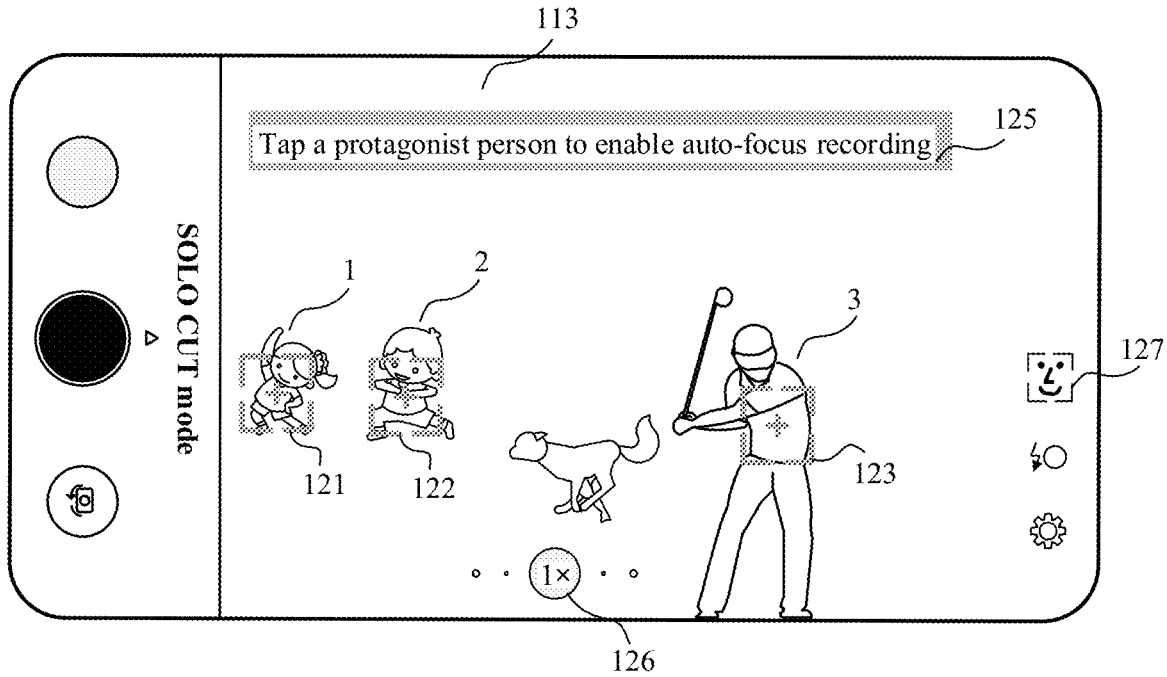

In some embodiments, the terminal 100 may also enable the SOLO CUT mode by using a method shown in FIG. 1K-FIG. 1L. As shown in FIG. 1K, a control used to enable the SOLO CUT mode may also be disposed in an interface of the VIDEO mode, for example, a control 1166. In the VIDEO mode, the terminal 100 may detect a user operation performed on the control 1166. In response to the operation, the terminal 100 may enable the SOLO CUT mode, referring to FIG. 1L.

Figure 1M:
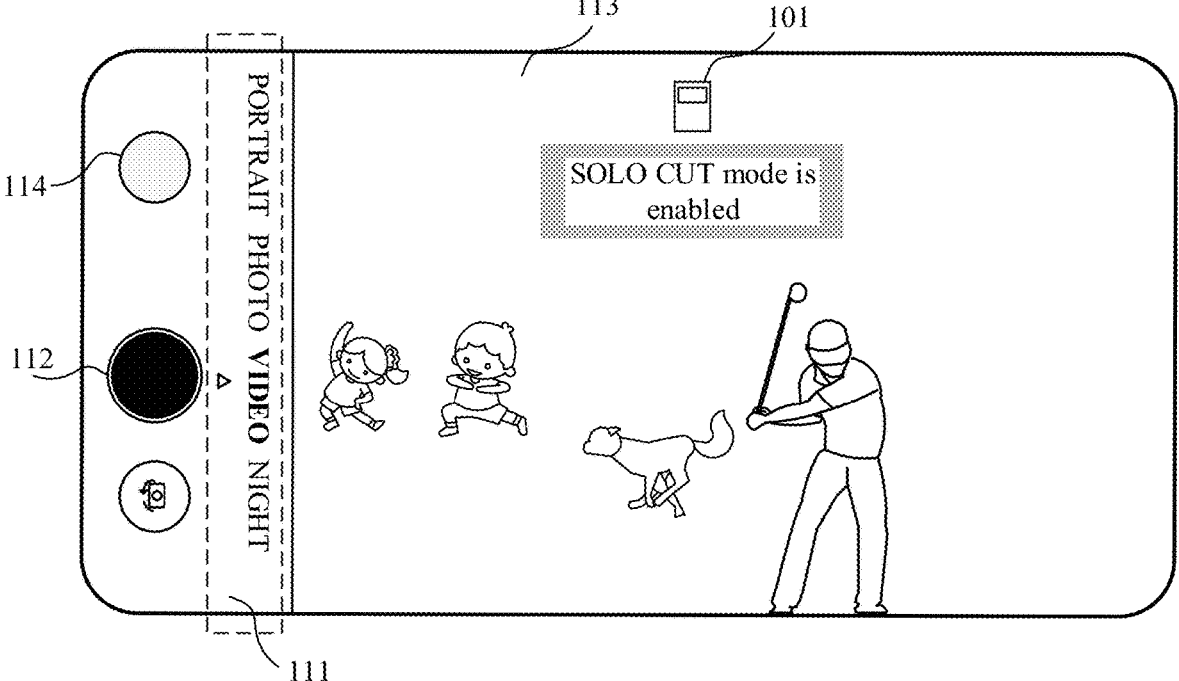
Figure 1N:
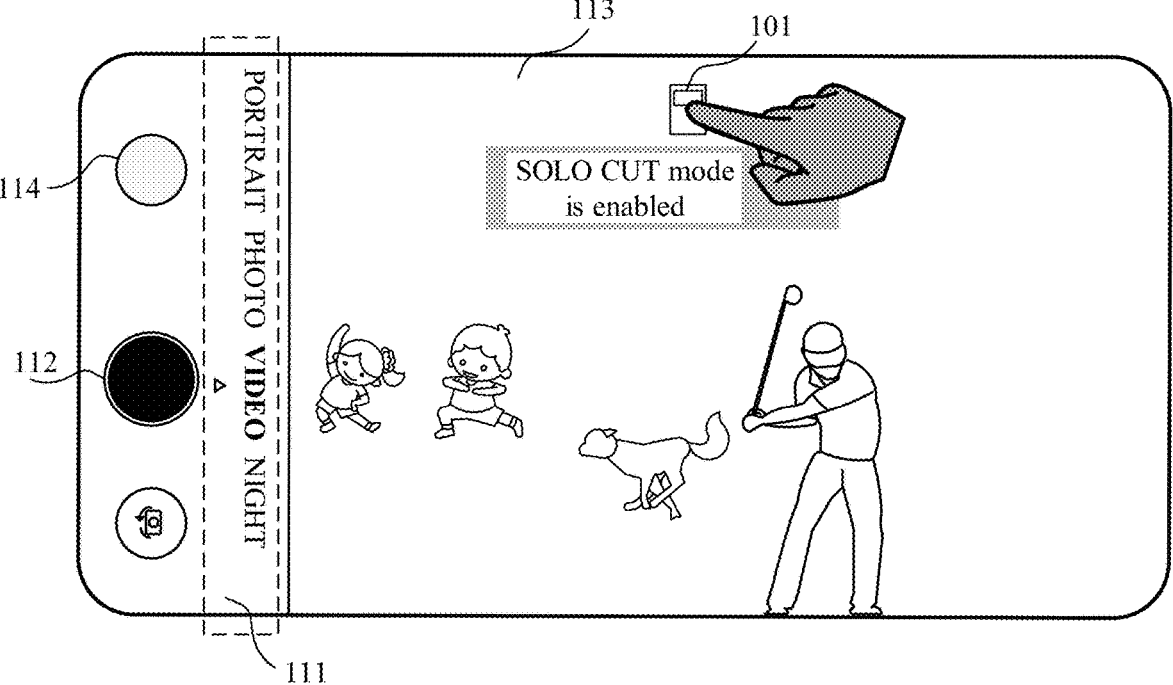
Figure 1O:
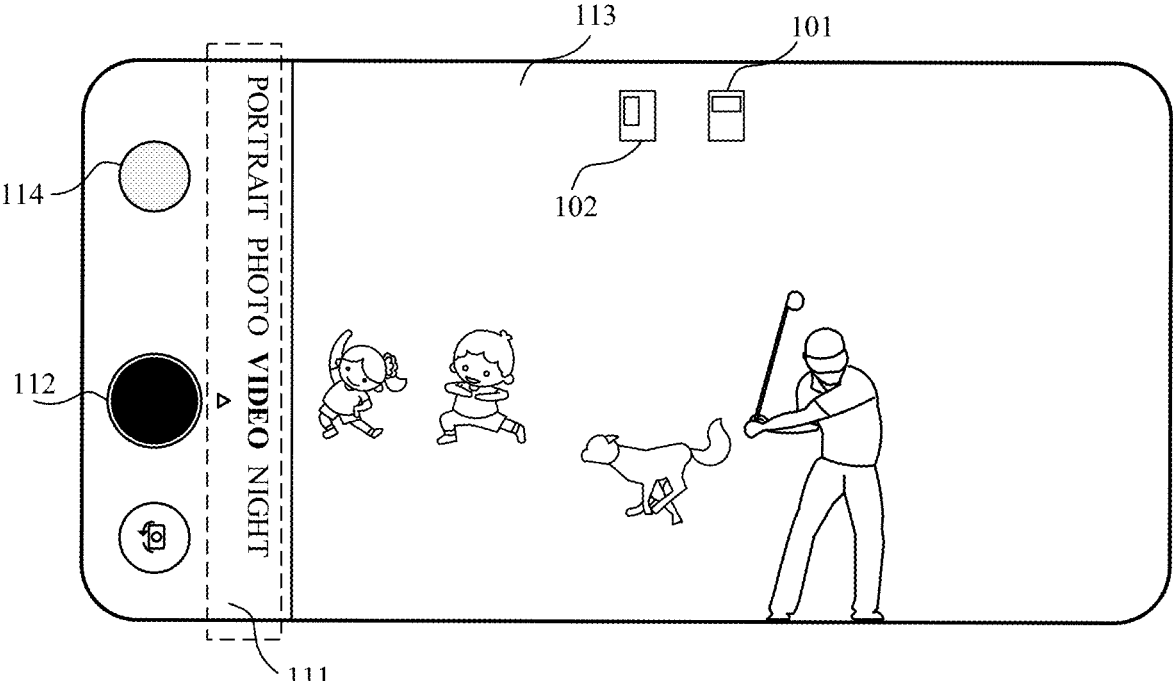

In some embodiments, the terminal 100 may also determine a display location of the small window based on a user operation when SOLO CUT is enabled. Referring to a user interface shown in FIG. 1K, after detecting a user operation of tapping the control 1166, the terminal 100 may display a user interface shown in FIG. 1M. In this case, a control 101 may be displayed in the preview window 113. The control 101 may indicate a display layout of the small window (the small window is displayed in lower left, lower right, upper right, upper left, or the like). Optionally, the layout may be a layout in which the user last uses the SOLO CUT mode, or may be a default layout. The user may directly use the layout to enable shooting in the SOLO CUT mode. Optionally, the user may alternatively switch the layout. For example, referring to a user interface shown in FIG. 1N, the terminal 100 may detect a user operation of tapping the control 101. In response to the operation, the terminal 100 may display a user interface shown in FIG. 1O. In this case, a control 102 may be further displayed in the preview window 113. The control 102 indicates a display layout of the small window different from that of the control 101. In this way, the user can switch a layout of the small window by using the control 102.

By using the shooting method shown in the SOLO CUT mode, the user may select a shot protagonist. In a video recording process, the terminal 100 may automatically track a protagonist motion track in an image. In the recording process, the terminal 100 may simultaneously display the original video and the close-up video. When saving videos, the terminal 100 may save two videos: the original video and the close-up video.

In this way, the user can obtain two videos in one recording process. The original video may retain all image content collected by the camera in the recording process. The close-up video may focus on displaying video content of the protagonist selected by the user.

In some embodiments, the terminal 100 may first detect the user operation of starting shooting that is performed on the shooting control 112, and start recording a video. In the video recording process, the terminal 100 may detect, in real time, an object included in the image, and display a selection box corresponding to each object. After detecting a user operation of tapping a selection box by the user, the terminal 100 may determine an object corresponding to the selection box as a protagonist, and display a small window displaying a close-up image of the protagonist. In addition, the terminal 100 may further record the close-up image in the small window.

In the foregoing method, a video length of the close-up video needs to be less than that of the original video.

Not limited to a recording scenario of the camera application, and the shooting method may be further applied to scenarios such as a video call or livestreaming. For example, during a video call, the user also selects a protagonist. Then, the terminal 100 may generate two image streams, and send the two image streams to a contact of the other party. In the livestreaming scenario, the user may also select a protagonist. Specifically, the protagonist may be an article. In this way, a user viewing livestreaming may see a raw image including a streamer, and may also browse to a close-up image of the protagonist (the article) selected by the streamer.

After performing the shooting operations shown in FIG. 1A-FIG. 1H, the terminal 100 may save the videos (the original video and the close-up video) obtained based on the shooting operations. The terminal 100 may provide a function of browsing a shot video. The user may browse the shot videos by using the browsing function provided by the terminal 100.

Figure 2A:
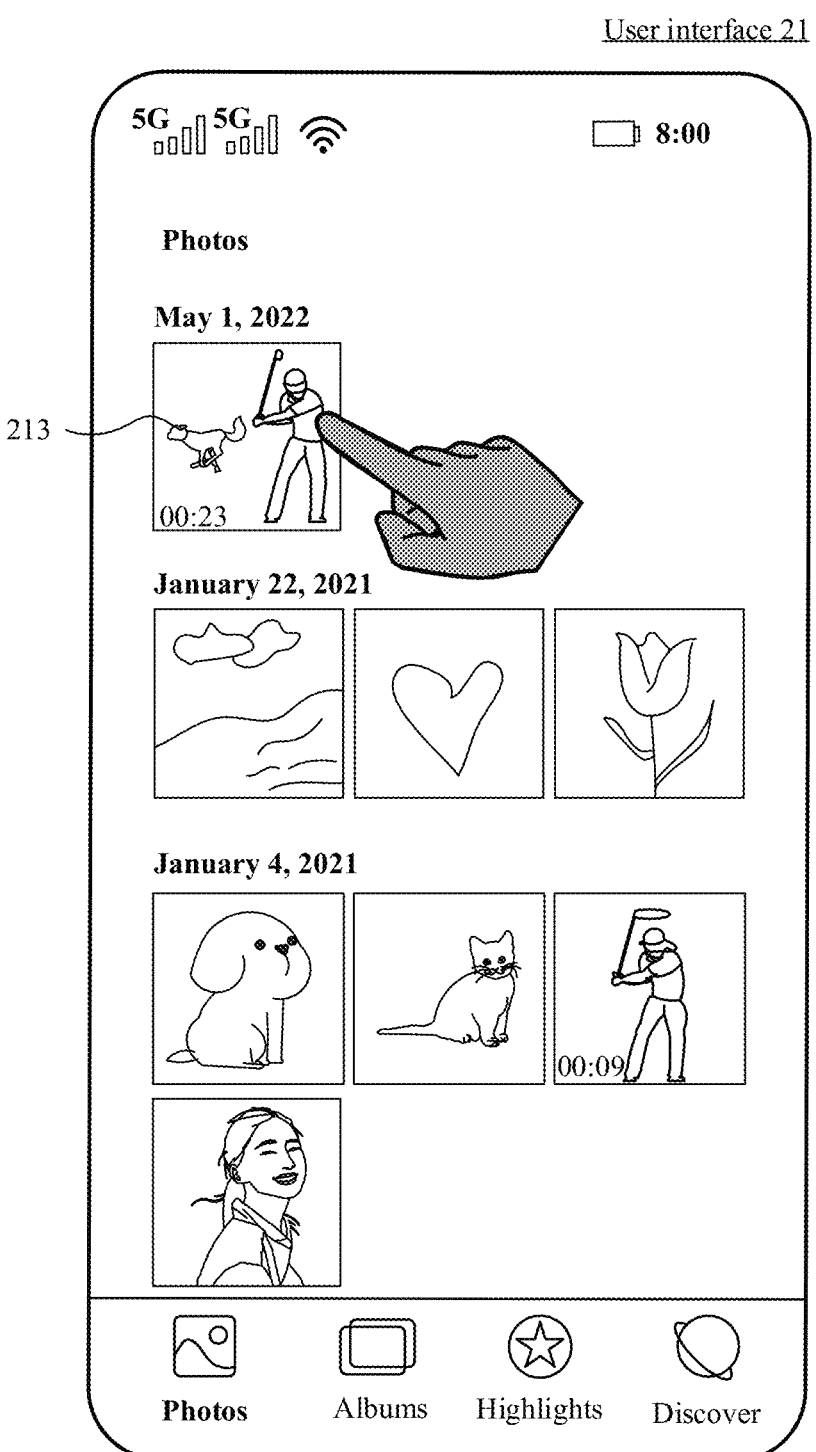
FIG. 2A-FIG. 2G are schematic diagrams of a group of user interfaces according to an embodiment of this application.

FIG. 2A shows an example of a user interface 21 of a terminal 100 for displaying a locally saved video and/or picture.

As shown in FIG. 2A, the user interface 21 may display a plurality of thumbnail icons. One thumbnail icon corresponds to a video or a picture obtained after one shooting operation. An icon 213 may correspond to the videos generated based on the shooting operations shown in FIG. 1A-FIG. 1H.

The terminal 100 may detect a user operation performed on the icon 213. In response to the operation, the terminal 100 may display the shot original video and the shot close-up video, referring to FIG. 2B.

Figure 2B:
Figure 2B:
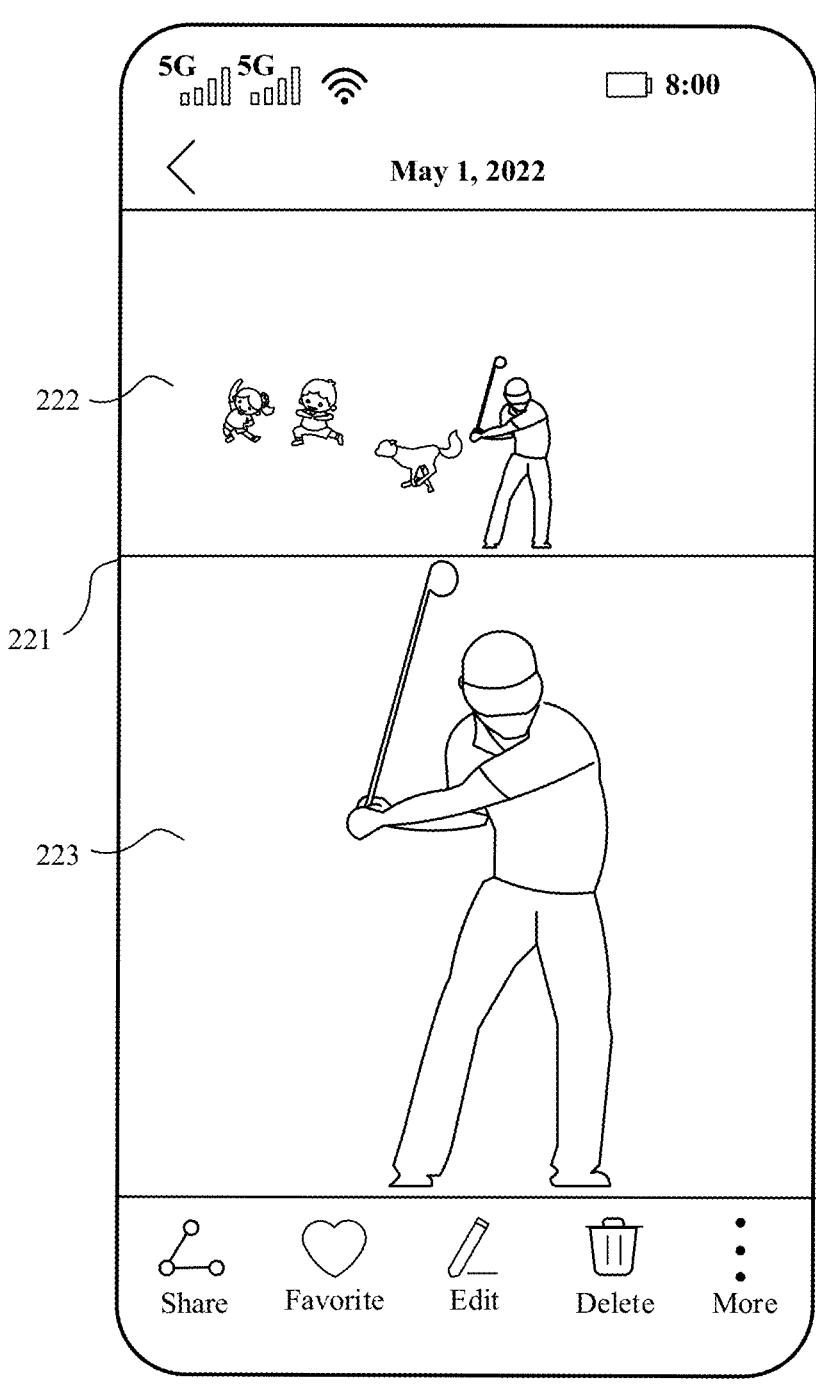

A user interface 22 shown in FIG. 2B may include a window 221. The window 221 may be used to display a shot video or picture. Herein, the window 221 displays the videos obtained based on the shooting operations shown in FIG. 1A-FIG. 1H. In this embodiment of this application, the videos shot in the SOLO CUT mode include the original video and the close-up video. In this case, the window 221 may display a video 222 and a video 223. The video 222 is an original video shot in the SOLO CUT mode. The video 223 is a close-up video shot in the SOLO CUT mode.

In some examples, when displaying the user interface 22, the terminal 100 may simultaneously play the video 222 and the video 223 (optionally, the video 222 and the video 223 may be respectively played in upper and lower directions as shown in FIG. 2B, or may be played in a picture-in-picture mode during recording). In this way, the user can simultaneously browse both the original video and the close-up video. In some examples, the terminal 100 may successively play the video 222 and the video 223 (optionally, play the video 222 before playing the video 223), for viewing by the user.

Optionally, on a basis of the user interface 22, the terminal 100 may detect a user operation, for example, a tap operation, performed on the video 222 or the video 223. The video 222 is used as an example. After detecting a tap operation performed on the video 222, the terminal 100 may display the user interface 19 shown in FIG. 1I, to further display the original video. Correspondingly, after detecting a tap operation performed on the video 223, the terminal 100 may display the user interface 20 shown in FIG. 1J, to further display the close-up video.

Optionally, on a basis of the user interface 21 shown in FIG. 2A, after detecting a user operation performed on the icon 213, the terminal 100 may alternatively directly display the user interface 19 shown in FIG. 1I, to display the original video. Then, after the leftward flicking operation is detected, the terminal 100 may display the user interface 20 shown in FIG. 1J, to display the close-up video.

Figure 2C:
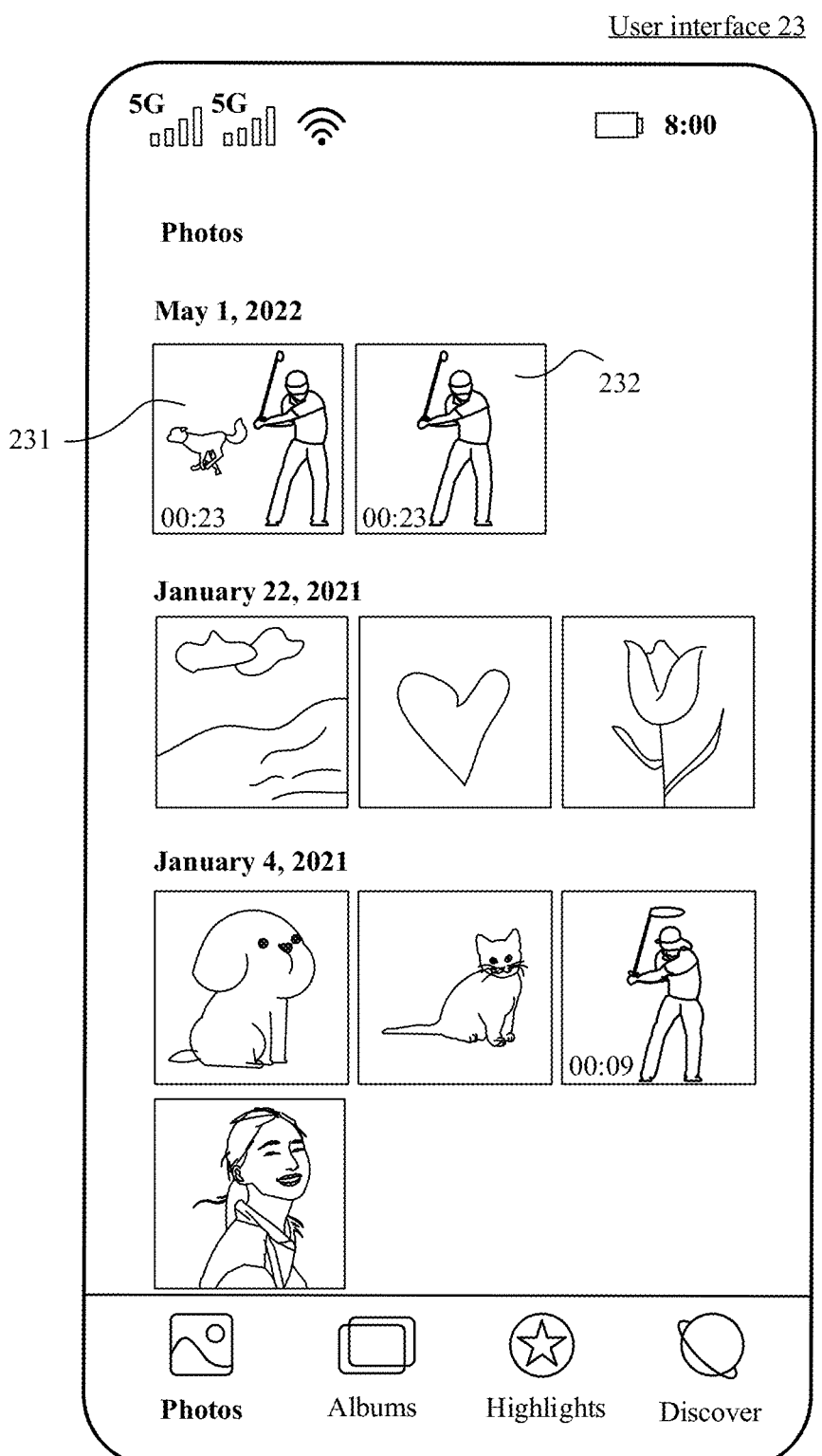

FIG. 2C shows an example of another user interface 23 of a terminal 100 for displaying a locally saved video and/or picture.

In the user interface 23, the terminal 100 may display two thumbnail icons, for example, an icon 231 and an icon 232. The two thumbnail icons respectively correspond to the original video and the close-up video that are shot in the SOLO CUT mode. For example, the icon 231 may correspond to the original video, and the icon 232 may correspond to the close-up video.

After detecting a user operation performed on the icon 231, the terminal 100 may display the user interface 19 shown in FIG. 1I, to display the original video. After detecting a user operation performed on the icon 232, the terminal 100 may display the user interface 20 shown in FIG. 1J, to display the close-up video.

Similarly, after the user interface 19 (the original video) shown in FIG. 1I is displayed, the user may browse the close-up video by using a leftward flicking operation or a rightward flicking operation. After the user interface 20 (the close-up video) shown in FIG. 1J is displayed, the user may browse the original video by using a leftward flicking operation or a rightward flicking operation.

In some embodiments, the terminal 100 may further switch a protagonist in a video recording process. Referring to a user interface 24 shown in FIG. 2D, the terminal 100 may detect a user operation performed on the selection box 122. In response to the operation, the terminal 100 may set the person 2 corresponding to the selection box 122 as a protagonist. Referring to a user interface 25 shown in FIG. 2E, after the person 2 is set as the protagonist, the terminal 100 may display a close-up image of the person 2 in the small window 141.

In a protagonist switching process, the small window 141 may directly display the close-up image of the switched person 2, presenting a jumping display effect. Optionally, the small window 141 may alternatively implement a non-jumping display effect of protagonist switching by using a smoothing policy. For example, after the protagonist is switched to the person 2, the terminal 100 may determine a group of smoothly moving image frames according to a path from the person 3 to the person 2 in the preview window 113, and then display the image frames in the small window 141, to implement non-jumping protagonist switching display. For example, the terminal 100 may further use a fixed transition effect to connect the close-up images of the protagonists before and after switching. The fixed transition effect is, for example, superposition, swirl, or translation commonly used in video editing. This is not limited in this embodiment of this application. Optionally, the switching process may be implemented in the preview scenario, may be implemented in the recording process, may be implemented in the livestreaming scenario, or may be implemented in a video call process.

With reference to the focal length control 126 described in FIG. 1B, when the focal length control 126 is used to switch a current focal length (or the camera), for a switching effect of the close-up image displayed in the small window 141, reference may also be made to a switching effect during role switching. For example, referring to user interfaces shown in FIG. 2F-FIG. 2G, when detecting that a current focal length is changed from 1× focal length (1×) to 2× focal length (2×), optionally, the terminal 100 may directly display, in the window 141, a close-up image obtained based on a 2× raw image. Optionally, the terminal 100 may further determine, based on the 1× raw image and the 2× raw image, a group of image frames with a gradual transition effect, to implement a non-jumping display effect of focal length switching in the small window 141. Optionally, the terminal 100 may alternatively implement the non-jumping display effect of focal length switching in the small window 141 by using the fixed transition effects such as superposition, swirl, and translation. Details are not described herein again.

Optionally, a window used to display the close-up image may further include a close control and a transpose control. The close control may be used to close the window. The transpose control may be used to adjust a size of the window.

Figure 3A:
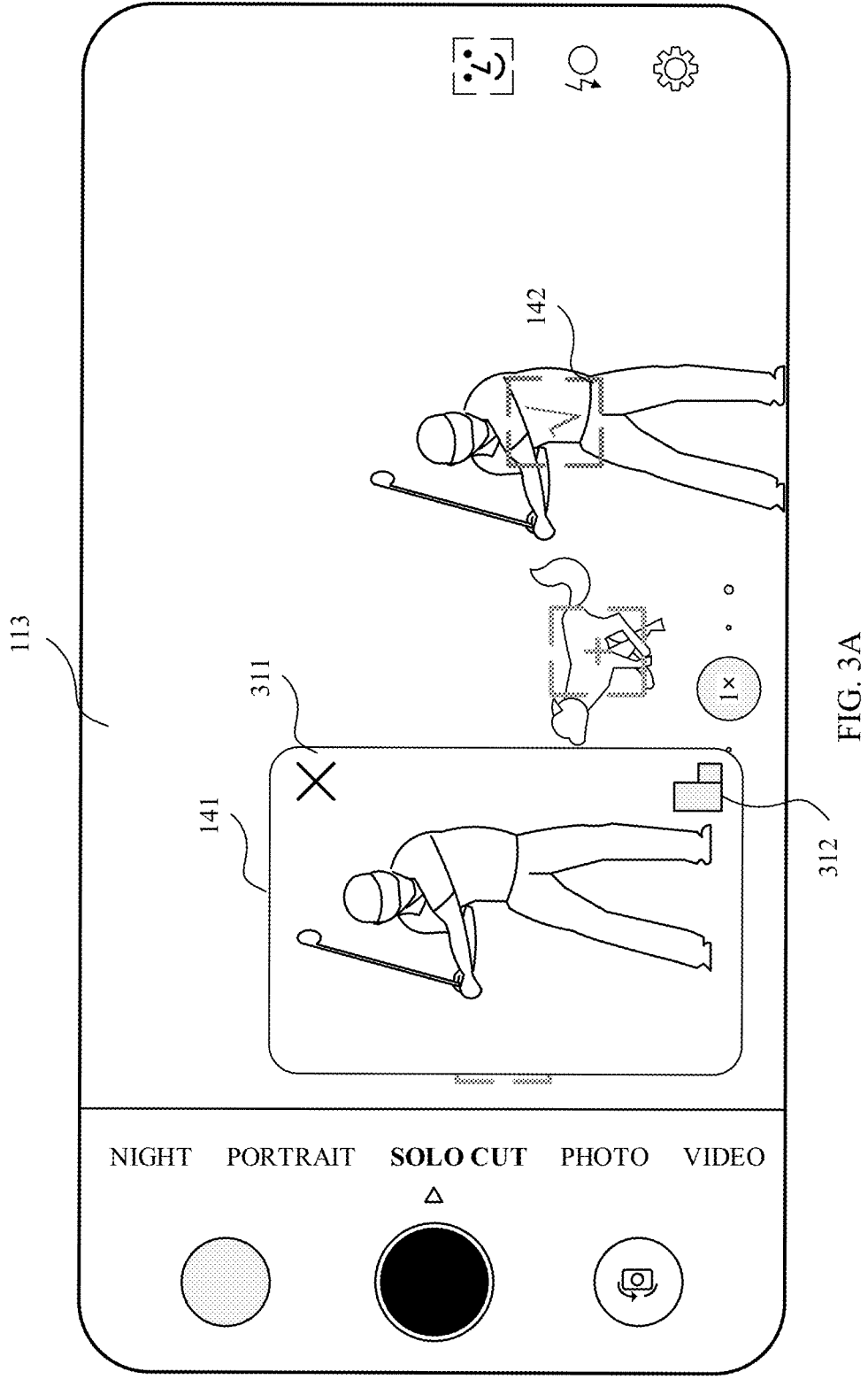
FIG. 3A-FIG. 3C are schematic diagrams of a group of user interfaces according to an embodiment of this application.

Referring to a user interface 31 shown in FIG. 3A, the small window 141 (a window for displaying a close-up image) may include a close control 311 and a transpose control 312. The close control 311 may be used to close the small window 141.

In some examples, after closing the small window 141, the terminal 100 may cancel a previously determined protagonist, for example, the person 3. Then, the terminal 100 may indicate the user to re-select a shot protagonist from the identified objects. In this case, the terminal 100 may display the small window 141 in the preview window 113 again based on a re-determined protagonist. In this case, the small window 141 displays a close-up image of a new protagonist.

In particular, after starting to record a video, the terminal 100 may save a recorded close-up video if detecting a user operation of closing the small window 141. Before recording ends, if an operation of selecting a protagonist by the user is detected again, the terminal 100 may re-generate a small window, display a close-up image of the protagonist, and record a new close-up video. After ending recording, the terminal 100 may separately save the close-up videos, or may merge the plurality of close-up videos into one.

Figure 3B:
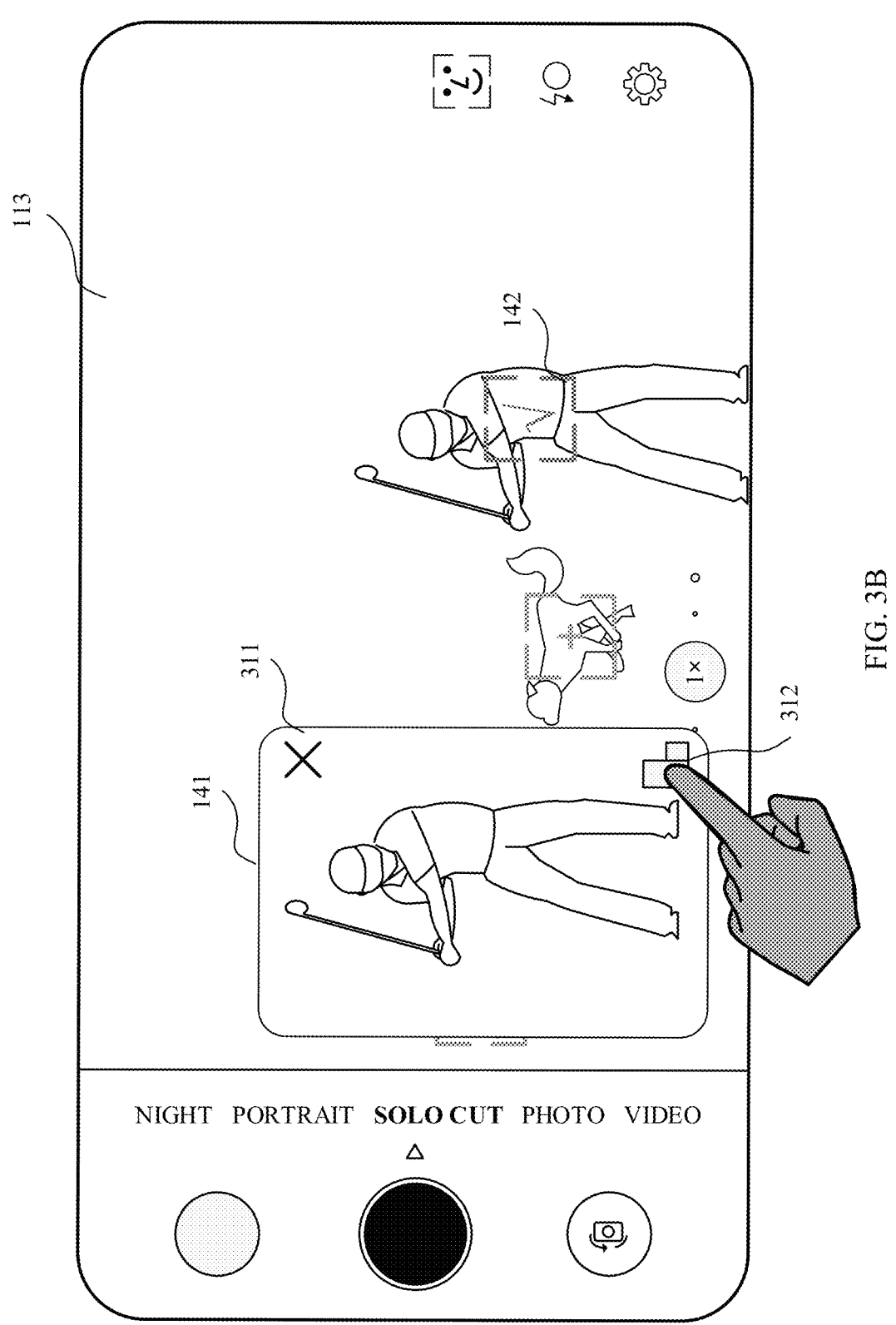
Figure 3C:
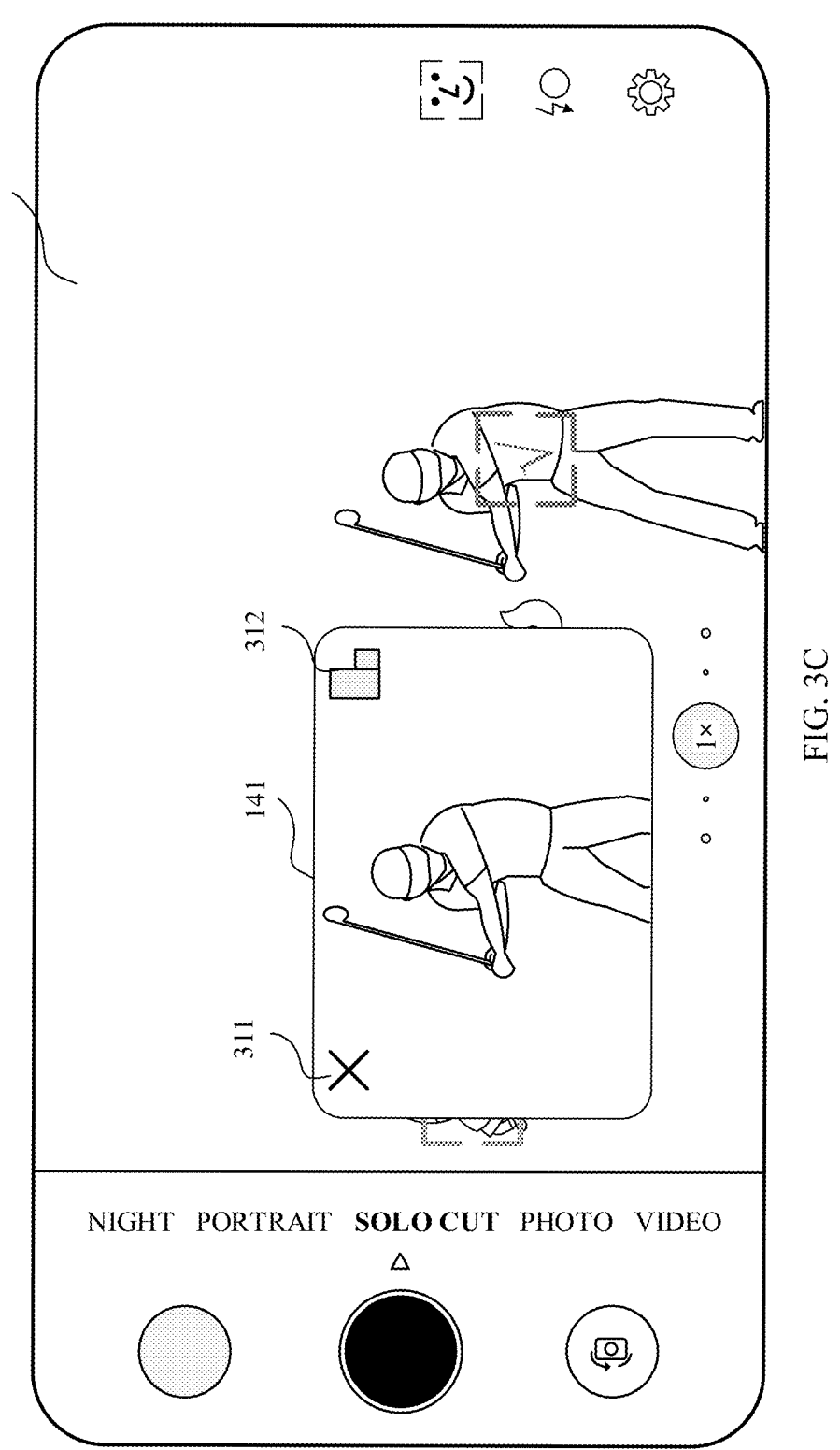
Figure 3D:
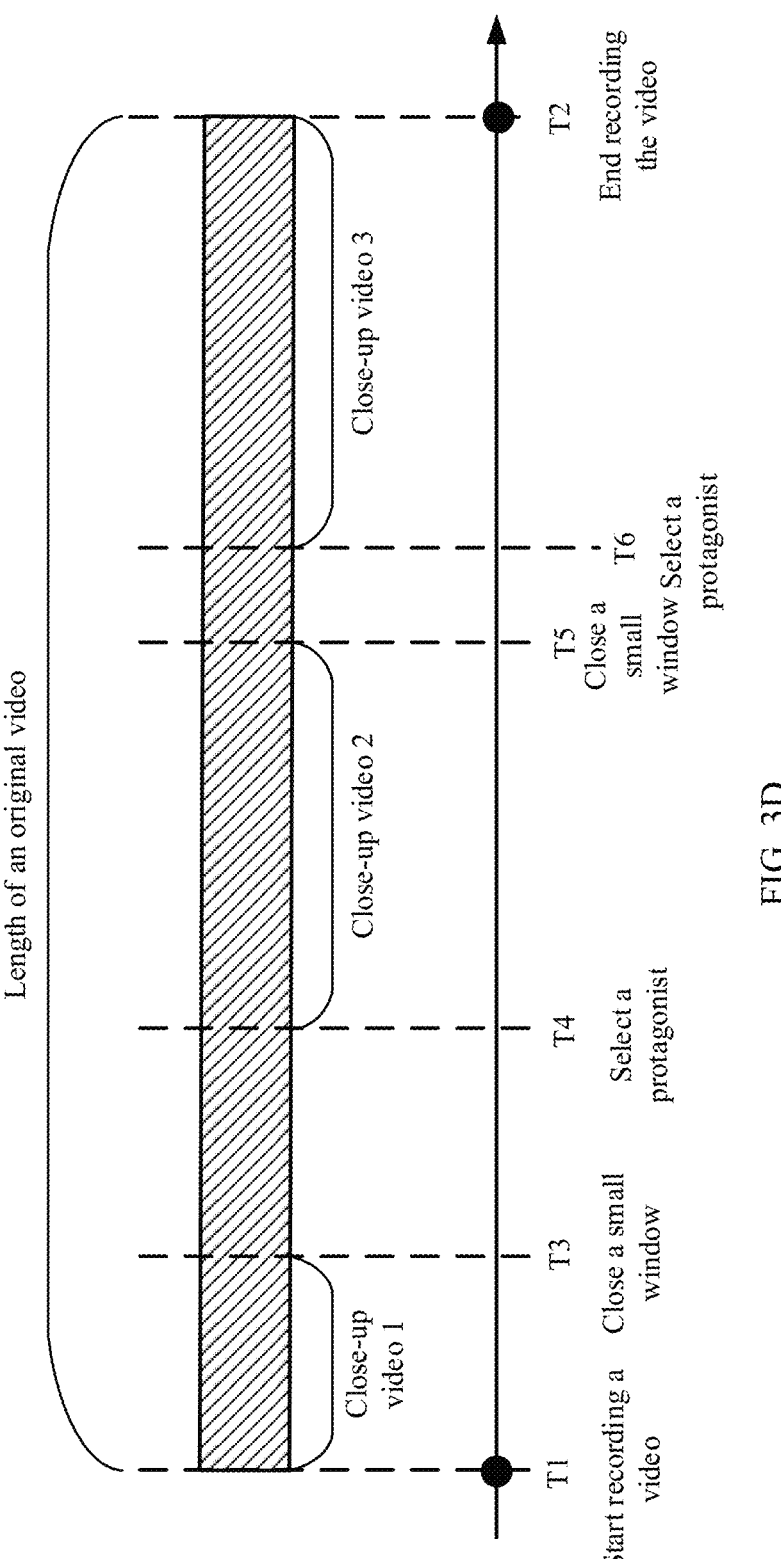
FIG. 3D is a schematic diagram of saving a close-up video according to an embodiment of this application.

Referring to FIG. 3D, in video recording time including T1-T2, the terminal 100 may detect, at T3, an operation of closing the small window; detect, at T4, an operation of tapping a selection box to select a protagonist; detect, at T5, an operation of closing the small window; and detect, at T6, an operation of tapping a selection box to select a protagonist. In this case, the terminal 100 may obtain close-up videos 1, 2, and 3. Optionally, the terminal 100 may separately save the three close-up videos. Optionally, the terminal 100 may save the three close-up videos as one. Optionally, each of the close-up videos 1, 2, and 3 may be respectively saved as one video, and the user may separately browse the close-up video 1, the close-up video 2, or the close-up video 3. Optionally, the terminal 100 may alternatively merge and save close-up videos of a same protagonist as one video according to a protagonist of each close-up video. For example, it is assumed that a protagonist of the close-up video 1 and a protagonist of the close-up video 2 are the person 1, and a protagonist of the close-up video 3 is the person 2. In this case, the terminal 100 may save the close-up video 1 and the close-up video 2 as one video, and save the close-up video 3 as one video.

In a scenario of saving a plurality of close-up videos, optionally, when the user browses the videos, the terminal 100 may separately display the plurality of close-up videos one by one, or may display the plurality of videos together. For displaying together, for example, the close-up videos 1, 2, and 3 may be simultaneously played in a same interface in proportion. Optionally, when one interface displays the plurality of close-up videos, the terminal 100 may simultaneously play close-up of different protagonists, and successively play videos of a same protagonist. For example, it is assumed that a protagonist of the close-up video 1 and a protagonist of the close-up video 2 are the person 1, and a protagonist of the close-up video 3 is the person 2. In this case, first, the terminal 100 may simultaneously play both the close-up video 1 and the close-up video 3. After the close-up video 1 is played, the terminal 100 may continue to play the close-up video 2.

Optionally, the original video may be displayed with the plurality of close-up videos. Corresponding to implementations appearing in the original video, the close-up videos are successively played.

In some examples, the close control 311 may be used to pause recording of a close-up video. In this case, the terminal 100 does not cancel the previously determined protagonist. After recording is paused, the close control 311 may be replaced with an enable control. Then, the terminal 100 may continue to record a close-up video centered on the protagonist.

In some other examples, after the small window 141 is closed, the terminal 100 does not display only the small window, that is, does not display the close-up image of the previously determined protagonist (the person 3). However, the terminal 100 still maintains the previously determined protagonist. In this case, the user cancels the selected protagonist person 3 by using an operation of tapping the check box 142, to re-select a new protagonist from the identified objects. Herein, the terminal 100 may close the small window after canceling the previously selected protagonist. After the new protagonist is determined, the terminal 100 may re-display the small window.

The transpose control 312 may be used to adjust a size of the small window 141.

Referring to a user interface 32 shown in FIG. 3B, the terminal 100 may detect a user operation performed on the transpose control 312. In response to the operation, the terminal 100 may display a user interface 33 shown in FIG. 3C. In the user interface 33, the small window 141 changes from an original vertical window (vertical window) to a horizontal window (horizontal window). In this way, the user can set a video effect of the close-up video by using transpose control 312 to meet a personalized requirement of the user.

Optionally, referring to FIG. 1D, after detecting a user operation of determining a protagonist (selecting the person 3), the terminal 100 may display the vertical window 141 by default. The close-up image of the person 3 is displayed in the vertical window 141. Optionally, the terminal 100 may also display, by default, the horizontal window shown in FIG. 3C. This is not limited in this embodiment of this application.

In some examples, the small window used to display the close-up image may be fixedly displayed at the lower left, referring to the small window 141 shown in FIG. 1D or FIG. 3C. In some examples, a display location of the small window may be further adjusted based on a location of the protagonist in the preview window, to avoid blocking the protagonist in the preview window.

Optionally, the terminal 100 may further adjust a location and a size of the small window based on a user operation.

For example, in some examples, the terminal 100 may further detect a long press operation and a drag operation that are performed on the small window 141. In response to the operations, the terminal 100 may move the small window to a location at which the drag operation of the user finally stops. In some other examples, the terminal 100 may further detect a double-tap operation performed on the small window 141. In response to the operation, the terminal 100 may zoom in or out the small window 141.

Not limited to the long press operation, the drag operation, and the double-tap operation described above, the terminal 100 may further control and adjust the location and the size of the small window by using gesture recognition and voice recognition. For example, the terminal 100 may identify, by using an image collected by the camera, that the user makes a first clenching gesture. In response to the first clenching gesture, the terminal 100 may zoom out the small window 141. The terminal 100 may identify, by using an image collected by the camera, that the user makes a hand-opening gesture. In response to the hand-opening gesture, the terminal 100 may zoom in the small window 141.

Figure 4A:
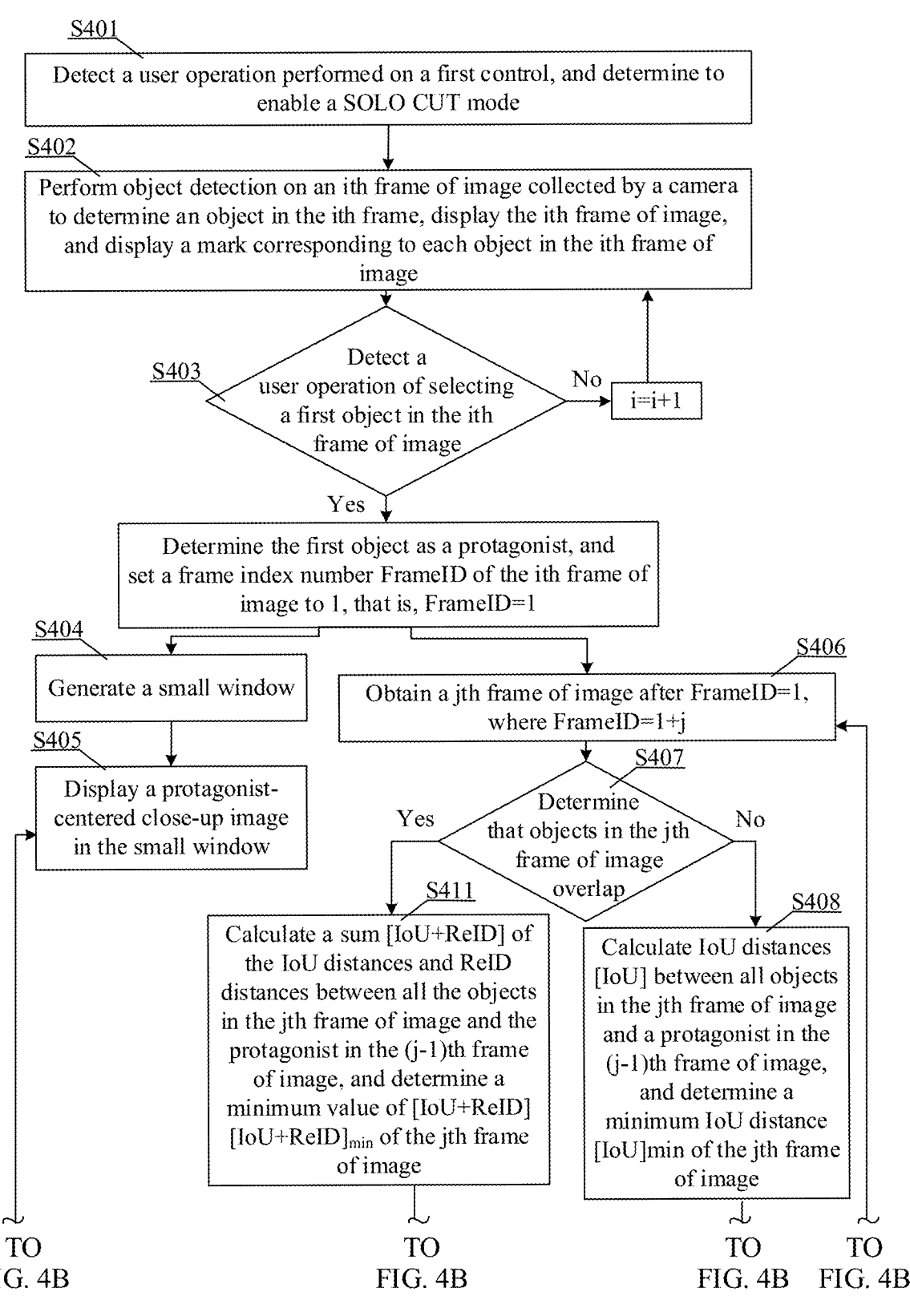
FIG. 4A and FIG. 4B are a flowchart of shooting in a SOLO CUT mode by a terminal 100 according to an embodiment of this application.
Figure 4B:
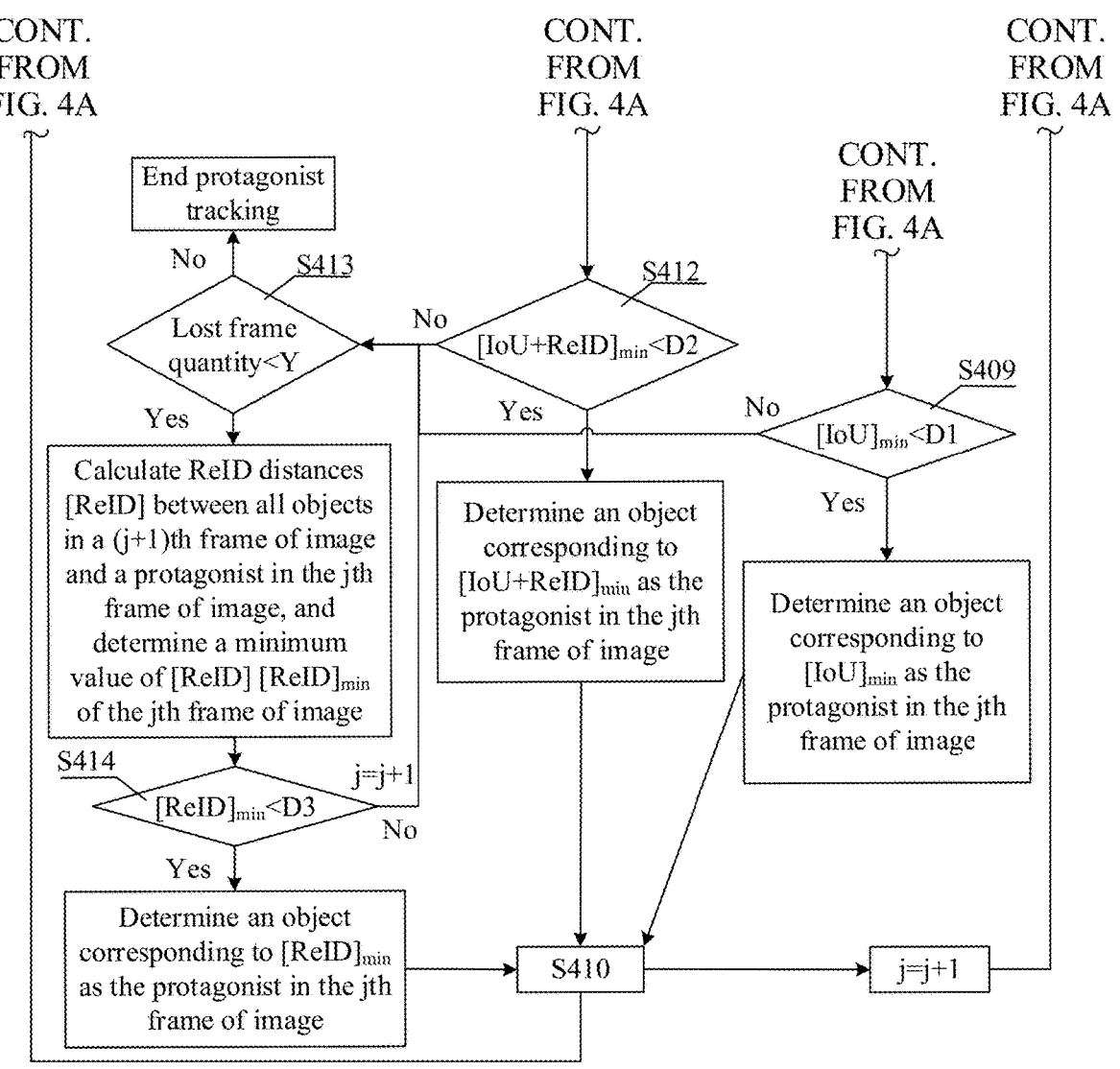

FIG. 4A and FIG. 4B are a flowchart of an example of shooting in a SOLO CUT mode by a terminal 100. With reference to FIG. 4A and FIG. 4B, the following specifically describes a processing procedure of a shooting method for implementing the SOLO CUT mode by the terminal 100.

S401: Detect a user operation performed on a first control, and determine to enable the SOLO CUT mode.

Implementing the shooting method corresponding to the SOLO CUT mode needs to identify, in real time, an object (a person, an animal, a plant, or the like) in an image collected by a camera. Identifying the object in the image in real time needs to occupy calculation resources of the terminal 100. Therefore, the terminal 100 can provide a user with a control for enabling or disabling the SOLO CUT mode, which is denoted as the first control. In this way, the user can determine, based on a requirement of the user, whether to enable the SOLO CUT mode, thereby avoiding occupying calculation resources of the terminal 100, reducing calculation efficiency of the terminal 100, and affecting user experience.

In an embodiment of this application, the SOLO CUT mode is disabled by default when the camera is enabled. In addition, the terminal 100 may display the first control. After detecting a user operation performed on the first control, the terminal 100 may enable the SOLO CUT mode to execute a shooting algorithm corresponding to the SOLO CUT mode, to provide a shooting service corresponding to the SOLO CUT mode for the user.

Referring to the user interface 11 shown in FIG. 1A, a SOLO CUT mode option in the menu bar 111 may be referred to as the first control. After detecting a user operation performed on the SOLO CUT mode option, the terminal 100 may provide a shooting service shown in FIG. 1A-FIG. 1J for the user.

S402: Perform object detection on an ith frame of image collected by the camera to determine an object in the ith frame of image.

Referring to the user interface shown in FIG. 1B, in the SOLO CUT mode, the terminal 100 first needs to determine a protagonist based on a selection operation of the user. In this case, the terminal 100 needs to first identify the object included in the image collected by the camera, and then mark an identified object. In this way, the user can select any object from the identified object as a protagonist.

Figure 5A:
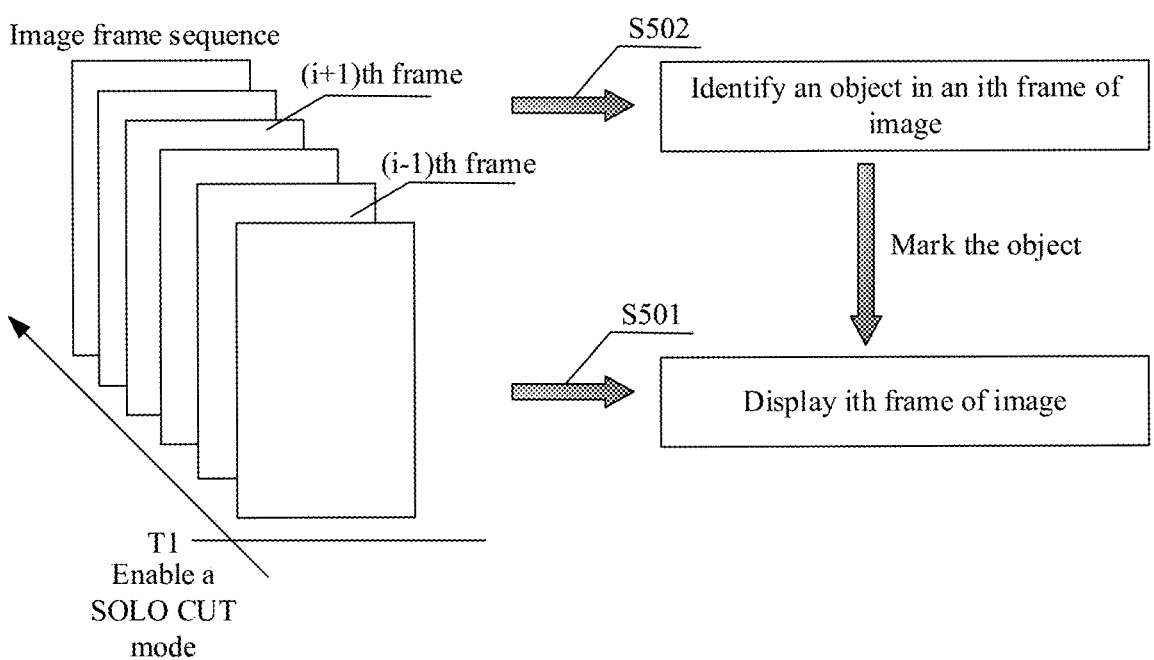
FIG. 5A is a schematic diagram of displaying an image collected by a camera by a terminal 100 according to an embodiment of this application.

Specifically, FIG. 5A is a schematic diagram of an example of displaying by the terminal 100 an image collected by a camera after the SOLO CUT mode is enabled. In FIG. 5A, an image frame sequence on the left may indicate image frames collected by the camera of the terminal 100 in real time. T1 may indicate a moment corresponding to detecting the user operation of the first control, namely, a moment of enabling the SOLO CUT mode.

In an existing shooting method, after obtaining a frame of image collected by the camera, the terminal 100 may send the image frame to a display, to display the image frame, namely, a processing process shown in S501 in FIG. 5A. After the SOLO CUT mode is enabled, that is, after the T1 moment, the terminal 100 further needs to perform object identification on the image frame collected by the camera, to determine an object included in the image frame. In this way, the terminal 100 can display a mark corresponding to an identified object in the image frame while displaying the image frame. This process is a processing process shown in S502 in FIG. 5A.

An image frame displayed in the preview window 113 in FIG. 1B is used as an example, and the image frame may be the ith frame of image collected by the camera after the SOLO CUT mode is enabled. After the image frame collected by the camera is obtained, on the one hand, the terminal 100 may send the image frame to the display. By using a display capability of the display, the terminal 100 may display the image frame on a screen, to obtain the user interface 12 shown in FIG. 1B. On the other hand, the terminal 100 may identify the object in the image frame by using a preset object identification algorithm. In this case, the terminal 100 can identify that the image frame includes three objects: a person 1, a person 2, and a person 3. Therefore, the terminal 100 can indicate the display to display selection boxes (marks) on the identified objects, for example, selection boxes 121, 122, and 123. It may be understood that, on a basis that the terminal 100 supports identification of objects such as an animal and a plant, the terminal 100 may correspondingly display selection boxes on images of the animal and the plant. The user may also select the animal and the plant as protagonists.

In this way, in the preview window 113, the user can not only browse the image collected by the camera in real time, but also obtain the object identified by the terminal 100, that is, a set protagonist is supported. Therefore, the user can select any object as an identified protagonist by using a mark (a selection box) that corresponds to each object and that is displayed by the terminal 100.

The object identification algorithm is preset. In some examples, an object identified by the object identification algorithm includes a person. Therefore, the object identification algorithm is also referred to as a person identification algorithm. In some examples, objects identified by the object identification algorithm further include an animal and a plant. An object that can be supported and identified by the object identification algorithm depends on a preset setting of a developer.

Figure 5B:
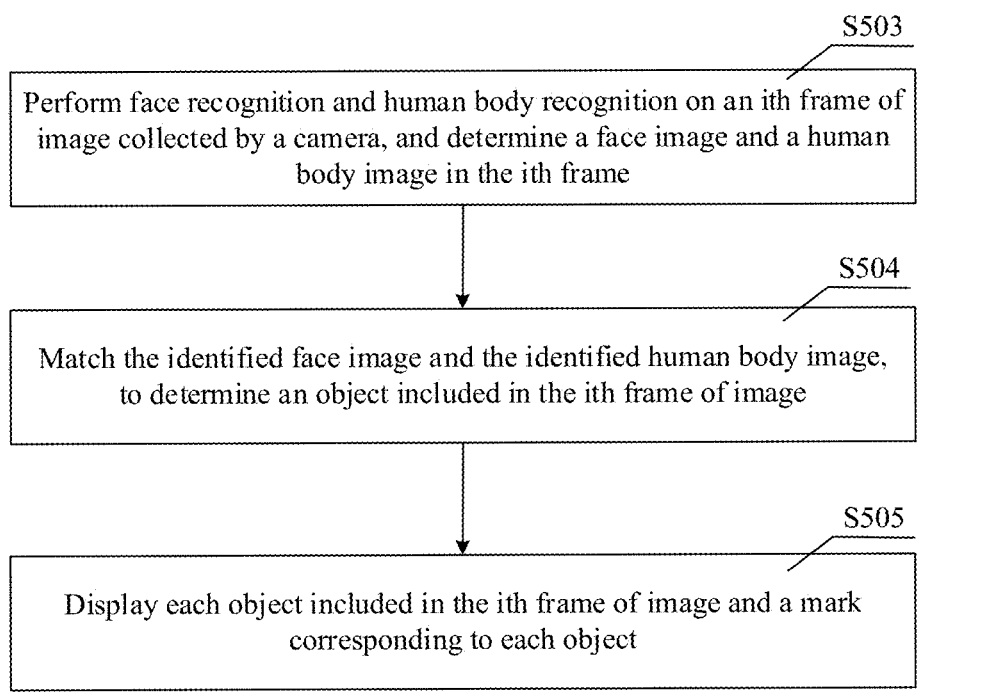
FIG. 5B is a flowchart of performing object identification and marking by a terminal 100 according to an embodiment of this application.

FIG. 5B is a flowchart of an example of performing object identification and marking by a terminal 100 in S502.

S503: Perform face recognition and human body recognition on the ith frame of image collected by the camera, and determine a face image and a human body image in the ith frame.

The terminal 100 may be preconfigured with a face recognition algorithm and a human body recognition algorithm. The face recognition algorithm may be used to identify a face image in an image. The human body recognition algorithm may be used to identify a human body image in an image, including a face, a body, and limbs.

After obtaining the ith frame of image, the terminal 100 may separately execute the face recognition algorithm and the human body recognition algorithm, to determine the face image and the human body image in the ith frame of image. For the ith frame of image shown in FIG. 5C, the terminal 100 may determine, by using the face recognition algorithm, that the frame of image includes faces: face1, face2, and face3; and the terminal 100 may determine, by using the human body recognition algorithm, that the frame of image includes human bodies: body1, body2, and body3.

S504: Match the identified face image and the identified human body image, to determine the object included in the ith frame of image.

After determining the face image and the human body image in the ith frame, the terminal 100 may calculate an intersection over union (intersection over union, minimum) between each face image and each human body image, denoted as an $IoU_{face\&body}$. In this embodiment of this application, the $IoU_{face\&body}$ may be used to indicate a degree of association between a face image and a human body image. A higher $IoU_{face\&body}$ indicates a higher degree of association between a corresponding face image and a human body image, and this group of face image and human body image may be considered as a person. Then, the terminal 100 may match the identified face image and the identified human body image by using the $IoU_{face\&body}$, to determine the object included in the ith frame of image.

It may be learned from experience that an intersection of a face of either of two non-overlapping persons in an image and a human body of the other person is 0, and an intersection of the face of the person and a human body of the person is basically close to the face of the person. Therefore, a smaller $IoU_{face\&body}$ closer to 0 indicates that a face and a human body corresponding to the $IoU_{face\&body}$ do not match, that is, may not be considered as a face and a human body of a same person.

Specifically, a first threshold M1 may be preset in the terminal 100. When an $IoU_{face\&body} \geq M1$, a face and a human body corresponding to the IoU face&body match; otherwise, do not match. A matched group of face image and human body image may be determined as an object. In this way, the terminal 100 can determine, based on the identified face image and the identified human body image, M objects included in the ith frame of image.

Figure 5C:
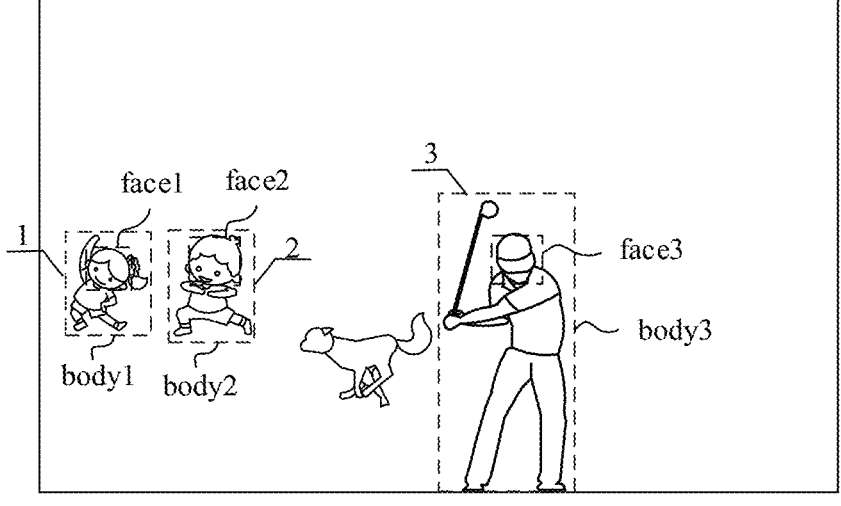
FIG. 5C is a schematic diagram of determining a face image and a human body image in an image by a terminal 100 according to an embodiment of this application.

The faces face1, face2, and face3, and the human bodies body1, body2, and body3 shown in FIG. 5C are used an example, and the terminal 100 may separately calculate IoUs of face1, face2, and face3, and body1, body2, and body3. For example, for face1, values of IoUs of face1 and each of body2 and body3 are 0, and a value of an IoU of face1 and body1 is not 0 and meets M1. In this case, the terminal 100 may determine that face1 and body1 may constitute one object (namely, the person 1). Similarly, the terminal 100 may determine that face2 and body2 may constitute one object (namely, the person 2), and face3 and body3 may constitute one object (namely, the person 3).

To improve calculation efficiency, after determining an object, and when subsequently calculating the IoU of each face image and each human body image, the terminal 100 may no longer calculate an IoU of a face image and a human body image that have constituted an object. For example, the terminal 100 may first calculate IoUs of face1 and all the bodies (body1, body2, and body3). In this case, the terminal 100 may determine body1 that matches face1. Therefore, the terminal 100 can determine that face1 and body1 constitute one object. Then, the terminal 100 may calculate IoUs of face2 and all the remaining bodies (body2 and body3). In this case, the terminal 100 may no longer calculate the IoU of face2 and body1, to reduce redundancy calculation and improve calculation efficiency.

In some examples, a human body image output by a human body detection algorithm may alternatively be an image including no face, namely, an image from a neck to a foot.

Optionally, the terminal 100 may set a maximum quantity of objects, namely, a quantity of identified objects included in one frame of image. A quantity of identified objects in one frame of image output by the terminal 100 does not exceed the maximum quantity of objects.

Optionally, in S503, the terminal 100 may directly identify the object in the ith frame of image by using the human body detection algorithm. In this case, the terminal 100 also does not need to match the face image and the human body image. In a single-person scenario (there is only one person object in an image frame) and in a multi-person scenario in which persons do not overlap, the object included in the ith frame of image can be better identified according to the foregoing method. However, in a scenario in which there are a relatively large quantity of shot persons and the persons overlap, accuracy of identifying the object included in the ith frame of image according to the foregoing method is relatively low. Consequently, misidentification is easy to occur or the overlapping persons cannot identified at all.

Therefore, in a multi-person scenario, especially a scenario in which persons overlap, a plurality of objects included in an image frame can be more stably and correctly identified according to the object identification method shown in S503-S504.

S505: Display each object included in the ith frame of image and a mark corresponding to each object.

After determining that the ith frame of image includes M objects, the terminal 100 may create marks respectively corresponding to the M objects. When displaying the ith frame of image, the terminal 100 may simultaneously display the marks. The mark may be used to remind the user of an object identified by the terminal 100 that can be determined as a protagonist. Further, the mark may be used by the user to indicate the terminal 100 to determine which object as a protagonist.

With reference to the ith frame of image shown in FIG. 5C, after determining the three objects (the person 1, the person 2, and the person 3) included in the ith frame of image, the terminal 100 may determine three marks corresponding to the three objects. Referring to the user interface 12 shown in FIG. 1B, the marks may be the selection boxes in the preview window 113. When the terminal 100 displays the ith frame of image, the terminal 100 may display the selection boxes 121, 122, and 123. The selection boxes 121, 122, and 123 are respectively used to mark the person 1, the person 2, and the person 3 in the image. The human body algorithm shown in FIG. 5 may identify a human body frame including a face part. Optionally, another identification algorithm may be used to identify only a human body frame of a human body (that is, no face part is identified in the human body frame, and the human body frame includes only a human body part).

Figure 5D:
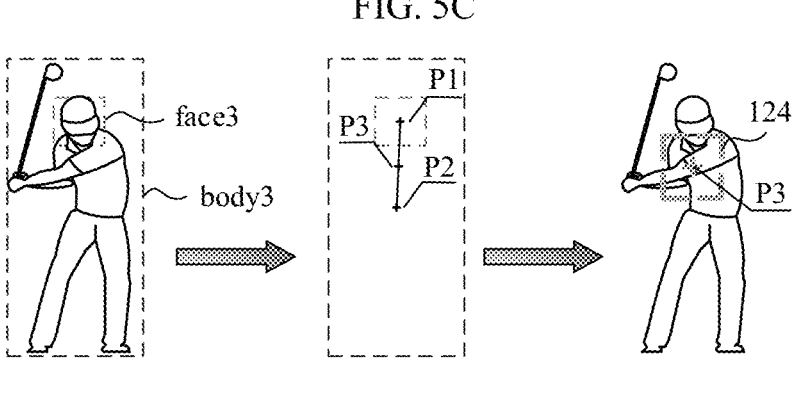
FIG. 5D is a schematic diagram of determining a display location of a selection box by a terminal 100 according to an embodiment of this application.

Specifically, a display location of the selection box may be determined based on the face image and the human body image. FIG. 5D is a schematic diagram of an example of determining a display location of a selection box by a terminal 100.

As shown in FIG. 5D, after identifying the face image and the human body image, the terminal 100 may determine midpoints of the face image and the human body image: a midpoint P1 of the face image and a midpoint P2 of the human body image. Based on P1 and P2, the terminal 100 may determine a midpoint P3 of an object (namely, the person 3) corresponding to the face image and human body image. A midpoint of the selection box 123 is P3.

In this way, by using the selection boxes, the user may determine the objects identified by the terminal 100: the person 1, the person 2, and the person 3. Further, the user may further tap any selection box (for example, the selection box 123) to determine an object (the person 3) corresponding to the selection box as a protagonist. After detecting a user operation of tapping the any selection box by the user, the terminal 100 may set an object corresponding to the tapped selection box as a protagonist. Subsequently, the terminal 100 may position the protagonist in an image sequence collected by the camera, to implement protagonist tracking and generate a close-up video of the protagonist.

S403: Determine whether a user operation of selecting a first object in the ith frame of image is detected. If yes, the first object is determined as a protagonist, and a frame index number FrameID of the ith frame of image is set to 1. If no, a next frame of image (i=i+1) of the ith frame of image is obtained, and S402 is repeated.

After the terminal 100 completes the operation shown in S402, the user may see the ith frame of image of the camera on the screen of the terminal 100, and the mark (the selection box) corresponding to each object in the ith frame of image, referring to the user interface 12 shown in FIG. 1B.

After displaying the ith frame of image frame carrying the marks, the terminal 100 may detect a user operation performed on any mark. For example, referring to the user interface 13 shown in FIG. 1C, the terminal 100 may detect a user operation performed on the selection box 123. In response to the operation, the terminal 100 may determine an object corresponding to the selection box 123 as a protagonist, that is, the person 3 as a protagonist, and set a frame index number FrameID of the frame of image to 1. The person 3 is the first object, and the user operation performed on the selection box 123 is an operation of selecting the first object. FrameID may be used to reflect that the frame of image is which frame of image after the protagonist is determined. FrameID=1 indicates the first frame of focusing on the protagonist. When a close-up image is determined based on a raw image, for the first frame of image of starting to focus on the protagonist, FrameID=1. Correspondingly, the close-up image obtained based on the raw image whose FrameID=1 may also carry a FrameID mark, and correspondingly, FrameID of the close-up is FrameID=1.

If the terminal 100 does not detect a user operation performed on any selection box during displaying the ith frame of image frame carrying the mark, the terminal 100 may perform an operation of i=i+1 to obtain a next frame of image of the ith frame of image and repeat S402. In this way, the terminal 100 can identify, in real time, the object collected by the camera, and display the mark corresponding to the object, so that the user selects a protagonist at any moment to perform a shooting action in the SOLO CUT mode.

S404: Generate a small window.

After detecting the user operation of determining the first object in the ith frame of image as the protagonist, the terminal 100 may generate the small window. Preferably, the small window may be embedded in a preview window in a picture-in-picture mode.

Referring to the user interface 14 shown in FIG. 1D, the small window 141 is embedded in the preview window 113 in the picture-in-picture mode. Preferably, the small window may be a rectangle whose aspect ratio is 9:16 (a vertical window) or 16:9 (a horizontal window). Certainly, in another embodiment, the preview window and the small window may be arranged in another manner, and the small window may alternatively be in another size and shape. This is not displayed in this embodiment of this application.

S405: Display a protagonist-centered close-up image in the small window.

After the small window is generated, the terminal 100 may display the protagonist-centered close-up image in the small window. The close-up image is an image in which a protagonist is image content obtained by performing cropping by using the selected protagonist as a center based on the raw image collected by the camera (the image displayed in the preview window).

The ith frame of image is used as an example. After determining the person 3 as the protagonist, the terminal 100 may crop the ith frame of image by using the person 3 as a center, to obtain a close-up image of the person 3. Then, the terminal 100 may display the close-up image in the generated small window.

Specifically, FIG. 6A is a flowchart of an example of displaying a protagonist-centered close-up image in a small window by a terminal 100.

S601: Determine a protagonist-centered close-up image in the ith frame of image.

S6011: Determine a zoom ratio ZoomRatio based on the human body image of the protagonist in the ith frame of image.

If the selected protagonist is farther from the camera, an area of a protagonist image in the entire raw image is smaller. In this case, a size of the protagonist-centered close-up image is smaller. On the contrary, when an area of the protagonist image in the entire raw image is larger, a size of the protagonist-centered close-up image is larger.

Referring to the ith frame of image shown in FIG. 6B, if the protagonist is the person 1, a close-up image of the person 1 expected to be displayed in the small window should be an image surrounded by a dashed-line box 61. In this case, a size of the dashed-line box 61 is a size of the close-up image of the protagonist in the ith frame of image. If the protagonist is the person 3, the close-up image of the person 3 expected to be displayed in the small window should be an image surrounded by a dashed-line box 62. In this case, a size of the dashed-line box 62 is a size of the close-up image of the protagonist in the ith frame of image.

The zoom ratio ZoomRatio is used to reflect a size of the protagonist in the raw image. After determining ZoomRatio, the terminal 100 may determine a size of a close-up image of a protagonist in a current frame.

Specifically, a calculation process in which the terminal 100 determines ZoomRatio is as follows:

First, in an object identification step shown in S402, the terminal 100 may identify the human body image in the image by using a preset human body recognition algorithm, for example, body1, body2, and body3. After determining the person 3 as the protagonist, the terminal 100 may determine ZoomRatio by using a size of a human body image (body3) of the person 3.

A calculation formula (Q1) for determining ZoomRatio by using the human body image is as follows:

$$\max BboxSize - detectBboxSize = \frac{ZoomRatio - minZoomRatio}{maxZoomRatio - minZoomRatio},$$

where maxBboxSize is a size of an identified maximum human body image; detectBboxSize is a size of a human body image of a protagonist; minZoomRatio is a preset minimum value of ZoomRatio; and maxZoomRatio is a preset maximum value of ZoomRatio.

S6012: Determine a size of the close-up image according to ZoomRatio: CropRagionWidth and CropRagionHeight.

CropRagionWidth is used to indicate a width of a close-up image, and CropRagionHeight is used to indicate a height of the close-up image. CropRagionWidth and CropRagion- Height may be determined based on ZoomRatio described above. Specifically, calculation formulas (Q2 and Q3) of CropRagionWidth and CropRagionHeight are as follows:

$$CropRagionWidth = \frac{WinWidth}{ZoomRatio}$$

$$CropRagionHeight = \frac{WinHeight}{ZoomRatio},$$

where

WinWidth is used to indicate a width of a small window; and WinHeight is used to indicate a height of the small window. CropRagionWidth and CropRagionHeight that are obtained based on WinWidth, WinHeight, and ZoomRatio may exactly correspond to the width and the height of the small window, to avoid a problem of image deformation when the close-up image is displayed in the small window.

Preferably, when the small window is a vertical window, a value of WinWidth may be 1080p (pixels), and a value of WinHeight may be 1920p. When the small window is a horizontal window, a value of Win Width may be 1920p, and a value of WinHeight may be 1080p.

S6013: Crop the raw image according to CropRagionWidth, CropRagionHeight, and the middle point of the object, and determine the protagonist-centered close-up image.

After CropRagion Width and CropRagionHeight are determined, with reference to a known middle point (P3) of the protagonist person, the terminal 100 may crop the raw image to obtain the protagonist-centered close-up image. Referring to FIG. 6B, an image in a region centered on P3 and with a width and a height respectively being CropRagionWidth and CropRagionHeight is the close-up image of the protagonist (the person 3).

S602: Perform self-adaptive adjustment on the close-up image according to a pixel size of the small window.

Referring to FIG. 6C, in some examples, CropRagion Width and CropRagionHeight are respectively equal to WinWidth and WinHeight. For example, CropRagionWidth=1080p and CropRagionHeight=1920p, while WinWidth=1080p and WinHeight=1920p. In this case, a close-up image cropped according to 1080p and 1920p exactly matches the small window, and the terminal 100 may directly display the close-up image in the small window.

Referring to FIG. 6D, in some examples, CropRagionWidth and CropRagionHeight are not equal to, but are in equal proportions with, WinWidth and WinHeight. For example, CropRagionWidth=540p and CropRagionHeight=960p, while WinWidth=1080p and WinHeight=1920p. In this case, the terminal 100 may zoom in a close-up image with 540p and 960p in equal proportions to obtain a close-up image with 1080p and 1920p.

After determining the pixel size of the close-up image, the terminal 100 may perform a self-adaptive adjustment step to determine whether the pixel size matches the size of the small window. When matching, the terminal 100 may perform no adjustment (zooming in or out), referring to FIG. 6C. When mismatching, the terminal 100 may perform adjustment, referring to FIG. 6D. In this application, the self-adaptive adjustment includes a case in which no adjustment is performed when the obtained size matches the size of the small window.

S603: Display a close-up image obtained after self-adaptive adjustment in the small window.

After the self-adaptive adjustment is completed, the size of the close-up image matches the size of the small window. Therefore, the terminal 100 can display the close-up image in the small window.

S406: Obtain a jth frame of image after FrameID=1, where FrameID=1+j.

Referring to the descriptions in S403, after detecting the operation of determining the first object as the protagonist by the user, the terminal 100 may set FrameID of the ith frame of image corresponding to the operation to 1, to indicate that the frame is the first frame of image of determining the protagonist.

When displaying the close-up image of the protagonist whose FrameID=1, the terminal 100 may further simultaneously obtain an image frame collected by the camera after FrameID=1, position a protagonist in the image frame, and display a close-up image of the protagonist in the small window, thereby implementing a function of displaying the close-up video in the small window.

The following uses the jth frame of image frame (FrameID=1+j) after the FrameID=1 as an example to specifically describe a method in which the terminal 100 positions the protagonist in the image frame after FrameID=1.

S407: Determine that objects in the jth frame of image overlap.

In some examples, after obtaining the jth frame of image, the terminal 100 may first identify, by using the human body recognition algorithm, the objects included in the jth frame of image. Then, the terminal 100 may calculate, by using a similarity algorithm, a similarity between each object and a protagonist in a (j−1)th frame of image, and further determine a similarity distance (the similarity distance=1−the similarity) between each object and the protagonist in the (j−1)th frame of image. A smaller similarity distance indicates a smaller difference between the object and the protagonist, namely, a greater similarity. Therefore, an object in the jth frame of image with a similarity distance that is the smallest and lower than a similarity distance threshold can be determined as a protagonist.

Certainly, the terminal 100 may directly use the similarity to determine a protagonist in the jth frame of image. In this case, an object in the jth frame of image with a similarity that is the highest and higher than a similarity threshold may be determined as a protagonist.

However, it is calculation-resource-consuming to calculate the similarity between each object in the jth frame of image and the protagonist in the (j−1)th frame of image each time. In addition, in the jth frame of image, if image content of two or more objects overlaps, the similarity between the object and the protagonist in the (j−1)th frame of image is affected. Consequently, accuracy of a protagonist identification result is affected.

Therefore, in this embodiment of this application, after obtaining the jth frame of image and identifying the objects included in the jth frame of image, the terminal 100 may first determine whether the objects in the image frame overlap. Then, based on whether the objects in the jth frame of image overlap, the terminal 100 may use different calculation methods to determine the protagonist in the jth frame of image. The foregoing overlapping refers to whether human body images of all objects identified by the terminal 100 overlap, including overlapping between the protagonist and a non-protagonist, and overlapping between a non-protagonist and another non-protagonist.

When there is no overlapping, the terminal 100 may determine the protagonist of the jth frame of image by using intersection over union distances (IoU distance, denoted as [IoU]) between all the objects in the jth frame of image and the protagonist of the (j−1)th frame of image. On the contrary, when there is overlapping, the terminal 100 may determine the protagonist of the jth frame of image by using the IoU distances and re-identification distances (ReID distance, denoted as [ReID]) between all the objects in the jth frame of image and the protagonist of the (j−1)th frame of image.

In S402, the terminal 100 identifies human body ranges of the plurality of objects by using the human body detection algorithm (that is, the human body boxes are determined). In this case, the terminal 100 may determine, by using whether the human body boxes intersect, whether the objects in the jth frame of image overlap. As shown in FIG. 7A, any two objects in the jth frame of image do not overlap (human body boxes of the any two objects do not intersect), for example, the person 3 and a person 4. In this case, the terminal 100 determines that the objects in the jth frame of image do not overlap. As shown in FIG. 7B, at least two objects in the jth frame of image overlap, for example, the person 3 and the person 4. In this case, the objects in the jth frame of image overlap.

S408: Calculate the IoU distances [IoU] between all the objects in the jth frame of image and the protagonist in the (j−1)th frame of image, and determine a minimum IoU distance $[IoU]_{min}$ of the jth frame of image.

In a non-overlapping case, the terminal 100 may determine the protagonist of the jth frame of image by using the IoU distances between all the objects in the jth frame of image and the protagonist in the (j−1)th frame of image.

This is because in a video recording process, a time interval between two consecutive frames of images is extremely short. A frame rate 30 fps is used as an example, and a time interval between two consecutive frames is 1/30s. In this case, within a time of two adjacent frames, it is relatively difficult for an object to have a relatively large IoU distance in two consecutive frames of images. Therefore, in the non-overlapping case, the terminal 100 may first determine the IoU distances (namely, a type of the similarity distance) between all the objects in the jth frame of image and the protagonist in the (j−1)th frame of image, and determine the minimum IoU distance $[IoU]_{min}$ of the jth frame of image.

Specifically, referring to FIG. 7C, a dashed-line box 3 may indicate a human body box of the protagonist in the (j−1)th frame. A dashed-line box 1' may indicate a human body box of the person 1 in the jth frame. A dashed-line box 2' may indicate a human body box of the person 2 in the jth frame. A dashed-line box 3' may indicate a human body box of the person 3 in the jth frame. A dashed-line box 4' may indicate a human body box of the person 4 in the jth frame.

The dashed-line box 3 and the dashed-line box 1' are used as an example. By using a region formed by the two dashed-line boxes, the terminal 100 may determine an intersection over union of the dashed-line box 3 and the dashed-line box 1', denoted as $IoU_{31}$. Therefore, the terminal 100 may determine an IoU distance $[IoU_{31}]$ between the person 1 in the jth frame and the protagonist in the (j−1)th frame.

$$[IoU_{31}] = 1 - IoU_{31}$$

Similarly, the terminal 100 may obtain IoU distances between the persons 2, 3, and 4 in the jth frame and the protagonist in the (j−1)th frame: $[IoU_{32}]$, $[IoU_{33}]$, and $[IoU_{34}]$. Referring to FIG. 7C, in this case, the terminal 100 may determine that $[IoU]_{min}$ of the jth frame of image is $[IoU_{33}]$. A smaller IoU distance indicates a smaller location change between two objects. With reference to that a time between two adjacent frames is relatively short, and it is difficult for the protagonist to undergo a relatively large displacement in two consecutive frames, and therefore, an object with a smaller IoU distance is more likely to be the protagonist.

Referring to the foregoing descriptions, in some embodiments, the human body image output by the human body detection algorithm may alternatively be the image including no face, namely, the image from a neck to a foot. In this case, the terminal 100 may determine [IoU] by using the human body image including no face. Optionally, the terminal 100 may determine [IoU] by using the human body image including no face and a corresponding face image.

S409: Determine whether $[IoU]_{min}<$D1.

An object in the jth frame of image with a minimum IoU distance from the protagonist in the (j−1)th frame of image may not be the protagonist. For example, referring to FIG. 7D, IoU distances between the persons 1, 2, and 4 in the jth frame of image and the protagonist in the (j−1)th frame of image are all 1, and an IoU distance between the person 3 in the jth frame of image and the protagonist in the (j−1)th frame of image is 0.9. In this case, the IoU distance between the person 3 and the protagonist is the minimum. However, in fact, the IoU distance between the person 3 and the protagonist is very large. Therefore, if an object (the person 3) whose IoU distance is the minimum is directly determined as a protagonist, misidentification for the protagonist usually occurs. Consequently, automatic tracking for the protagonist fails, and user experience is affected.

Therefore, after determining $[IoU]_{min}$ of the jth frame of image, the terminal 100 further needs to determine whether $[IoU]_{min}$ is less than a preset IoU distance threshold (denoted as D1).

If $[IoU]_{min}<$D1, the terminal 100 may determine that an object corresponding to $[IoU]_{min}$ is a protagonist. For example, D1=0.2. With reference to the minimum [IoU] distance $[IoU_{33}]$ determined in FIG. 7C, when $[IoU_{33}]<0.2$, the terminal 100 may determine that the person 3 in the jth frame of image and the protagonist in the (j−1)th frame of image are a same object, that is, determine that the person 3 in the jth frame of image is a protagonist.

If $[IoU]_{min}<$D1 is not met, the terminal 100 may mark that the protagonist in the frame of image is lost. Then, the terminal 100 may determine, based on a currently accumulated quantity of image frames losing protagonists, whether to terminate protagonist tracking. This is not further described herein first.

The IoU distance is an optional indicator for determining a similarity between each object in a next frame of video and a protagonist in a previous frame of video. Certainly, the terminal 100 may alternatively select another indicator. For example, the terminal 100 may further directly determine, by using the IoU, similarities between all the objects in the jth frame of image and the protagonist in the (j−1)th frame of image. In this case, an object in the jth frame of image whose IoU with the protagonist in the (j−1)th frame of image is the maximum and is greater than an IoU threshold may be determined as a protagonist. Optionally, the terminal 10 may alternatively first determine whether an IoU corresponding to each object in the jth frame of image is less than D1, determine all objects whose IoUs are less than D1, then, determine that similarities between all the objects whose IoUs are less than D1 and the protagonist in the (j−1)th frame of image, and further determine an object with a highest similarity among all the objects whose IoUs are less than D1 as a protagonist. Further, when determining the similarity, the terminal 100 may further set a similarity threshold. When the similarity of any object in all the objects whose IoUs are less than D1 does not meet the similarity threshold, the terminal 100 may determine that focusing fails (no protagonist is positioned). The similarity is determined by using a method in the conventional technology. Details are not described herein.

S410: Display a close-up image of the protagonist in the jth frame of image, obtain an image frame after the jth frame of image, and repeat S406 and steps after S406.

After the protagonist in the jth frame of image is determined by using the method shown in S408-S409, the terminal 100 may perform operations in two aspects: One is to determine the protagonist-centered close-up image based on the protagonist in the jth frame of image, and then display the close-up image in the small window. The other is to obtain a next frame of image (j=j+1) of the jth frame of image, and repeat S406 and the steps after S406 to determine a protagonist in the next frame of image, and display a close-up image of the protagonist in the next frame of image.

For a method for determining the close-up image of the protagonist in the jth frame of image, refer to the descriptions in S405. Details are not described herein again. In particular, in some examples, the terminal 100 may calculate ZoomRatio once every several frames, for example, calculate ZoomRatio once every four frames.

This is because it is difficult for an object to greatly change in the image in a time of four consecutive frames. In this case, ZoomRatio corresponding to the four frames is almost consistent. Therefore, after ZoomRatio is determined in a kth frame, ZoomRatio can be used for a (k+1)th frame, a (k+2)th frame, and a (k+3)th frame, thereby reducing a calculation frequency of ZoomRatio and reducing calculation resources.

In some embodiments, when ZoomRatio greatly changes twice, the terminal 100 may perform smoothing processing in a process of determining the close-up image, thereby avoiding image jump. For example, after the protagonist is switched to the person 2, the terminal 100 may determine a group of smoothly moving image frames according to a path from the person 3 to the person 2 in the preview window 113, and then display the image frames in the small window 141, to implement non-jumping protagonist switching display. For example, the terminal 100 may further use a fixed transition effect to connect close-up images of protagonists before and after switching. The fixed transition effect is, for example, superposition, swirl, or translation commonly used in video editing. This is not limited in this embodiment of this application.

S411: Calculate a sum [IoU+ReID] of the IoU distances and the ReID distances between all the objects in the jth frame of image and the protagonist in the (j−1)th frame of image, and determine a minimum value of [IoU+ReID] $[IoU+ReID]_{min}$ of the jth frame of image.

In a case in which the objects in the jth frame of image overlap, the terminal 100 may determine the protagonist of the jth frame of image by using the IoU distances and the ReID distances between all the objects in the jth frame of image and the protagonist in the (j−1)th frame of image.

If the objects in the jth frame of image overlap, the overlapping objects are relatively close to each other. In this case, within a time of two adjacent frames, it is easy for an object to move from a location of the object in a previous frame to a location of another object. Therefore, in the overlapping scenario, an object being not a protagonist is most likely to move in a next frame to a location of the protagonist. In this case, the terminal 100 cannot determine the protagonist in the jth frame of image only by using the IoU distances between all the objects in the jth frame of image and the protagonist in the (j−1)th frame of image.

For example, a specific object in the (j−1)th frame of image that overlaps the protagonist may appear in the jth frame of image at a location of the protagonist in the (j−1)th frame of image. In this case, an IoU distance between the specific object and the protagonist is closest, but the object is not a protagonist. This can lead to misidentification.

Therefore, in the overlapping case, in addition to determining the protagonist by the terminal 100 by using an IoU distance of each object in the two consecutive frames of images, the terminal 100 further needs to determine whether the object at each location is the protagonist originally determined by the user. In this case, the terminal 100 further needs to calculate the ReID distances between all the objects in the jth frame of image and the protagonist in the (j−1)th image.

The ReID distance is a parameter that is obtained based on a neural network and that is used to reflect a similarity between image content. FIG. 8 is a schematic diagram of an example of determining ReID distances between objects in a jth frame of image and a protagonist in a (j−1)th image by a terminal 100.

As shown in FIG. 8, by using a convolutional neural network (convolutional neural network, CNN), the terminal 100 may determine a feature vector F0 of the protagonist in the (j−1)th frame of image. Similarly, by using the CNN, the terminal 100 may determine feature vectors F1~F4 of the objects (the persons 1 to 4) in the jth frame of image. Then, the terminal 100 may calculate inner products of the feature vectors (F1~F4) of the objects in the jth frame of image and the feature vector F0 of the protagonist in the (j−1)th frame of image: <F0,F1>, <F0,F2>, <F0,F3>, and <F0,F4>.

The person 1 is used as an example. After determining the inner product <F0,F1> of the feature vector F1 and the feature vector F0 of the protagonist in the (j−1)th frame of image, the terminal 100 may determine a ReID distance (namely, a type of the similarity distance) between the person 1 and the protagonist (denoted as $[ReID]_{31}$):

$$[ReID]_{31} = 1 - \langle F0, F1 \rangle$$

Similarly, the terminal 100 may obtain ReID distances between the persons 2, 3, and 4 in the jth frame and the protagonist in the (j−1)th frame: $[ReID]_{32}$, $[ReID]_{33}$, and $[ReID]_{34}$. A smaller ReID distance indicates a higher similarity between the object and the protagonist.

After determining the ReID distances between the objects in the jth frame and the protagonist in the (j−1)th frame, the terminal 100 may determine a minimum ReID distance $[ReID]_{min}$ of the jth frame of image. Referring to FIG. 8, in this case, the terminal 100 may determine that $[ReID]_{min}$ of the jth frame of image is $[ReID]$ 33.

Then, the terminal 100 may determine the IoU+ReID distance of the objects and the protagonist, namely, the sum of the IoU distances and the ReID distances (a type of the similarity distance), denoted as [IoU+ReID]. A smaller [IoU+ReID] means a smaller IoU of the object and the protagonist, and a smaller ReID distance. From the image, the object is located close to the original protagonist and has similar image content. Therefore, the terminal 100 can determine the protagonist in the jth frame of image by using [IoU+ReID]. In addition, an object with a smaller [IoU+ReID] is more likely to be a protagonist.

S412: Determine whether $[IoU+ReID]_{min}$<D2.

Referring to S409, an object in the jth frame of image with minimum [IoU+ReID] from the protagonist in the (j−1)th frame of image may not be the protagonist. Therefore, after determining $[IoU+ReID]_{min}$ of the jth frame of image, the terminal 100 further needs to determine whether [IoU+ReID]$_{min}$ is less than a preset IoU+ReID distance threshold (denoted as D2).

If $[IoU+ReID]_{min}$<D2, the terminal 100 may determine that an object corresponding to $[IoU+ReID]_{min}$ is a protagonist. On the contrary, if $[IoU+ReID]_{min}$<D2 is not met, the terminal 100 may mark that the protagonist in the frame of image is lost. Similarly, the terminal 100 may determine, based on a currently accumulated quantity of image frames losing protagonists, whether to terminate protagonist tracking. This is not further described herein neither.

After the protagonist in the jth frame of image is determined by using the method shown in S411-S412, the terminal 100 may perform the following: S410: Determine the protagonist-centered close-up image based on the protagonist in the jth frame of image, and then display the close-up image in the small window; and obtain a next frame of image of the jth frame of image, repeat S406 and the steps after S406, and continue to track the protagonist and display the close-up image of the protagonist.

S413: Determine whether a lost frame quantity<Y.

In S409, if $[IoU]_{min}$ of the jth frame of image is not less than D1, the terminal 100 may determine that there is no protagonist in the jth frame of image. Similarly, in S412, if $[IoU+ReID]_{min}$ of the jth frame of image is not less than D2, the terminal 100 also determines that there is no protagonist in the jth frame of image. Optionally, when there is the lost frame quantity, the mark in the interface may change from the check box 142 in FIG. 1D to the selection box 123 in FIG. 1C; or change from the selection box 123 originally being red or blue to the transparent or white selection box 123.

In this case, the terminal 100 may modify the lost frame quantity: increase the lost frame quantity by 1. The lost frame quantity is a quantity of consecutive image frames in which the terminal 100 identifies no protagonist.

Then, the terminal 100 may determine, based on the lost frame quantity, whether to end protagonist tracking. Specifically, the terminal 100 may set a lost frame quantity threshold Y. If a current recorded lost frame quantity≥Y, the terminal 100 may determine that the object collected by the camera does not include the protagonist initially selected by the user. In this case, the terminal 100 may determine to end protagonist tracking. If a current recorded lost frame quantity<Y, the terminal 100 may obtain a next frame of image (a (j+1)th frame of image), and determine whether the next frame of image includes a protagonist. When the initially selected protagonist is not identified in subsequent image frames, the lost frame quantity continues to increase until the lost frame quantity≥Y, and protagonist tracking ends.

When protagonist focusing fails, the preview window 113 may continue to display the raw image. In a process of starting video recording, while the preview window 113 may continue to display the raw image, the terminal 100 may also continue to encode the raw image.

In some embodiments, after the terminal 100 may determine to end protagonist tracking, the terminal 100 may no longer indicate to select a new protagonist. In some other embodiments, after the terminal 100 may determine to end protagonist tracking, the terminal 100 may indicate to select a new protagonist. In this case, the terminal 100 may continue to identify an object in an image, and display a corresponding selection box. In addition, the terminal 100 may prompt the user to select a protagonist again. Then, the terminal 100 may determine the new protagonist, enable automatic tracking for the new protagonist, and generate and include a corresponding close-up video.

S414: Calculate ReID distances [ReID] between all objects in the (j+1)th frame of image and the protagonist in the jth frame of image, and determine a minimum value [ReID] [ReID] min of the (j+1)th frame of image.

For a specific operation of determining the ReID distances between all the objects in the (j+1)th frame of image and the protagonist in the jth frame of image by the terminal 100, refer to the descriptions in S411. Details are not described herein again. Herein, after the terminal 100 determines the ReID distances, the terminal 100 may directly determine a minimum value of the ReID distances $[ReID]_{min}$ without determining [IoU+ReID] min.

Then, the terminal 100 may determine whether $[ReID]_{min}<D3$. $D3$ is a preset ReID distance threshold. If $[IReID]_{min}<D3$, the terminal 100 may determine that an object corresponding to $[ReID]_{min}$ is a protagonist. Then, S410 is performed, and the terminal 100 may display a close-up image of the protagonist, obtain a next frame of image, and continue to display the close-up image of the protagonist. On the contrary, if $[ReID]_{min}<D3$ is not met, the terminal 100 may mark that the protagonist in the frame of image is lost, and repeat S413 and operations after S413. When a current recorded lost frame quantity≥Y, the terminal 100 may determine to end protagonist tracking.

In some embodiments, to improve calculation efficiency, the terminal 100 may further perform S407 and calculation operations after S407 once every N frames. For example, N=4. In a subsequent embodiment, N=4 is also used as an example for description.

Referring to FIG. 9A (for convenience of presentation, some steps are omitted or simplified in FIG. 9A on a basis of FIG. 4A and FIG. 4B), after obtaining the jth frame of image after FrameID=1, the terminal 100 may first determine whether a frame index number FrameID of the image frame can be divided by 4 (corresponding to S415 in FIG. 9A).

When FrameID % 4=0 is met, that is, FrameID can be divided by 4, the terminal 100 may determine the protagonist in the jth frame of image by performing S407 and the calculation operations after S407. On the contrary, when FrameID % 4=0 is not met, that is, FrameID cannot be divided by 4, the terminal 100 may determine the protagonist in the jth frame of image by using a kernel correlation filter (Kernel Correlation Filter, KCF) algorithm. The KCF algorithm is existing. Details are not described herein.

When determining the protagonist in the jth frame of image by using the KCF, the terminal 100 may also perform the following: S410: Display the close-up image of the protagonist in the jth frame of image in the small window, obtain a next frame of image of the jth frame of image, continue to identify a protagonist in a subsequent image frame, and display a close-up image of the protagonist.

Figure 2D:
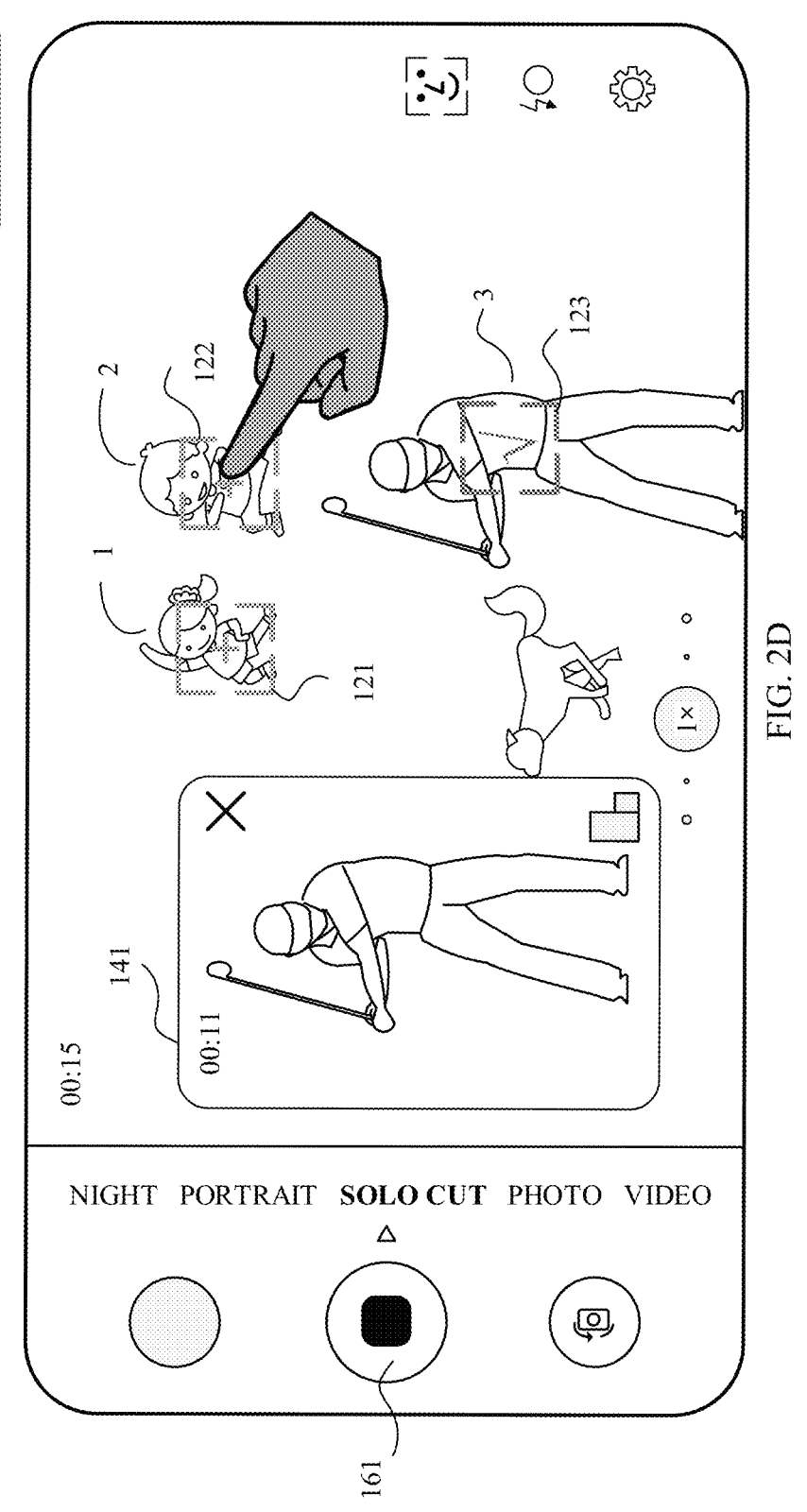
Figure 2E:
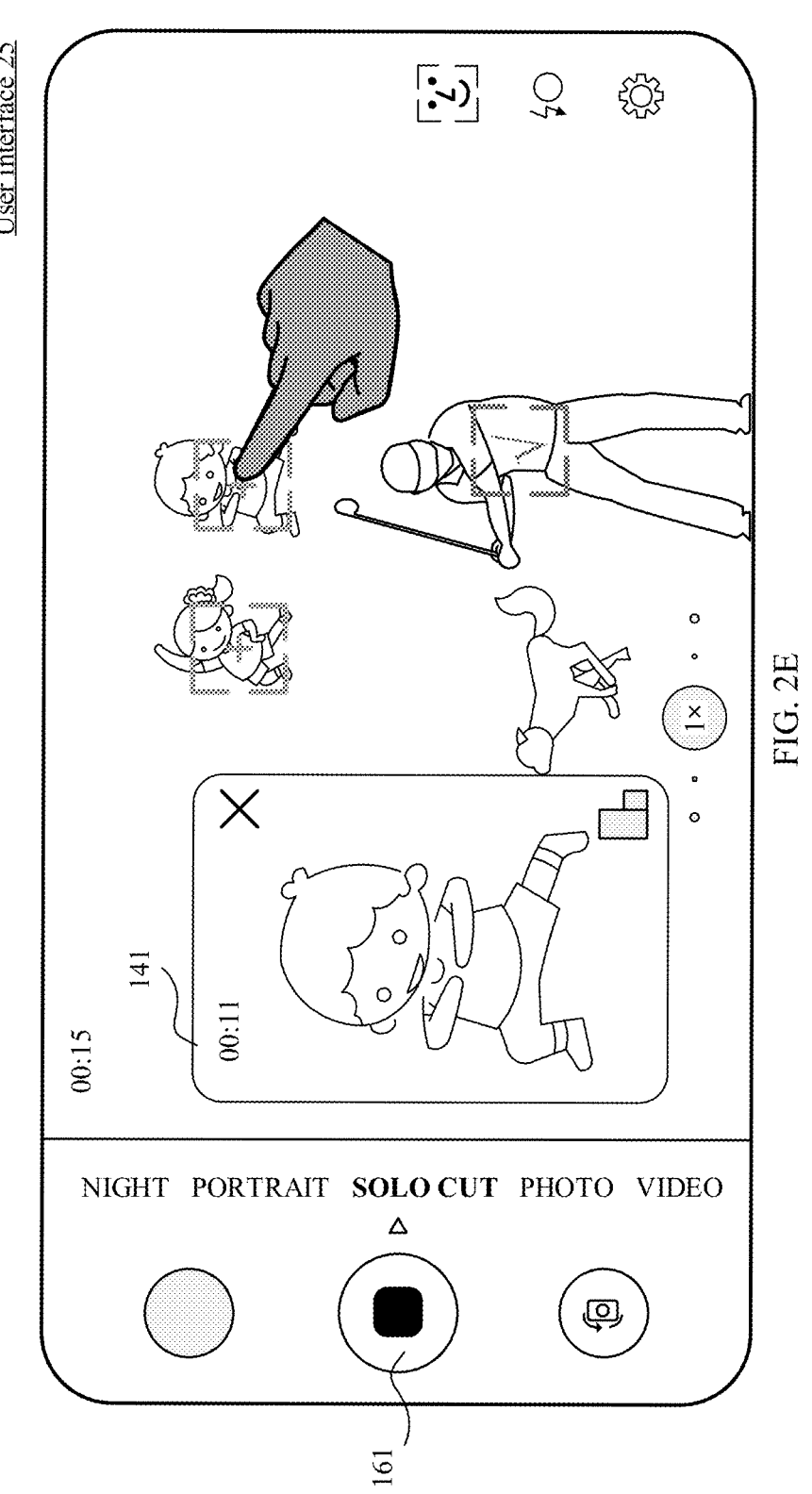
Figure 2F:
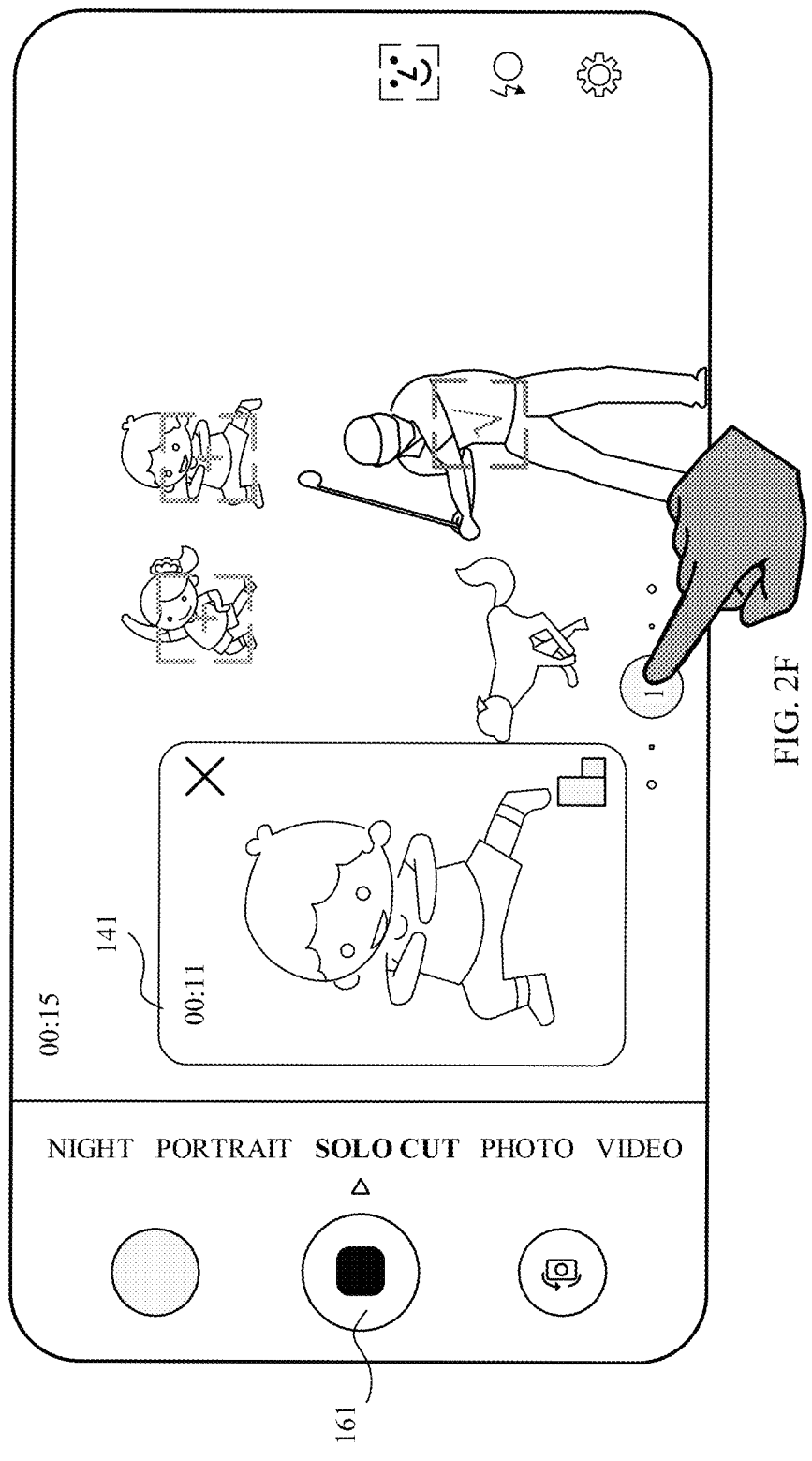
Figure 2G:
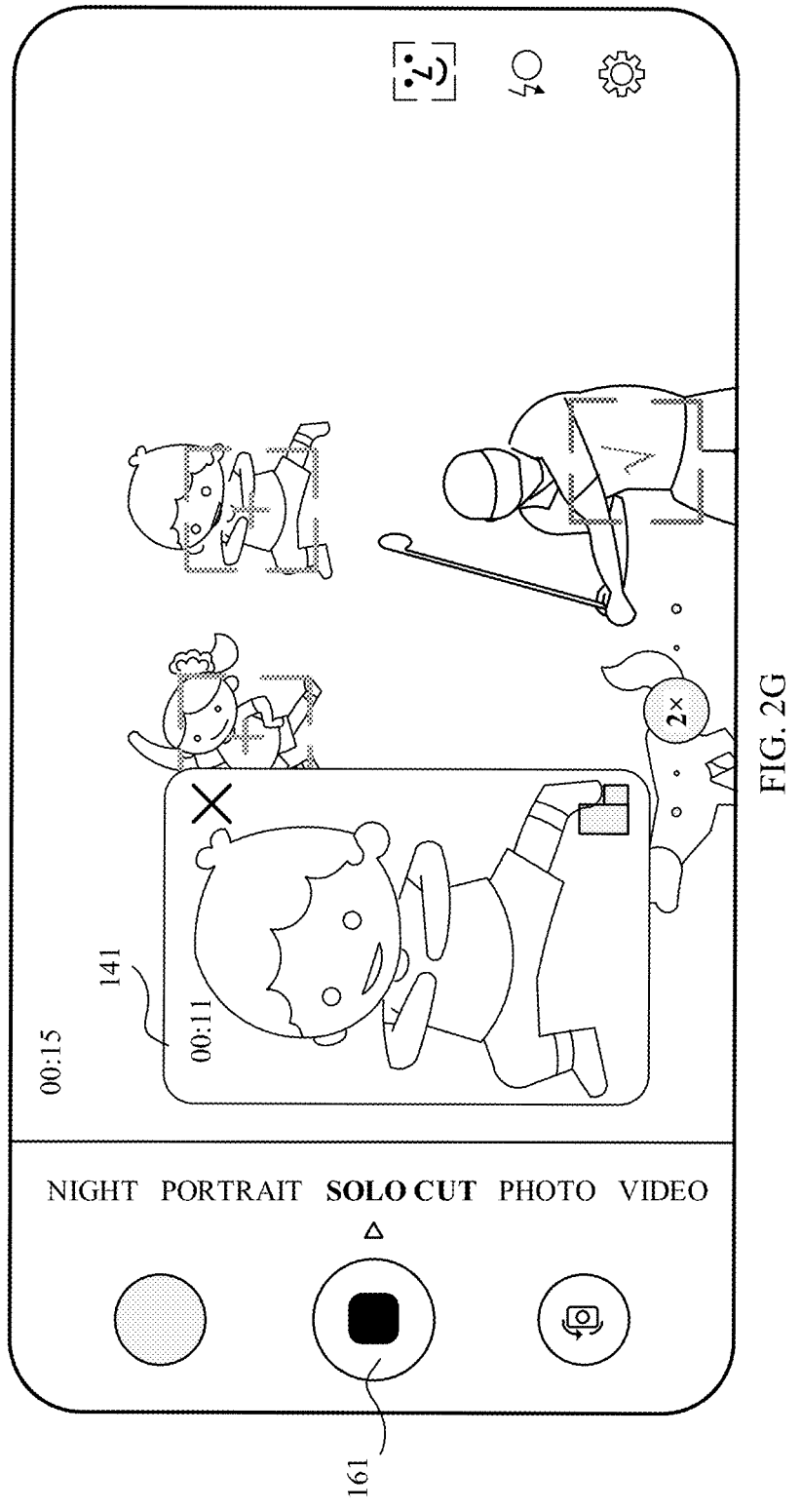

With reference to the user interfaces shown in FIG. 2D-FIG. 2E, in some embodiments, the terminal 100 supports protagonist switching in the shooting process. In this case, after obtaining the jth frame of image, the terminal 100 may further determine whether the frame of image corresponds to a user operation of protagonist switching, to replace the protagonist and replace the close-up image displayed in the small window 141.

Referring to FIG. 9B, after the steps shown in S406 and S415, S417: The terminal 100 may determine whether a user operation of protagonist switching is detected, for example, the user operation of tapping the selection box 122 corresponding to the person 2 shown in FIG. 2D-FIG. 2E. When detecting the user operation of protagonist switching, the terminal 100 may determine the person 2 in the jth frame of image as a protagonist. Then, the terminal 100 may reset FrameID of the jth frame of image to 1, obtain an image frame after the image frame, and position the person 2 in a subsequent image frame, to display the close-up image of the new protagonist person 2 in the small window 141.

After the step shown in S416 and in a scenario shown in S413 in which the lost frame quantity is less than Y, S418: The terminal 100 may also change the protagonist based on the detected user operation of protagonist switching, and further change the close-up image displayed in the small window 141. Details are not described herein again.

FIG. 10 is a schematic diagram of a system structure of a terminal 100 according to an embodiment of this application.

A layered architecture divides a system into several layers, and each layer has a clear role and task. The layers communicate with each other through a software interface. In some embodiments, the system is divided into five layers: an application layer, an application framework layer, a hardware abstraction layer, a driver layer, and a hardware layer from top to bottom.

The application layer may include a series of application packages. In this embodiment of this application, the application packages may include a camera, a gallery, and the like.

The application framework layer provides an application programming interface (application programming interface, API) and a programming framework for an application at the application layer. The application framework layer includes some predefined functions. In this embodiment of this application, the application framework layer may include a camera access interface, and the camera access interface may include a camera manager and a camera device. The camera access interface is configured to provide an application programming interface and a programming framework for a camera application.

The hardware abstraction layer is an interface layer located between the application framework layer and the driver layer, and provides a virtual hardware platform for an operating system. In this embodiment of this application, the hardware abstraction layer may include a camera hardware abstraction layer and a camera algorithm library.

The camera hardware abstraction layer may provide virtual hardware for a camera device 1, a camera device 2, or more camera devices. The camera algorithm library may include run code and data for implementing the shooting method provided in the embodiments of this application.

The driver layer is a layer between hardware and software. The driver layer includes various hardware drivers. The driver layer may include a camera device driver, a digital signal processor driver, and a graphics processing unit driver.

The camera device driver is configured to drive a sensor of a camera to collect an image, and drive an image signal processor to preprocess the image. The digital signal processor driver is configured to drive a digital signal processor to process the image. The graphics processing unit driver is configured to drive a graphics processing unit to process the image.

The following specifically describes the shooting method in the embodiments of this application with reference to the foregoing system structure:

In response to an operation of enabling the camera application by a user, for example, an operation of tapping a camera application icon, the camera application invokes the camera access interface of the application framework layer to enable the camera application, and further invokes a camera device (the camera device 1 and/or another camera device) at the camera hardware abstraction layer to send an instruction of enabling a camera. The camera hardware abstraction layer sends the instruction to the camera device driver at a kernel layer. The camera device driver may enable a corresponding camera sensor, and the sensor collects an image optical signal. One camera device at the camera hardware abstraction layer corresponds to one camera sensor at the hardware layer.

Then, the camera sensor may transmit the collected image optical signal to the image signal processor for preprocessing, obtain an image electrical signal (a raw image), and transmit the raw image to the camera hardware abstraction layer by using the camera device driver.

The camera hardware abstraction layer may send the raw image to the camera algorithm library. The camera algorithm library stores program code for implementing the shooting method provided in the embodiments of this application. The code may be executed based on the digital signal processor, the image processor, and the camera algorithm library, to implement the foregoing described capabilities such as object identification and marking, protagonist tracking, and close-up image extraction.

The camera algorithm library may send the identified raw image collected by the camera to the camera hardware abstraction layer. Then, the camera hardware abstraction layer may send the identified raw image for display. In addition, the camera algorithm library may further output a center point of an identified object in the image frame and a protagonist-centered close-up image. In this way, the camera application may display, based on the center point of the object, a selection box mark on the raw image that is sent for display, and display the close-up image in a small window.

The interface shown in FIG. 1A may be referred to as the first interface, and the SOLO CUT mode in a module bar in FIG. 1A may be referred to as the first control. The interface shown in FIG. 1B may be referred to as a second interface. The image displayed in the preview window 113 in FIG. 1B may be referred to as a first image. The selection boxes 121, 122, and 123 displayed in the first image in FIG. 1B may be referred to as one or more marks. In FIG. 1C, the selection box 123 may be referred to as a first mark, and the person 3 may be referred to as the first object. The interface shown in FIG. 1D may be referred to as a third interface, the small window 141 may be referred to as a first window, and the displayed image in the small window 141 may be referred to as a second image.

In FIG. 1E, an operation of tapping the shooting control 112 may be referred to as a fourth operation of starting recording, and another operation of tapping the shooting control 112 may be referred to as an operation of ending recording. In FIG. 3A, the close control 311 may be referred to as a second control. In FIG. 7C, a human body image region corresponding to the human body box 3' may be referred to as a first human body image region.

FIG. 11 is a schematic diagram of a hardware structure of a terminal 100 according to an embodiment of this application.

The terminal 100 may include a processor 110, an external memory interface 120, an internal memory 129, a universal serial bus (universal serial bus, USB) interface 130, a charging management module 140, a power management module 144, a battery 143, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 197, an indicator 196, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal 100. In some other embodiments of this application, the terminal 100 may include more or fewer components than shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent devices, or may be integrated into one or more processors.

The controller may generate an operation control signal based on instruction operation code and a timing signal, to control instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship among the modules shown in this embodiment of the present invention is merely an example for description, and does not constitute a limitation on the structure of the terminal 100. In some other embodiments of this application, the terminal 100 may alternatively use an interface connection manner different from those in the foregoing embodiment or a combination of a plurality of interface connection manners.

The charging management module 140 is configured to receive a charging input from a charger. The charging management module 140 may further supply power to the electronic device by using the power management module 144 while charging the battery 143. The power management module 144 is configured to connect to the battery 143, the charging management module 140, and the processor 110. The power management module 144 receives an input from the battery 143 and/or the charging management module 140, and supplies power to the processor 110, the internal memory 129, the display 194, the camera 193, the wireless communication module 160, and the like.

A wireless communication function of the terminal 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals.

The mobile communication module 150 may provide a wireless communication solution that is applied to the terminal 100, including 2G/3G/4G/5G and the like. The mobile communication module 150 may receive an electromagnetic wave by using the antenna 1, perform processing such as filtering or amplification on the received electromagnetic wave, and transmit a processed electromagnetic wave to the modem processor for demodulation. The mobile communication module 150 may further amplify a signal obtained after modulation by the modem processor, and convert, by using the antenna 1, an amplified signal into an electromagnetic wave for radiation.

The wireless communication module 160 may provide a wireless communication solution that is applied to the terminal 100 and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, and the like. The wireless communication module 160 receives an electromagnetic wave by using the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the to-be-sent signal, and convert, by using the antenna 2, the to-be-sent signal into an electromagnetic wave for radiation.

In some embodiments, in the terminal 100, the antenna 1 is coupled to the mobile communication module 150, and the antenna 2 is coupled to the wireless communication module 160, so that the terminal 100 can communicate with a network and another device by using a wireless communication technology.

The terminal 100 implements a display function by using the GPU, the display 194, the application processor, and the like. The GPU is a microprocessor for image processing and is connected to the display 194 and the application processor. The GPU is configured to perform mathematical and geometric calculation, and is configured to render graphics. The processor 110 may include one or more GPUs, and the one or more GPUs execute program instructions to generate or change displayed information.

The display 194 is configured to display an image, a video, and the like. The display 194 includes a display panel. The display 194 includes a display panel. The display panel may be a liquid crystal display (liquid crystal display, LCD). The display panel may be further made from an organic light-emitting diode (organic light-emitting diode, OLED), an active-matrix organic light emitting diode (active-matrix organic light emitting diode, AMOLED), a flexible light-emitting diode (flex light-emitting diode, FLED), a miniled, a microled, a micro-oled, a quantum dot light emitting diode (quantum dot light emitting diodes, QLED), or the like. In some embodiments, the electronic device may include one or N displays 194, where N is a positive integer greater than 1.

In this embodiment of this application, a capability of displaying by the terminal 100 a raw image collected by a camera, a close-up image that is of a protagonist and that is determined through protagonist tracking, and user interfaces shown in FIG. 1A-FIG. 1J, FIG. 2A-FIG. 2C, and FIG. 3A-FIG. 3C relies on the display function provided by the GPU, the display 194, and the application processor.

The terminal 100 may implement a shooting function by using the ISP, the camera 193, the video codec, the GPU, the display 194, the application processor, and the like.

The ISP is configured to process data fed back by the camera 193. For example, during shooting, a shutter is opened, and light is transmitted to a camera photosensitive element through a lens. An optical signal is converted into an electrical signal. The camera photosensitive element transmits the electrical signal to the ISP for processing, to convert the electrical signal into an image visible to naked eyes. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a still image or a video. An optical image is generated for an object through a lens and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the terminal 100 may include one or N cameras 193, where N is a positive integer greater than 1.

The digital signal processor is configured to process a digital signal, and can process another digital signal in addition to processing a digital image signal. For example, when the terminal 100 performs frequency selection, the digital signal processor is configured to perform Fourier transform on energy of frequencies.

The video codec is configured to compress or decompress a digital video. The terminal 100 may support one or more types of video codecs. Therefore, the terminal 100 may play or record videos in a plurality of encoding formats, such as moving picture experts group (moving picture experts group, MPEG) 1, MPEG2, MPEG3, and MPEG4.

The NPU is a neural-network (neural-network, NN) computing processor that quickly processes input information by referring to a biological neural network structure, for example, by referring to a transmission mode between human brain neurons, and may further perform self-learning continuously. The NPU may be used for implementing applications such as intelligent cognition of the terminal 100, for example, image recognition, face recognition, speech recognition, and text understanding.

In this embodiment of this application, that the terminal 100 implements the shooting method provided in the embodiments of this application first relies on an image collected by the ISP and the camera 193, and then relies on an image computing processing capability provided by the video codec and the GPU. The terminal 100 may implement neural network algorithms such as face recognition, human body recognition, and re-identification (ReID) by using a computing processing capability provided by the NPU.

The internal memory 129 may include one or more random access memories (random access memory, RAM) and one or more non-volatile memories (non-volatile memory, NVM).

The random access memory may include a static random-access memory (static random-access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a fifth generation DDR SDRAM is usually referred to as DDR5 SDRAM), and the like.

The non-volatile memory may include a magnetic disk storage component and a flash memory (flash memory). The flash memory may include NOR FLASH, NAND FLASH, 3D NAND FLASH, and the like based on an operating principle. The flash memory may include a single-level cell (single-level cell, SLC), a multi-level cell (multi-level cell, MLC), a triple-level cell (triple-level cell, TLC), a quad-level cell (quad-level cell, QLC), and the like based on a quantity of levels of a cell. The flash memory may include a universal flash storage (English: universal flash storage, UFS), an embedded multi media card (embedded multi media Card, eMMC), and the like based on a storage specification.

The processor 110 may directly perform reading from or writing into the random access memory. The random access memory may be configured to store an executable program (for example, a machine instruction) of an operating system or another running program, and may be further configured to store data of a user and data of an application, and the like. The non-volatile memory may also store the executable program, the data of the user, and the data of the application, and the like, which may be loaded into the random access memory in advance for directly reading and writing by the processor 110.

In this embodiment of this application, code for implementing the shooting method described in the embodiments of this application may be stored in the non-volatile memory. When running a camera application, the terminal 100 may load the executable code stored in the non-volatile memory into the random access memory.

The external memory interface 120 may be configured to connect to an external non-volatile memory, to expand a storage capability of the terminal 100. The external non-volatile memory communicates with the processor 110 through the external memory interface 120, to implement a data storage function.

The terminal 100 may implement an audio function, for example, music playing or recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The speaker 170A, also referred to as a "loudspeaker", is configured to convert an audio electrical signal into a sound signal. The terminal 100 may listen to music or answer a hands-free call by using the speaker 170A. The receiver 170B, also referred to as an "earpiece", is configured to convert an audio electrical signal into a sound signal. When the terminal 100 receives a call or a voice message, the receiver 170B can be placed close to an ear to receive the voice. The microphone 170C, also referred to as a "mic" or "mike", is configured to convert a sound signal into an electrical signal. The headset jack 170D is configured to connect to a wired headset.

In this embodiment of this application, in a process in which the camera is enabled to collect an image, the terminal 100 may simultaneously enable the microphone 170C to collect a sound signal, and convert the sound signal into an electrical signal for storage. In this way, the user can obtain an audio video.

The pressure sensor 180A is configured to sense a pressure signal, and may convert the pressure signal into an electrical signal. In some embodiments, the pressure sensor 180A may be disposed in the display 194.

The gyroscope sensor 180B may be configured to determine a moving posture of the terminal 100. In some embodiments, the gyroscope sensor 180B may be configured to determine angular velocities of the terminal 100 around three axes (gyroscope sensor, x, y, and z axes). The gyroscope sensor 180B may be configured to implement image stabilization during shooting. For example, when the shutter is pressed, the gyroscope sensor 180B detects an angle at which the terminal 100 jitters, calculates, based on the angle, a distance for which a lens module needs to compensate, and allows the lens to cancel the jitter of the terminal 100 through reverse motion, to implement image stabilization.

The barometric pressure sensor 180C is configured to measure barometric pressure. In some embodiments, the terminal 100 calculates an altitude based on a barometric pressure value measured by the barometric pressure sensor 180C, to assist in positioning and navigation. The magnetic sensor 180D may include a Hall sensor. The terminal 100 may use the magnetic sensor 180D to detect opening and closing of a flip holster. The acceleration sensor 180E may detect acceleration of the terminal 100 in various directions (usually on three axes), and may detect a magnitude and a direction of gravity when the terminal 100 is still. The distance sensor 180F is configured to measure a distance. The terminal 100 may measure a distance by using infrared or laser. In some embodiments, in a shooting scenario, the terminal 100 may use the distance sensor 180F to measure a distance to implement quick focusing. The optical proximity sensor 180G may include, for example, a light-emitting diode (LED) and an optical detector, for example, a photodiode. The light-emitting diode may be an infrared light-emitting diode. The terminal 100 emits infrared light outward by using the light-emitting diode. The terminal 100 uses the photodiode to detect infrared reflected light from a nearby object. When sufficient reflected light is detected, it may be determined that there is an object near the terminal 100. When insufficient reflected light is detected, the terminal 100 may determine that there is no object near the terminal 100. The ambient light sensor 180L is configured to sense luminance of ambient light. The terminal 100 may adaptively adjust luminance of the display 194 based on the sensed luminance of the ambient light. The ambient light sensor 180L may also be configured to automatically adjust white balance during shooting. The fingerprint sensor 180H is configured to collect a fingerprint. The terminal 100 may use a characteristic of the collected fingerprint to implement fingerprint-based unlock, application lock access, fingerprint-based shooting, fingerprint-based incoming call answering, and the like. The temperature sensor 180J is configured to detect a temperature. In some embodiments, the terminal 100 executes a temperature processing policy based on the temperature detected by the temperature sensor 180J.

The touch sensor 180K is also referred to as a "touch device". The touch sensor 180K may be disposed in the display 194. The touch sensor 180K and the display 194 form a touchscreen, also referred to as a "touch control screen". The touch sensor 180K is configured to detect a touch operation performed on or near the touch sensor 180K. The touch sensor may transmit a detected touch operation to the application processor to determine a type of a touch event. A visual output related to the touch operation may be provided by using the display 194. In some other embodiments, the touch sensor 180K may alternatively be disposed on a surface of the terminal 100, and is disposed at a location different from a location of the display 194.

In this embodiment of this application, the terminal 100 may detect, by using the touch sensor 180K, the tap operation, the flicking operation, and another operation performed on the display 194 by the user, to implement the shooting method shown in FIG. 1A-FIG. 1J, FIG. 2A-FIG. 2C, and FIG. 3A-FIG. 3C.

The bone conduction sensor 180M may obtain a vibration signal. The key 190 includes a power-on key, a volume key, or the like. The terminal 100 may receive key input, generate key signal input related to a user setting and function control of the terminal 100. The motor 197 may generate a vibration prompt. The motor 197 may be configured to provide a vibration prompt for an incoming call, and may be further configured to provide vibration feedback for a touch. The indicator 196 may be an indicator light, may be configured to indicate a charging status or a power change, and may be further configured to indicate a message, a missed incoming call, a notification, and the like. The SIM card interface 195 is configured to connect to a SIM card. The terminal 100 may support one or N SIM card interfaces, where N is a positive integer greater than 1.

A term "user interface (user interface, UI)" in the specification, claims, and accompanying drawings of this application is a medium interface for interaction and information exchange between an application or an operating system and a user, and the medium interface implements conversion between an internal form of information and a form acceptable to the user. A user interface of an application is source code written in a specific computer language such as java or an extensible markup language (extensible markup language, XML). The source code of the interface is parsed and rendered on a terminal device, and is finally presented as user-identifiable content, for example, a control such as a picture, text, or a button. The control (control) is also referred to as a widget (widget), and is a basic element of the user interface. Typical controls include a toolbar (toolbar), a menu bar (menu bar), a text box (text box), a button (button), a scrollbar (scrollbar), a picture, and text. An attribute and content of the control in the interface are defined by using a label or a node. For example, the control included in the interface is defined in the XML by using a node such as <Textview>, <ImgView>, or <VideoView>. One node corresponds to one control or attribute in the interface. After being parsed and rendered, the node is presented as user-visible content. In addition, interfaces of many applications, such as a hybrid application (hybrid application), usually further include a web page. The web page, also referred to as a page, may be understood as a special control embedded in an application interface. The web page is source code written in a specific computer language, for example, a hyper text markup language (hyper text markup language, GTML), a cascading style sheet (cascading style sheets, CSS), or a javascript (JavaScript, JS). The source code of the web page may be loaded and displayed as user-identifiable content by a browser or a web page display component with a function similar to that of the browser. Specific content included in the web page is also defined by using a label or a node in the source code of the web page. For example, an element and an attribute of the web page are defined in the GTML by using <p>, <img>, <video>, and <canvas>.

The user interface is usually in a representation form of a graphical user interface (graphic user interface, GUI), and the graphical user interface is a user interface that is related to a computer operation and that is displayed in a graphical manner. The graphical user interface may be an interface element such as an icon, a window, or a control that is displayed on a display of an electronic device. The control may include visible interface elements such as an icon, a button, a menu, a tab, a text box, a dialog box, a status bar, a navigation bar, and a Widget.

The singular expression forms "one", "one type of", "the", "the foregoing", "this", and "the one" used in the specification and the appended claims of this application are also intended to include plural expression forms, unless otherwise specified in the context clearly. It should be further understood that the term "and/or" used in this application indicates and includes any or all possible combinations of one or more listed items. As used in the foregoing embodiments, according to the context, the term "when" may be interpreted as "if", "after", "in response to determining", or "in response to detecting". Similarly, based on the context, the phrase "when determining" or "if detecting (a stated condition or event)" may be interpreted as a meaning of "if determining", "in response to determining", "when detecting (a stated condition or event)", or "in response to detecting (a stated condition or event)".

All or some of the foregoing embodiments may be implemented by using software, hardware, firmware, or any combination thereof. When the software is used for implementation, some or all of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired manner (for example, a coaxial cable, an optical fiber, or a digital subscriber line) or a wireless manner (for example, infrared, wireless, or microwave). The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures in the methods in the foregoing embodiments may be implemented by using a computer program instructing related hardware. The program may be stored in a computer-readable storage medium. When the program is executed, the procedures in the foregoing method embodiments may be performed. The foregoing storage medium includes any medium that can store program code, for example, a ROM, a random access memory RAM, a magnetic disk, or an optical disc.

The invention claimed is:

1. A shooting method, applied to an electronic device having a camera, wherein the method comprises:

displaying a first interface, wherein the first interface comprises a preview window and a first control, and the preview window is used to display an image collected by the camera;

detecting a first operation performed on the first control;

displaying a second interface in response to the first operation, wherein the second interface comprises the preview window, a first image is displayed in the preview window, one or more marks are displayed on the first image, the one or more marks correspond to one or more shot objects in the first image, the one or more marks comprise a first mark, and the first mark corresponds to a first shot object in the first image;

detecting a second operation performed on the first mark;

displaying a third interface in response to the second operation, wherein the third interface comprises the preview window and a first window, and displaying a second image with the first shot object as a protagonist in the first window; and saving an original video and a close-up video in response to an end video-recording operation, wherein the original video is a video obtained based on an image displayed in the preview window in a recording process, the close-up video is a video obtained based on an image displayed in the first window in the recording process, the original video comprises the first image, and the close-up video comprises the second image; and wherein in the recording process, for a part or all of the close-up video, a protagonist in the close-up video is determined based on a similarity distance;

wherein before detecting the second operation performed on the first mark, the method further comprises:

in response to a fourth operation of starting recording, recording the original video based on the image displayed in the preview window; and in response to the second operation, recording the close-up video based on the image displayed in the first window, wherein duration of the close-up video is less than that of the original video.

2. The method according to claim 1, wherein after displaying a third interface, the method further comprises: in response to a fourth operation of starting recording, recording the original video based on the image displayed in the preview window, and starting recording the close-up video based on the image displayed in the first window.

3. The method according to claim 1, wherein the saving an original video and a close-up in response to an end video recording operation comprises:

stopping recording the image in the first window in response to the end recording operation, and saving the close-up video; and stopping recording the image in the preview window simultaneously in response to the end recording operation, and saving the original video.

4. The method according to claim 1, wherein the saving an original video and a close-up video in response to an end recording operation comprises:

stopping recording the image in the first window in response to an operation of ending recording the close-up video, and saving the close-up video; and stopping recording the image in the preview window in response to the end recording operation, and saving the original video.

5. The method according to claim 4, wherein the first window comprises a second control, and the operation of ending recording the close-up video is a user operation performed on the second control.

6. The method according to claim 1, wherein types of the objects comprise a person, an animal, or a plant.

7. The method according to claim 1, wherein the displaying a second image with the first shot object as a protagonist in the first window comprises:

determining the second image in which the first shot object in the first image is located, and displaying the second image in the first window.

8. The method according to claim 7, wherein the method further comprises:

determining that a third image comprises the first object; and determining a fourth image in which the first object in the third image is located, and displaying the fourth image in the first window.

9. The method according to claim 8, wherein the determining that a third image comprises the first object comprises:

identifying, by using a human body detection algorithm, one or more persons comprised in the third image, wherein an image region in which one person is located is one human body image region; and when human body image regions in the third image do not overlap, calculating an intersection over union (IoU) distance between each human body image region in the third image and a first image region in the first image, and determining, as the first object, a person corresponding to a first human body image region that has a smallest IoU distance that meets an IoU distance threshold; or when human body image regions in the third image overlap, calculating an IoU distance and a re-identification ReID distance between each human body image region in the third image and the first image region in the first image, and determining, as the first object, a person corresponding to a first human body image region that has a smallest sum of the IoU distance and the ReID distance that meets an IoU+ReID distance threshold.

10. The method according to claim 9, wherein the determining a fourth image in which the first object in the third image is located comprises: determining, based on the first human body image region, the fourth image comprising the first human body image region, wherein an aspect ratio of the fourth image is the same as an aspect ratio of the first window.

11. The method according to claim 10, wherein the determining, based on the first human body image region, the fourth image comprising the first human body image region comprises:

determining a zoom ratio based on a size of a maximum human body image region in the third image and a size of the first human body image region in the third image, and determining a width and a height of the fourth image based on the zoom ratio, a width of the first window, and a height of the first window; and determining, based on the width and the height of the fourth image, the fourth image comprising the first human body image region.

12. The method according to claim 8, wherein the method further comprises:

pausing recording of the image in the first window when it is determined that the third image does not comprise the first object.

13. The method according to claim 12, wherein the method further comprises:

when it is determined that the fourth image comprises the first object, determining a fifth image in which the first object in the fourth image is located, displaying the fifth image in the first window, and continuing to record a close-up image in the first window simultaneously starting from the fifth image, wherein the fourth image is an image after the third image.

14. The method according to claim 8, wherein the method further comprises:

increasing a lost frame quantity by 1 when it is determined that the third image does not comprise the first object;

determining whether a current lost frame quantity is less than a lost frame threshold Y; and when the current lost frame quantity threshold is greater than Y, stopping recording the image in the first window.

15. The method according to claim 1, wherein the displaying one or more marks on the first image comprises:

performing object identification on the first image collected by the camera, and determining the one or more objects comprised in the first image;

generating the one or more marks respectively corresponding to the one or more objects; and displaying the first image in the preview window, and displaying the one or more marks on the one or more objects in the first image simultaneously.

16. The method according to claim 15, wherein the performing object identification on the first image collected by the camera, and determining the one or more objects comprised in the first image comprises:

determining a face image comprised in the first image by using a preconfigured face detection algorithm;

determining a human body image comprised in the first image by using a preconfigured human body detection algorithm;

calculating an IoU of each face image and each human body image; and determining a group of face image and human body image meeting an IoU threshold as an object.

17. The method according to claim 1, wherein the first window does not overlap the first object in the preview window.

18. An electronic device, comprising one or more processors and one or more memories, wherein the one or more memories are coupled to the one or more processors, the one or more memories are configured to store computer program code, the computer program code comprises computer instructions, and when executing the computer instructions, the one or more processors are enabled to:

display a first interface, wherein the first interface comprises a preview window and a first control, and the preview window is used to display an image collected by the camera;

detect a first operation performed on the first control;

display a second interface in response to the first operation, wherein the second interface comprises the preview window, a first image is displayed in the preview window, one or more marks are displayed on the first image, the one or more marks correspond to one or more shot objects in the first image, the one or more marks comprise a first mark, and the first mark corresponds to a first shot object in the first image;

detect a second operation performed on the first mark;

display a third interface in response to the second operation, wherein the third interface comprises the preview window and a first window, and displaying a second image with the first shot object as a protagonist in the first window; and save an original video and a close-up video in response to an end recording operation, wherein the original video is a video obtained based on an image displayed in the preview window in a recording process, the close-up video is a video obtained based on an image displayed in the first window in the recording process, the original video comprises the first image, and the close-up video comprises the second image; and wherein in the recording process, for a part or all of the close-up video, a protagonist in the close-up video is determined based on a similarity distance;

wherein before detecting the second operation performed on the first mark, the one or more processors are further enabled to:

in response to a fourth operation of starting record, recording the original video based on the image displayed in the preview window; and in response to the second operation, record the close-up video based on the image displayed in the first window, wherein a duration of the close-up video is less than that of the original video.

19. A non-transitory computer-readable storage medium, comprising instructions, wherein when the instructions are run on an electronic device, the electronic device is configured to:

display a first interface, wherein the first interface comprises a preview window and a first control, and the preview window is used to display an image collected by the camera;

detect a first operation performed on the first control;

display a second interface in response to the first operation, wherein the second interface comprises the preview window, a first image is displayed in the preview window, one or more marks are displayed on the first image, the one or more marks correspond to one or more shot objects in the first image, the one or more marks comprise a first mark, and the first mark corresponds to a first shot object in the first image;

detect a second operation performed on the first mark; 5 display a third interface in response to the second operation, wherein the third interface comprises the preview window and a first window, and display a second image with the first shot object as a protagonist in the first window; and 10 save an original video and a close-up video in response to an end recording operation, wherein the original video is a video obtained based on an image displayed in the preview window in a recording process, the close-up video is a video obtained based on an image displayed 15 in the first window in the recording process, the original video comprises the first image, and the close-up video comprises the second image; and in the recording process, for a part or all of the close-up video, a protagonist in the close-up video is determined 20 based on a similarity distance;

wherein before detecting the second operation performed on the first markthe electronic device is configured to:

in response to a fourth operation of starting recording, record the original video based on the image displayed 25 in the preview window; and in response to the second operation, record the close-up video based on the image displayed in the first window, wherein duration of the close-up video is less than that of the original video. 30

\* \* \* \* \*